US006241069B1

(12) United States Patent
Mazur et al.

(10) Patent No.: US 6,241,069 B1
(45) Date of Patent: *Jun. 5, 2001

(54) INTELLIGENT CURRENCY HANDLING SYSTEM

(75) Inventors: Richard A. Mazur, Naperville; Frank M. Csulits, Gurnee; Bradford T. Graves, Arlington Heights, all of IL (US)

(73) Assignee: Cummins-Allison Corp., Mt. Prospect, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/245,933

(22) Filed: Feb. 5, 1999

Related U.S. Application Data

(63) Continuation-in-part of application No. 08/852,400, filed on May 7, 1997, now Pat. No. 6,012,565, and a continuation-in-part of application No. 08/841,203, filed on Apr. 29, 1997, now Pat. No. 6,028,951, and a continuation of application No. 08/339,337, filed on Nov. 14, 1994, now Pat. No. 5,692,067, which is a continuation of application No. 08/127,334, filed on Sep. 27, 1993, now Pat. No. 5,467,405, which is a continuation of application No. 07/885,648, filed on May 19, 1992, now Pat. No. 5,295,196, which is a continuation-in-part of application No. 07/475,111, filed on Feb. 5, 1990, now abandoned.

(60) Provisional application No. 60/078,228, filed on Mar. 17, 1998, provisional application No. 60/078,269, filed on Mar. 17, 1998, and provisional application No. 60/075,991, filed on Feb. 25, 1998.

(51) Int. Cl.$^7$ ........................................................ G07D 7/12
(52) U.S. Cl. ............................................ 194/207; 382/135
(58) Field of Search ................................... 194/206, 207; 209/534; 382/135; 356/71; 250/556

(56) References Cited

U.S. PATENT DOCUMENTS

| Re. 31,692 | 10/1984 | Tyburski et al. . |
| D. 369,984 | 5/1996 | Larsen ................................... D10/97 |
| 3,245,534 | 4/1966 | Smith et al. . |

(List continued on next page.)

FOREIGN PATENT DOCUMENTS

| 4310216 | 9/1994 | (DE) . |
| 0077464 | 4/1983 | (EP) . |

(List continued on next page.)

OTHER PUBLICATIONS

"Sale of Doubles Detection 7/91".
"Sale of Magnetic Detection 7/91".
"Sale of Doubles Detection 6/92".

(List continued on next page.)

*Primary Examiner*—F. J. Bartuska
(74) *Attorney, Agent, or Firm*—Jenkens & Gilchrist

(57) ABSTRACT

A document handling system for evaluating documents with respect to master information, has at least one input device adapted to obtain from at least one authentic document information associated with one or more attributes of the authentic document, a processor for generating master information based on the information obtained by the input device, and a memory for storing the master information.

56 Claims, 24 Drawing Sheets

U.S. PATENT DOCUMENTS

| | | | |
|---|---|---|---|
| 3,246,295 | 4/1966 | DeClaris et al. | 382/56 |
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,618,765 | 11/1971 | Cooper et al. | 209/534 |
| 3,679,314 | 7/1972 | Mustert | 356/71 |
| 3,778,628 | 12/1973 | Novak et al. | 250/556 |
| 3,842,281 | 10/1974 | Goodrich | 250/461 |
| 3,870,629 | 3/1975 | Carter et al. | 209/111.8 |
| 3,906,449 | 9/1975 | Marchak | 340/149 R |
| 3,952,183 | 4/1976 | Abe | 235/92 SB |
| 3,976,198 | 8/1976 | Carnes, Jr. et al. | 209/111.7 T |
| 4,041,456 | 8/1977 | Ott et al. | 340/146.3 R |
| 4,081,131 | 3/1978 | Sand et al. | 364/550 |
| 4,096,991 | 6/1978 | Iquchi | 235/419 |
| 4,114,804 | 9/1978 | Jones et al. | 235/476 |
| 4,147,430 | 4/1979 | Gorgone et al. | 356/51 |
| 4,166,945 | 9/1979 | Inoyama et al. | 235/379 |
| 4,179,685 | 12/1979 | O'Maley | 340/146.3 |
| 4,243,216 | 1/1981 | McInerny | 271/122 |
| 4,255,651 | 3/1981 | Phillips | 235/92 |
| 4,277,774 | 7/1981 | Fujii et al. | 340/146.3 |
| 4,283,708 | 8/1981 | Lee | 340/146.32 |
| 4,288,781 | 9/1981 | Sellner et al. | 340/146.3 |
| 4,302,781 | 11/1981 | Ikeda et al. | 358/486 |
| 4,311,914 | 1/1982 | Huber | 250/556 |
| 4,313,598 | 2/1982 | DiBlasio | 271/124 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,355,300 | 10/1982 | Weber | 340/146.3 C |
| 4,356,473 | 10/1982 | Freudenthal | 340/146.3 H |
| 4,381,447 | 4/1983 | Horvath et al. | 250/223 |
| 4,386,432 | 5/1983 | Nakamura et al. | 382/7 |
| 4,416,449 | 11/1983 | McInerny | 271/122 |
| 4,420,153 | 12/1983 | Winkler et al. | 271/304 |
| 4,442,541 | 4/1984 | Finkel et al. | |
| 4,461,028 | 7/1984 | Okubo | 382/15 |
| 4,464,786 | 8/1984 | Nishito et al. | |
| 4,464,787 | 8/1984 | Fish et al. | |
| 4,470,496 | 9/1984 | Steiner | 209/534 |
| 4,480,177 | 10/1984 | Allen | 235/379 |
| 4,482,058 | 11/1984 | Steiner | 209/534 |
| 4,487,306 * | 12/1984 | Nao et al. | 194/207 |
| 4,490,846 | 12/1984 | Ishida et al. | 382/7 |
| 4,503,963 | 3/1985 | Steiner . | |
| 4,513,439 | 4/1985 | Gorgone et al. . | |
| 4,539,702 | 9/1985 | Oka | 382/7 |
| 4,542,829 | 9/1985 | Emery et al. | 209/534 |
| 4,556,140 | 12/1985 | Okada | 194/4 |
| 4,558,224 | 12/1985 | Gober | 250/460.1 |
| 4,563,771 | 1/1986 | Gorgone et al. . | |
| 4,567,370 | 1/1986 | Falls | 250/461.1 |
| 4,587,412 | 5/1986 | Apisdorf | 235/449 |
| 4,587,434 | 5/1986 | Roes et al. | 250/556 |
| 4,592,090 | 5/1986 | Curl et al. . | |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. . | |
| 4,681,229 | 7/1987 | Uesaka et al. | 209/435 |
| 4,694,963 | 9/1987 | Takesako | 209/534 |
| 4,697,071 | 9/1987 | Hiraoka et al. | 235/379 |
| 4,700,368 | 10/1987 | Munn et al. | 377/8 |
| 4,707,843 | 11/1987 | McDonald et al. | 377/8 |
| 4,733,308 | 3/1988 | Nakamura et al. | 358/496 |
| 4,747,492 | 5/1988 | Saito et al. | 209/534 |
| 4,749,087 | 6/1988 | Buttifant . | |
| 4,761,002 | 8/1988 | Reed et al. | 271/111 |
| 4,764,725 | 8/1988 | Bryce | 324/234 |
| 4,789,345 | 12/1988 | Carter | 439/71 |
| 4,817,176 | 3/1989 | Marshall et al. | 382/43 |
| 4,823,393 | 4/1989 | Kawakami . | |
| 4,837,426 | 6/1989 | Pease et al. | 235/440 |
| 4,881,268 | 11/1989 | Uchida et al. . | |
| 4,906,988 | 3/1990 | Copella | 340/825.34 |
| 4,908,516 | 3/1990 | West | 250/556 |
| 4,953,086 | 8/1990 | Fukatsu | 364/408 |
| 4,973,851 | 11/1990 | Lee | 250/556 |
| 4,985,614 | 1/1991 | Pease et al. | 235/440 |
| 4,992,860 | 2/1991 | Hamaquchi et al. | 358/75 |
| 4,996,604 | 2/1991 | Oqawa et al. | 358/486 |
| 5,027,415 | 6/1991 | Hara et al. | 382/135 |
| 5,047,871 | 9/1991 | Meyer et al. | 358/486 |
| 5,066,992 | 11/1991 | Wu et al. | 357/23.5 |
| 5,068,519 | 11/1991 | Bryce | 235/449 |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,167,411 | 12/1992 | Isobe | 271/273 |
| 5,201,395 | 4/1993 | Takizawa et al. | 194/206 |
| 5,207,788 | 5/1993 | Geib et al. | 271/122 |
| 5,236,072 | 8/1993 | Cargill | 194/207 |
| 5,261,518 | 11/1993 | Bryce | 194/206 |
| 5,295,196 | 3/1994 | Raterman et al. | 382/7 A |
| 5,304,813 | 4/1994 | DeMan | 250/556 |
| 5,341,408 | 8/1994 | Melcher et al. | 377/8 |
| 5,342,213 | 8/1994 | Kobayaski | 439/268 |
| 5,367,577 | 11/1994 | Gotaas | 382/135 |
| 5,430,664 | 7/1995 | Cargill et al. | 364/550 |
| 5,454,727 | 10/1995 | Hus | 439/263 |
| 5,457,336 | 10/1995 | Fang et al. | 257/322 |
| 5,465,821 | 11/1995 | Akioka | 194/207 |
| 5,467,405 | 11/1995 | Raterman et al. | 382/135 |
| 5,467,406 | 11/1995 | Graves et al. | 382/135 |
| 5,493,534 | 2/1996 | Mok | 365/226 |
| 5,505,834 | 4/1996 | Chaug et al. | 340/825 |
| 5,526,080 | 6/1996 | Bright | 439/342 |
| 5,542,468 | 8/1996 | Lin | 165/80.3 |
| 5,580,311 | 12/1996 | Hast, III | 463/29 |
| 5,633,949 | 5/1997 | Graves et al. | 382/135 |
| 5,640,463 | 6/1997 | Csulits | 382/135 |
| 5,652,802 | 7/1997 | Graves et al. | 382/135 |
| 5,687,963 | 11/1997 | Mennie | 271/119 |
| 5,692,067 | 11/1997 | Raterman et al. | 382/135 |
| 5,704,491 | 1/1998 | Graves | 209/534 |
| 5,724,438 | 3/1998 | Graves | 382/135 |
| 5,751,840 | 5/1998 | Raterman et al. | 382/135 |
| 5,790,693 | 8/1998 | Graves et al. | 382/135 |
| 5,790,697 | 8/1998 | Jones et al. | 382/135 |
| 5,806,650 | 9/1998 | Mennie et al. | 194/206 |
| 5,815,592 | 9/1998 | Mennie et al. | 382/135 |
| 5,822,448 | 10/1998 | Graves et al. | 382/135 |
| 5,832,104 | 11/1998 | Graves et al. | 382/135 |
| 5,867,589 | 2/1999 | Graves et al. | 382/135 |
| 5,870,487 | 2/1999 | Graves et al. | 382/135 |
| 5,875,259 | 2/1999 | Mennie et al. | 382/135 |
| 5,905,810 | 5/1999 | Jones et al. | 382/135 |
| 5,909,502 | 6/1999 | Mazur | 382/135 |
| 5,909,503 | 6/1999 | Graves et al. | 382/135 |

FOREIGN PATENT DOCUMENTS

| | | |
|---|---|---|
| 101115 | 2/1984 | (EP) . |
| 0 342 647 A2 | 5/1989 | (EP) . |
| 0338123 | 10/1989 | (EP) . |
| 0342647 | 11/1989 | (EP) . |
| 0487316 A2 | 5/1992 | (EP) . |
| 690451 | 1/1996 | (EP) . |
| 0700098 | 3/1996 | (EP) . |

| | | |
|---|---|---|
| 0718809 A2 | 6/1996 | (EP) . |
| 2190996A | 12/1987 | (GB) . |
| 54-71673 | 6/1979 | (JP) . |
| 54-71674 | 6/1979 | (JP) . |
| 56-136689 | 10/1981 | (JP) . |
| 61-14557 | 4/1986 | (JP) . |
| 61-41439 | 9/1986 | (JP) . |
| WO 90/07165 | 6/1990 | (WO) . |
| WO 91/11778 | 8/1991 | (WO) . |
| WO 92/17394 | 10/1992 | (WO) . |
| WO 93/23824 | 11/1993 | (WO) . |
| WO 94/19773 | 9/1994 | (WO) . |
| WO 95/24691 | 9/1995 | (WO) . |
| WO 96/10800 | 4/1996 | (WO) . |

OTHER PUBLICATIONS

"Sale of Multiple Density Sensitivity Setting 4/93".
"Offer for Sale of Optical/Magnetic Detection 9/92".
Mosler CF–420 Cash Management System Operator's Manual, cover, copyright page, and chapter 5 pp. 5–1 through 5–16; copyrighted 1989.
JetScan Currency Scanner/Counter, Model 4060, Operator's Manual by Cummins–Allison (8/91).
JetScan Currency Scanner/Counter, Model 4061, Operating Instructions by Cummins–Allison (Apr. 20, 1993).
JetScan Currency Scanner/Counter, Model 4062, Operating Instructions by Cummins–Allison (Nov. 28, 1994).
Sale of JetScan Currency Scanner/Counter, Model 4062 (Nov. 28, 1994).
Mosler Inc. Brochure "The Mosler/Toshiba CF–420," 1989.
"Flash Memory Products—1996 Data Book/Handbook," Advanced Micro Devices, Sunnyvale, CA.
"FlashLite™ Memory Cards" Catalog 296045, AMP Inc., Harrisburg PA; Jul. 1995.
"AMP PC Card Conectors" Catalog 65701, AMP Inc., Harrisburg PA; Sep. 1995.
*Operation Manual for Maintenance and Learning Modes for tellac –5, 5DD, SD, DDA, A& SSD*, Musashi Co., Ltd., various pages; estimated before May 07, 1997.
Model 4050/4051 Form #022–7014–00, pp. 14–15; estimated before May 07, 1997.
"The Learning Mode of Tellac—3 . . . ", pp. 1–4; estimated before May 07, 1997.
Verified Translation of PCT 96/72651, Jun. 02, 1997.
Toshiba Fitness Sorter CF–400 Series; 6 pages; estimated 1989 or earlier.
Mosler Toshiba Currency Sorter CF–400 Series; 4 pages; copyr. 1983.
Brochure "Let Mosler Help You Cut Costs Four Ways." Brochure for Mosler/Toshiba Model CS–6600 Currency Handler; 4 pages; copyr. 1993.
Brochure of Mosler Model CS 6600 Optical Currency Counter/Sorter; 4 pages; copyr. 1992.
Glory GSA—500 Sortmaster brochure; 4 pages; date: estimated Jan. 14, 1994.
Glory GFB–500/520, Desk–top Bank Note Counters, 2 pages; dated: Sep. 21, 1993.
Glory GFB–500/520/600 Bank Note Counting Machine, Operating Instructions; Pages: cover, 3, 4, 8; dated: 1996.
Glory Cash Handling Systems brochure; 11 pages, dated: Apr. 25, 1994.
De La Rue Systems 2300 Series, Making Technology County, 4 pages, 1987.
De La Rue Systems 3100 Serie, l'internationale des Machines a trier les Billets, 2 pages, copyr. 1989 (French).

De La Rue Systems Limited, 2100 Banknote counting machine, Operator Instruction and Maintenance Sheet, 4 pages, copyr. 1980.
De La Rue Systems Limited, 9000 Series High speed document reader/sorters, 8 pages, copyr. 1980.
Bedienungsanleitung for GLORY Bank–Note Counting Machine, Models GFB–200, 210, 220 & 230 (Operator's Manual), 24 pages (date: estimated before Aug. 9, 1994).
Translation of EP 0 342 647 A2.
First Translation of JP 61–14557.
Second Translation of 61–14557 (Glory).
Translation of JP 54–71673.
Translation of JP 54–71674.
Translation of JP 61–41439.
First Translation of JP 56–136689.
Second Translation of JP 56–136689 (Glory).
Billcon D–202/204 Service Manual (cover marked 630229) (Japanese).
Translation of Billcon D–202/204 Service Manual—(H13).
Billcon D–202, D204 Operator's Manual (cover marked 611215) (Japanese).
First Translation of Billcon D–202, D204 Operator's Manual (H15).
Second Translation of Billcon D–202, D204 Operator's Manual (H15) (Glory).
Banking Machine Digest No. 31 (last page of H19 translation has a date of Dec. 5, 1988) (Japanese).
First Translation of Banking Machine Digest No. 31 (H18).
Second Translation of Banking Machine Digest No. 31 (H18) (Glory).
Third Translation of Banking Machine Digest No. 31 (H18).
Declaration of Per Torling, 6 pages (Mar. 18, 1999).
Sale of JetScan Currency Scanner/Counter, Model 4060 (8/91).
Sale of JetScan Currency Scanner/Counter, Model 4061 (Apr. 20, 1993).
AFB Currency Recognition System (1982).
Description of Toshiba–Mosler CF–420 Device; estimated 1989.
Toshiba–Mosler Operator's Manual for CF–420 Cash Settlement System; pp. 1 to C–3; copyr. 1989.
Brochure of Mosler Model CS 6600 Optical Currency Counter/Sorter; 4 pages; copyr. 1985.
Currency Systems International, CPS 1200; 4 pages; copyr. 1992.
Currency Systems International, Medium Speed Currency Sorting Family, CPS 600 and CPS 900; 4 pages; date: copyr. 1994.
Currency System Intl'l. Mr. W. Kranister in Conversation with Richard Haycock; pp. 1–5; date: estimated 1994.
Description of Currency Systems International's CPS 600 and CPS 900 devices, date: estimated 1994.
Currency Systems International/Currency Processing Systems, CPS 300; 4 pages; date: copyr. 1992.
Glory GSA–500 Sortmaster brochure; 2 pages; date: Jan. 14, 1994.

Sale of Glory GSA–500 Sortmaster, 1986.

Glory UF–1D brochure; 2 pages; dated: estimated before Aug. 9, 1994.

Glory GFB–200/210/220/230, Desk–Top Bank Note Counter; 2 pages, date: estimated before Aug. 9, 1994.

De La Rue Systems, The processing of money and documents, 4 pages, copyr. 1987.

Brochure: "GFR–X Banknote Counter with Denomination Recognition"; date: Dec. 1994; p. 3.

Glory Instruction Manual for Model GFR–100 Currency Reader Counter; date: Aug. 15, 1995; p. 26.

* cited by examiner

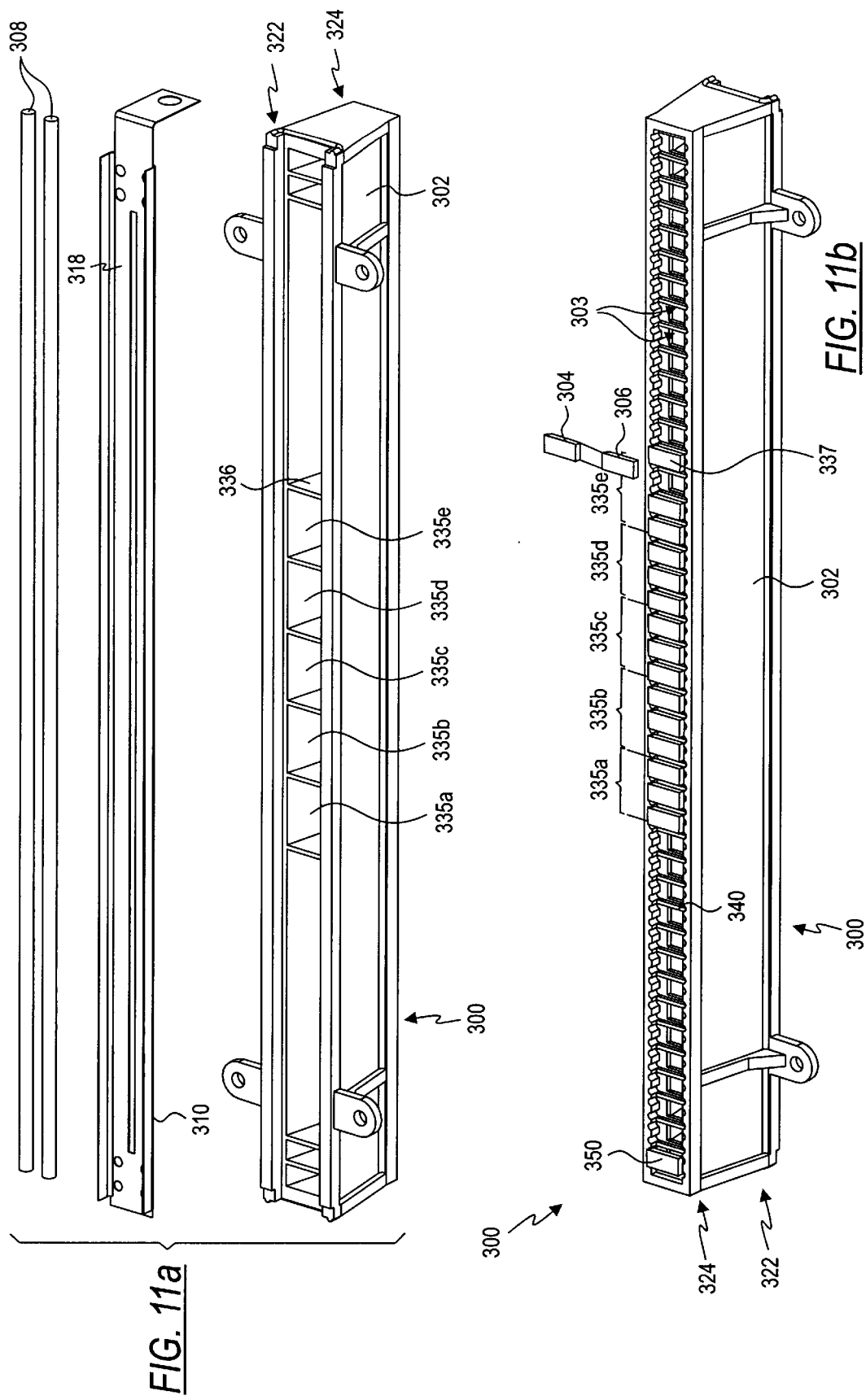

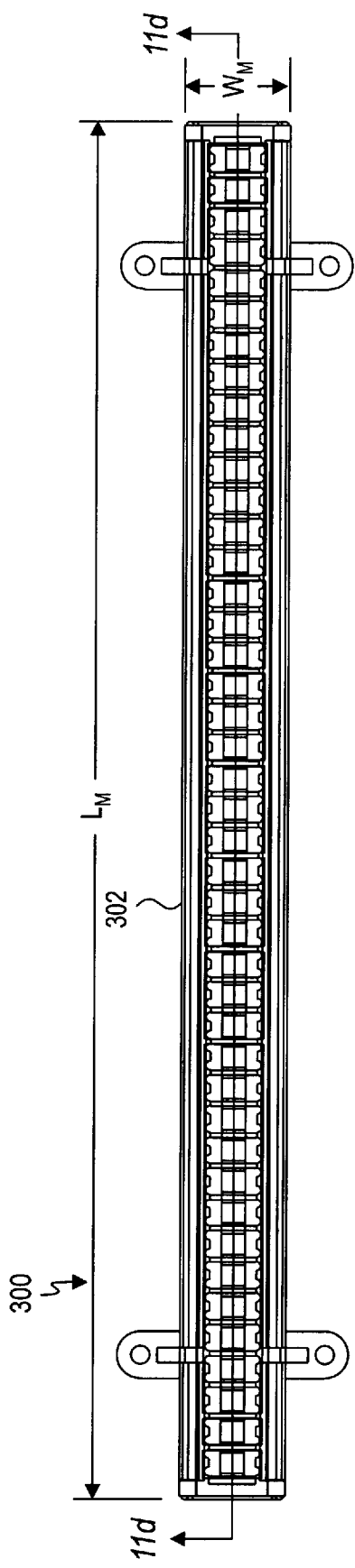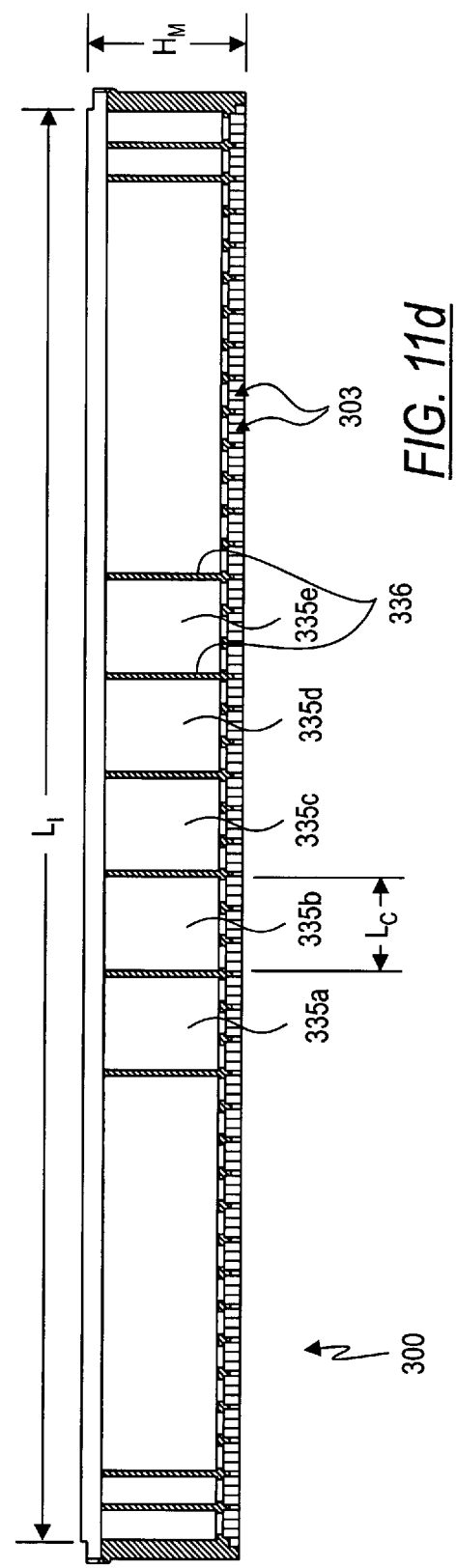
FIG. 11c
FIG. 11d

FIG. 18 TIMING DIAGRAM

INTELLIGENT CURRENCY HANDLING SYSTEM

CROSS-REFERENCE TO RELATED APPLICATIONS

This application is a continuation-in-part of the following pending U.S. Pat. applications: Ser. No. 08/852,400, filed May 7, 1997 U.S. Pat. No. 6,012,565 and entitled "Intelligent Currency Handling System"; and Ser. No. 08/841,203, filed Apr.29, 1997 U.S. Pat. No. 6,028,951. These parent applications have the same assignee as the present invention and are incorporated herein by reference in their entirety. This application also claims the benefit of priority of the following United States provisional patent applications: Ser. No. 60/078,228, filed Mar. 17, 1998 and entitled "Intelligent Currency Handling System"; Ser. No. 60/078,269 filed Mar. 17, 1998; ); and Ser. No. 60/075,991, filed Feb. 25, 1998.

Ser. No. 08/841,203 is a continuation of Ser. No. 08/339,337, filed Nov. 14, 1994, now U.S. Pat. No. 5,692,067, which is a continuation of Ser. No. 08/127,334, filed Sep. 27, 1993 now U.S. Pat. No. 5,467,405; which is a continuation of Ser. No. 07/885,648, filed May 19, 1992, now U.S. Pat. No. 5,295,196, which is a continuation-in-part of Ser. No. 07/475,111, filed Feb. 5, 1990, now abandoned.

FIELD OF THE INVENTION

The present invention relates generally to the field of document handling systems and, more particularly, to a currency handling system having the capability to learn to accommodate new types of currency bills, analyze selected attributes of the bills and independently generate master information associated with the selected attributes which may be used in evaluating subsequent currency bills.

BACKGROUND OF THE INVENTION

While the invention is illustrated and described herein with reference to a currency handling system and related method, it will be understood that the invention applies to a broad range of document handling applications. Such applications include the handling of items such as currency, including monetary bills, food coupons, casino or other private printed script, travelers checks, and the like, as well as other printed coupons or other media of exchange or similar documents. That is, the invention is applicable to documents which may be identified by detection and/or verification of ascertainable attributes of the documents, which attributes are substantially the same or within some range of variance from one document to the next, such that a document of a given type can be identified or authenticated based on the comparison of the detectable attributes with one or more attributes ("master information") of a genuine document. Therefore, reference hereinafter to "document" or "currency" will be understood to include, without limitation, any and all such documents. Moreover, reference hereinto a document handling system or method or to a currency handling system or method will be understood to include, without limitation, various methods and apparatus including currency evaluation, currency authentication, currency denominating, note counting and the like.

A variety of techniques and apparatus have been used to satisfy the requirements of automated currency handling machines. At the upper end of sophistication in this area of technology are machines which are capable of rapidly identifying, discriminating and counting multiple currency denominations. This type of machine, hereinafter designated as a "denomination discriminator," typically employs either magnetic sensing or optical sensing for identifying the denominations of bills in a stack and discriminating between different currency denominations. At a lower level of sophistication in this area are machines which are designed to rapidly count the number of currency bills in a stack, but which are not designed to identify or discriminate among multiple currency denominations. This type of machine, hereinafter designated as a "counter," may include magnetic or optical sensors sufficient to enable it to discriminate between acceptable and non-acceptable bills (including counterfeit bills) in a stack of bills having a known denomination, but do not permit the machine to identify the denomination of bills or discriminate among multiple denominations of currency. Consequently, counters do not generally "know" what denomination they are counting until they are informed of the particular denomination by an external signal or operator.

Whether employed in a denomination discriminator or counter, magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for discrimination. The more commonly used optical sensing technique, on the other hand, is based on detecting and analyzing variations in light reflectance or transmissivity characteristics occurring when a currency bill is illuminated and scanned by a strip of focused light. The subsequent currency discrimination is based on the comparison of sensed optical or magnetic characteristics with prestored parameters relating to different currency denominations, while accounting for adequate tolerances reflecting differences among bills of a given denomination. Similarly, the acceptance or rejection of a bill is based on the comparison of sensed optical or magnetic characteristics with prestored parameters defining an acceptable bill, while accounting for adequate tolerances reflecting differences among bills of a given denomination.

Currency handling machines (e.g., denomination discriminators or counters) known in the art typically include a system memory for storing sets of stored master information associated with characteristics of the various currency denominations to be evaluated or counted. The types of master information stored in the system memory generally depend upon the denominations and types of currency which a machine is designed to accommodate. For example, it has been found that master information obtained from an optical scanning technique may be used to discriminate between different denominations of U.S. currency. An example of a currency handling machine using an optical scanning technique is described in U.S. Pat. No. 5,295,196, issued Mar. 15, 1994 to Raterman et al. and assigned to Cummins-Allison Corporation, incorporated herein by reference. Currency handling machines designed to accommodate currencies of other countries may utilize different sets of stored master information to correspond to different characteristics of the foreign bills. For example, while all denominations of U.S. currency are the same size, in many other countries currencies vary in size by denomination. Furthermore, there is a wide variety of bill sizes among different countries. In addition to size, the color of currency can vary by country and by denomination. Likewise, many other characteristics may vary between bills of different countries and of different denominations.

The types or denominations of currency which a machine is able to accommodate is dependent on the content of the master information which it includes in system memory. For example, a machine designed for U.S. markets may be programmed with master information associated with magnetic and/or optical characteristics of U.S. currency, while a machine designed for a foreign market may be programmed with master information associated with the size and/or color of the foreign currency. A machine designed to handle bills of one country generally cannot handle bills from another country unless it has been provided with master information appropriate for both countries. Once programmed with the appropriate master information, the system memory may require periodic updates or supplements in order to reflect the most recent optical or magnetic characteristics of the various currency denominations to be evaluated, which may occur, for example, upon the issuance of a new series of bills.

Heretofore, the encoding or updating of master information into the system memory of currency evaluation machines (e.g., discrimination machines or counters) has been accomplished externally from the machine, typically at a factory or service center. For example, in currency evaluation machines employing memory chips such as erasable programmable read only memories (EPROMs or EEPROMs), the chips are typically programmed or updated at the factory or service center and either installed in the machine at the factory or, in the case of updates, shipped to the customer or service personnel for re-installation in the machine. An alternative method of encoding or updating prestored parameters may be utilized in discrimination machines employing "flash card" technology, such as described in U.S. Pat. application Ser. No. 08/715,029, assigned to the assignee of the present invention and incorporated herein by reference in its entirety. In such a "flash card" loading system, a flash card is programmed with the desired code and the machine may be encoded or updated by inserting the flash card into the machine, causing the system memory to become replaced with the flash card memory. Nevertheless, in either of the above prior systems, the source of the code is external to the machine, typically at the factory or service center level, and the discrimination capability of a particular machine is limited to only those bills associated with the pre-stored master information with which it has been programmed.

Accordingly, in view of the above-described problems, there is a need for a currency handling system that is able to accommodate currencies of several denominations and types, including multiple denominations and types of foreign currencies, without having been externally programmed or updated with pre-stored master information associated with those denominations and types. The present invention is directed to satisfying these needs.

SUMMARY OF THE INVENTION

In accordance with one aspect of the present invention, there is provided a system that can automatically learn the characteristics of authentic currency from a plurality of different currency systems.

In accordance with another aspect of the present invention, the system operates by scanning a genuine document along one or more segments, generating one or more scanned patterns therefrom, to create one or more master patterns associated with these scans. One technique is based on the optical sensing of reflectance characteristics obtained by illuminating and scanning a document such as a currency bill along an appropriately selected segment or segments of the bill. Light reflected from the bill as it is optically scanned is detected and used as an analog representation of the variation in the dark and light content of the printed pattern or indicia on the bill surface. This master information may be used for positively identifying any of a plurality of different bills from these currency systems which may be scanned in a similar fashion.

A series of such detected reflectance signals are obtained by sampling and digitally processing, under microprocessor control, the reflected light at a plurality of predefined sample points as the bill is moved. Accordingly, a fixed number of reflectance samples are obtained. The data samples obtained for a bill scan are subjected to digital processing, including a normalizing process to deaccentuate variations due to contrast fluctuations in the printed pattern or indicia existing on the surface of the bill being scanned. The normalized reflectance data represent a characteristic pattern that is fairly unique for a given bill identity and incorporates sufficient distinguishing features between characteristic patterns for different bill-types so as to accurately differentiate therebetween.

By using the above approach, a series of master characteristic patterns are generated and stored using standard bills for each denomination of currency that is to be detected. The "standard" bills used to generate the master characteristic patterns can be slightly used bills.

According to one embodiment, two or four characteristic patterns are generated and stored within system memory for each detectable bill-type. The stored patterns correspond, respectively, to optical scans performed on one or both sides of a bill along "forward" and "reverse" directions relative to the pattern printed on the bill. For bills which produce significant pattern changes when shifted slightly to the left or right, such as the $10 bill in U.S. currency, it is possible to store two patterns for each of the "forward" and "reverse" directions, each pair of patterns for the same direction represent two scan areas that are slightly displaced from each other. The document identification system of this invention is adapted to identify different denominations of a plurality of currency systems. Accordingly, a master set of different characteristic patterns is stored within the system memory for subsequent correlation purposes.

Alternatively, scanheads may be placed on both sides of a document transport path, scanned patterns retrieved from respective sides to generate master patterns from both sides.

In accordance with one aspect of the present invention, there is provided a currency handling system operable in a learn mode in which a set of master currency bills are processed by a primary machine to obtain master information associated with the master currency bills. The master currency bills may comprise bills from a "family" of multiple countries. The master information is stored in the memory of the primary machine and includes data which may be used to evaluate subsequent currency bills. In one embodiment, the master information comprises thresholds of acceptability or master patterns which may be used to evaluate subsequent currency bills. Once learned, the master information may be copied from the memory of the primary machine to the memory of one or more secondary machines. In either the primary or secondary machine, a test bill comprising a bill from the designated "family" of countries having an unknown denomination or authenticity is processed to obtain test data. The denomination and/or authenticity of the test bill is determined by comparing the test data to the master information.

In accordance with another aspect of the present invention, an improved optical sensing technique is based on the optical sensing of bill reflectance characteristics obtained by illuminating and scanning a bill. Light reflected from the bill as it is optically scanned is detected and used as an analog representation of the variation in the dark and light content of the printed pattern or indicia on the bill surface.

A series of such detected reflectance signals are obtained by sampling and digitally processing, under microprocessor control, the reflected light at a plurality of predefined sample points as the bill is moved. Accordingly, a number of reflectance samples are obtained across. The data samples obtained for a bill scan are subjected to digital processing, including a normalizing process to deaccentuate variations due to "contrast" fluctuations in the printed pattern or indicia existing on the surface of the bill being scanned. The normalized reflectance data represent a characteristic pattern that is fairly unique for a given bill denomination and incorporates sufficient distinguishing features between characteristic patterns for different currency denominations so as to accurately differentiate therebetween.

By using the above approach, a series of master characteristic patterns are generated and stored using standard bills for each denomination of currency that is to be detected. The "standard" bills used to generate the master characteristic patterns can be slightly used bills.

According to one embodiment, two characteristic patterns are generated and stored within system memory for each detectable currency denomination. The stored patterns correspond, respectively, to optical scans performed on the green surface of a bill along "forward" and "reverse" directions relative to the pattern printed on the bill.

For bills which produce significant pattern changes when shifted slightly to the left or right, such as the $10 bill in U.S. currency, it is possible to store two patterns for each of the "forward" and "reverse" directions, each pair of patterns for the same direction representing two scan areas that are slightly displaced from each. The currency discrimination and counting method and apparatus of this aspect of the invention is adapted to identify seven (7) different denominations of U.S. currency, i.e., $1, $2, $5, $10, $20, $50 and $100. Accordingly, a master set of 16 different characteristic patterns is stored within the system memory for subsequent correlation purposes (four patterns for the $10 bill and two patterns for each of the other denominations).

In another embodiment, the system includes a learn mode and a standard mode. A plurality of sensors are provided that are each adapted in the learn mode to process one or more master currency bills to obtain master information associated at least one attribute of the master currency bills. The sensors are adapted in the standard mode to process a stack of bills to obtain data associated with at least one attribute of the bills. The system further includes a processor that is adapted in the standard mode to determine the authenticity of each of the bills by comparing the data associated with a selected attribute to the master information corresponding to the selected attribute.

BRIEF DESCRIPTION OF THE DRAWINGS

The foregoing and other advantages of the invention will become apparent upon reading the following detailed description and upon reference to the drawings in which:

FIG. 11a is a top perspective view of one embodiment of a color scanhead for use in the currency handling systems of FIGS. 1–4;

FIG. 11b is a bottom perspective view of the color scanhead of FIG. 11a;

FIG. 11c is a bottom view of the color scanhead of FIG. 11a;

FIG. 11d is a sectional side view of the color scanhead of FIG. 11c;

FIG. 13a is a sectional end view of the color scanhead of FIG. 11a;

FIG. 13b is an illustration of the light trapping geometry of the manifold of the scanhead of FIG. 11a;

FIG. 14b is a simplified side view illustrating the operation of the size and position sensing system of FIG. 14a;

FIG. 20b is a bottom view of the scanhead of FIG. 20a;

DESCRIPTION OF SPECIFIC EMBODIMENTS

Figure 1:
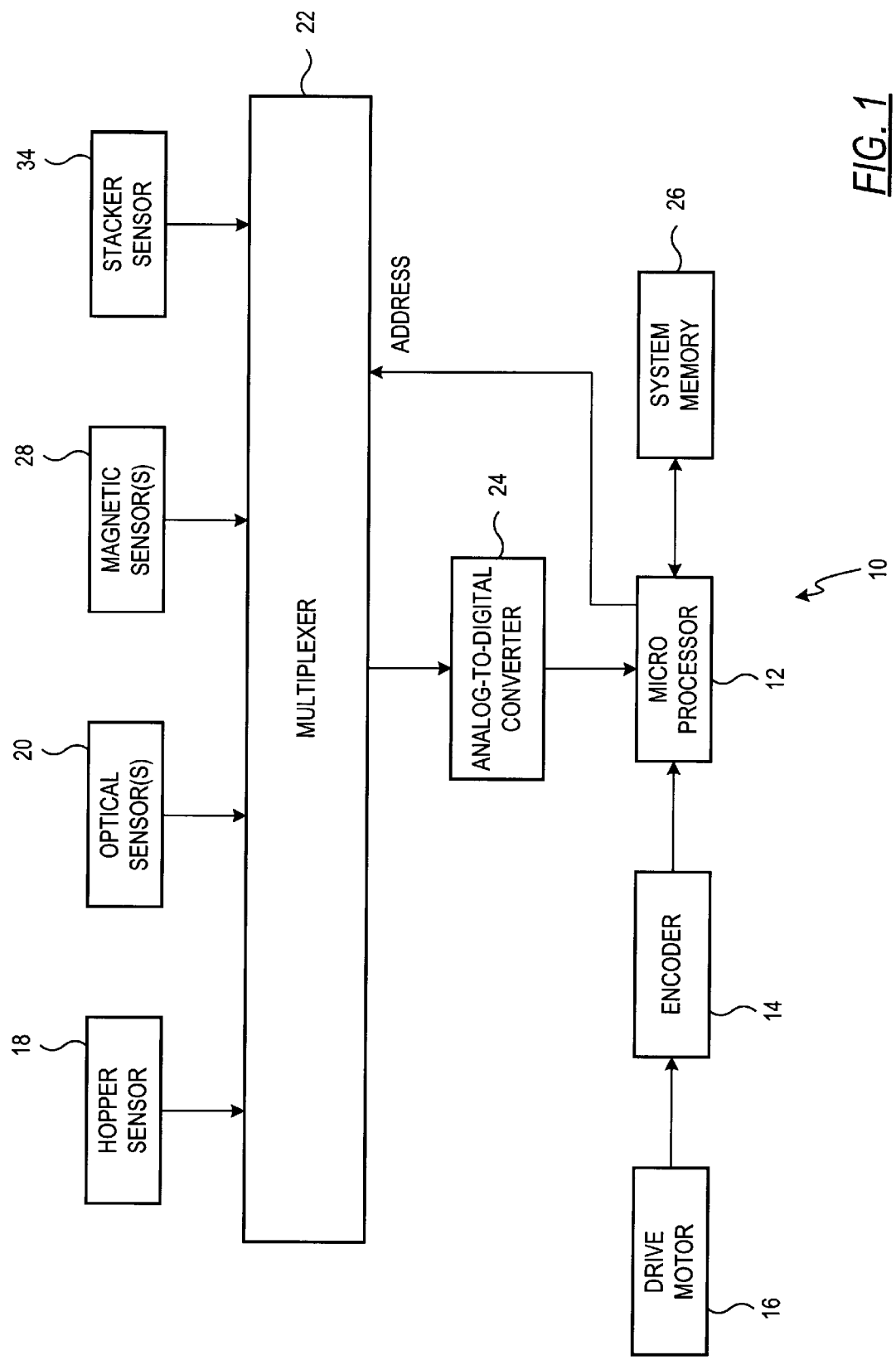
FIG. 1 is a block diagram of a currency handling system embodying principles of the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

Referring to the drawings, FIG. 1 shows a block diagram of a currency handling system 10 embodying principles of the present invention. A controller or processor such as a microprocessor 12 controls the overall operation of the currency handling system 10. It should be noted that the detailed construction of a mechanism to convey bills through the currency handling system 10 is not related to the practice of the present invention. Many configurations are well-known in the prior art. An exemplary configuration includes an arrangement of pulleys and rubber belts driven by a single motor, as shown in U.S. Pat. No. 5,295,196, assigned to the assignee of the present invention and incorporated herein by reference. An encoder 14 may be used to provide input to the microprocessor 12 based on the position of a drive shaft 16, which operates the bill-conveying mechanism. The input from the encoder 14 allows the microprocessor to calculate the position of a bill as it travels and to determine the timing of the operations of the currency handling system 10.

A stack of currency bills (not shown) may be deposited in a hopper 18 which holds the currency securely and allows the bills in the stack to be conveyed one at a time through the currency handling system 10. After the bills are conveyed by a transport mechanism, described below with reference to FIGS. 3a–b, 4 and 5, to the interior of the currency handling system 10, a portion of the bill may be optically or magnetically scanned by respective optical sensor(s) 20 and/or magnetic sensor(s) 28 of types commonly known in the art. The optical sensor(s) 20 generate signals that correspond to the amount of light reflected by (or transmitted through) all or part of the bill, while the magnetic sensor(s) 28 are designed to detect the amount or pattern of magnetic ink on all or part of the bill.

One form of currency handling system using optical sensors to detect patterns of light reflected from the surface of bill(s) is described in U.S. Pat. No. 5,687,963, entitled "Method and Apparatus for Discriminating and Counting Documents," incorporated herein by reference in its entirety. Another form of currency handling system using optical sensors to detect reflected ultraviolet light (UV) and emitted fluorescent light is described in U.S. Pat. Application. Ser. No. 08/494,091, filed Jun. 23, 1995, entitled "Currency Discriminator and Authenticator," assigned to the assignee of the present invention and incorporated herein by reference. A currency handling system using magnetic sensors is described in U.S. Pat. No. 5,295,196, assigned to the assignee of the present invention and incorporated herein by reference in its entirety.

Figure 2:
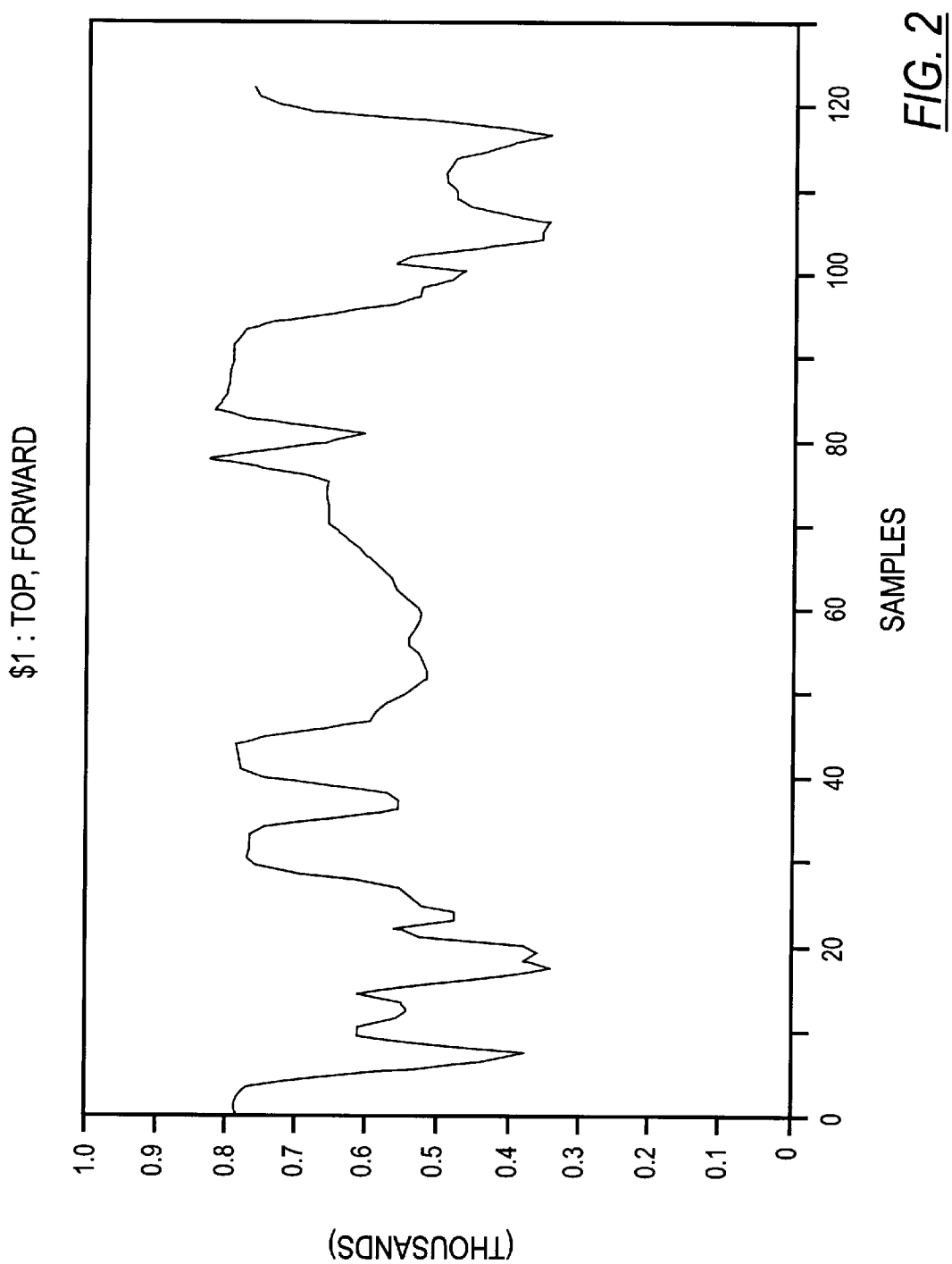
FIG. 2 is a graphical illustration of representative characteristic patterns generated by optical scanning of a U.S. $1 currency bill.

The fraction of bill that is scanned by the sensors 20, 28 may be less than the entire area of one side of the bill. The scanned area may be less than half, or even less than one quarter, of the area of one side of the bill. In the case of U.S. currency, for instance, it has been determined that scanning a central, approximately one-half-inch portion of either side of the bills, along the narrow dimension of the bills, provides reflectance data sufficient to distinguish among the various U.S. currency denominations. FIG. 2 is an example of a pattern obtained by optically scanning the "green" side of a U.S. $1 bill (using 64 reflectance samples) across this central half-inch section.

Signals from the optical or magnetic sensors 20, 28 (properly amplified) are sent to an analog-to-digital converter 24 via a multiplexer, 22. The output of the ADC is read by the microprocessor 12. The microprocessor 12 stores each element of data from the optical and/or magnetic sensors 20, 28 in a system memory 26, forming a set of data values corresponding to the optical and/or magnetic scan of the representative currency bills. The system memory 26 may comprise any combination of random access memory (RAM), read only memory (ROM), flash memory or any other memory type known in the art.

It will be appreciated that sensors other than magnetic and optical sensors may be used in the currency handling system 10. For example, other techniques of gathering test data from currency include electrical conductivity sensing, capacitive sensing (U.S. Pat. No. 5,122,754 [watermark, security thread]; U.S. Pat. No. 3,764,899 [thickness]; U.S. Pat. No. 3,815,021 [dielectric properties]; U.S. Pat. No. 5,151,607 [security thread]), and mechanical sensing (U.S. Pat. No. 4,381,447 [limpness]; U.S. Pat. No. 4,255,651 [thickness]). Each of the aforementioned patents and/or patent applications is incorporated herein by reference in its entirety.

The currency handling system 10 may be operated in a "standard" currency evaluation mode or in a "learn" mode. In the standard currency evaluation mode, the optical and/or magnetic data obtained by the optical and/or magnetic sensor(s) 20, 28 is compared by the microprocessor 12 to prestored master information stored in the system memory 26. The prestored master information corresponds to optical and/or magnetic data generated from genuine "master" currency of a plurality of denominations and/or types. Typically, the prestored data represents expected numerical values, ranges or patterns of numerical values associated with optical and/or magnetic scans of genuine currency. The master information may further represent various orientations and/or facing positions of genuine currency to account for the possibility of a bill in the stack being in a reversed orientation or reversed facing position compared to other bills in the stack. A currency handling system utilizing prestored master information is described in U.S. Pat. No. 5,295,196, incorporated herein by reference.

The currency handling system 10 may make a determination of authenticity or denomination of a bill under test by comparing test data obtained from scanning the test bill to master information stored in the system memory 26. The test data may comprise any of the several types of data identified above. The master information may comprise data associated with, generated and/or derived from "master" currency of a plurality of denominations and/or types. A determination of denomination of test bills may be made, for example, in a denomination discriminator by scanning test bills having an initially unknown denomination to obtain test data, then comparing the test data to prestored master information associated with a plurality of denominations of bills. The currency handling system 10 may determine in such comparison whether the test data sufficiently matches any item of master information corresponding to a particular bill. If there is a sufficient match, the currency handling system 10 may determine the denomination of the test bill to be the same as that associated with the matching master information.

In contrast, a typical counter is designed to accommodate a stack of bills having the same, predetermined denomination. A typical counter thereby does not determine the denomination of the bills under test, but determines the authenticity of the bills after having been informed of the denomination and/or type of the bills by an external signal or operator. The denomination of the bills under test may be communicated to the counter through an operator interface panel such as a keyboard or touchscreen, or through a remote host system linked to the currency handling system, such as that described in U.S. Pat. application Ser. No. 08/722,808, assigned to the assignee of the present invention and incorporated herein by reference in its entirety.

In addition to the denomination discriminators which can accurately call the denomination of bills being processed and note counters which do not discriminate the denomination of the bills being processed, another type of currency handling machine similar to the traditional note counter may employ rather crude means to determine the denomination of a bill. This type of machine, hereinafter designated an "enhanced note counter" or simply "enhanced counter," may include sensors sufficient to enable it to crudely discriminate the denomination of a bill and also sensors such as magnetic or optical sensors sufficient to enable it to discriminate between acceptable and non-acceptable bills (including counterfeit bills) in a stack of bills. For example, an enhanced counter may employ size detecting sensors to measure the length and/or width of a bill being processed. The enhanced counter may further comprise a memory storing master information indicating the sizes of different types of bills, for example, the sizes of different denominations of British pounds. If the measured size of the test bill sufficiently matches one of the stored master sizes, then the enhanced counter can make a preliminary determination of the denomination of the bill. The denomination determination test is rather crude because it simply indicates that the size of the document being processed matches one of the master sizes. Thus, a blank piece of paper cut to appropriate size would satisfy such a crude test. Hence, such an enhanced note counter may not provide sufficient testing to be relied on to call the denomination and type of processed documents in all currency processing contexts but nonetheless may prove useful for certain currency processing contexts. Additionally, such crude denomination systems may be employed in conjunction with denomination discriminators whereby a crude determination of the denomination is initially made and then further denomination discrimination is performed using the results of the crude denomination determining step.

Figure 6:
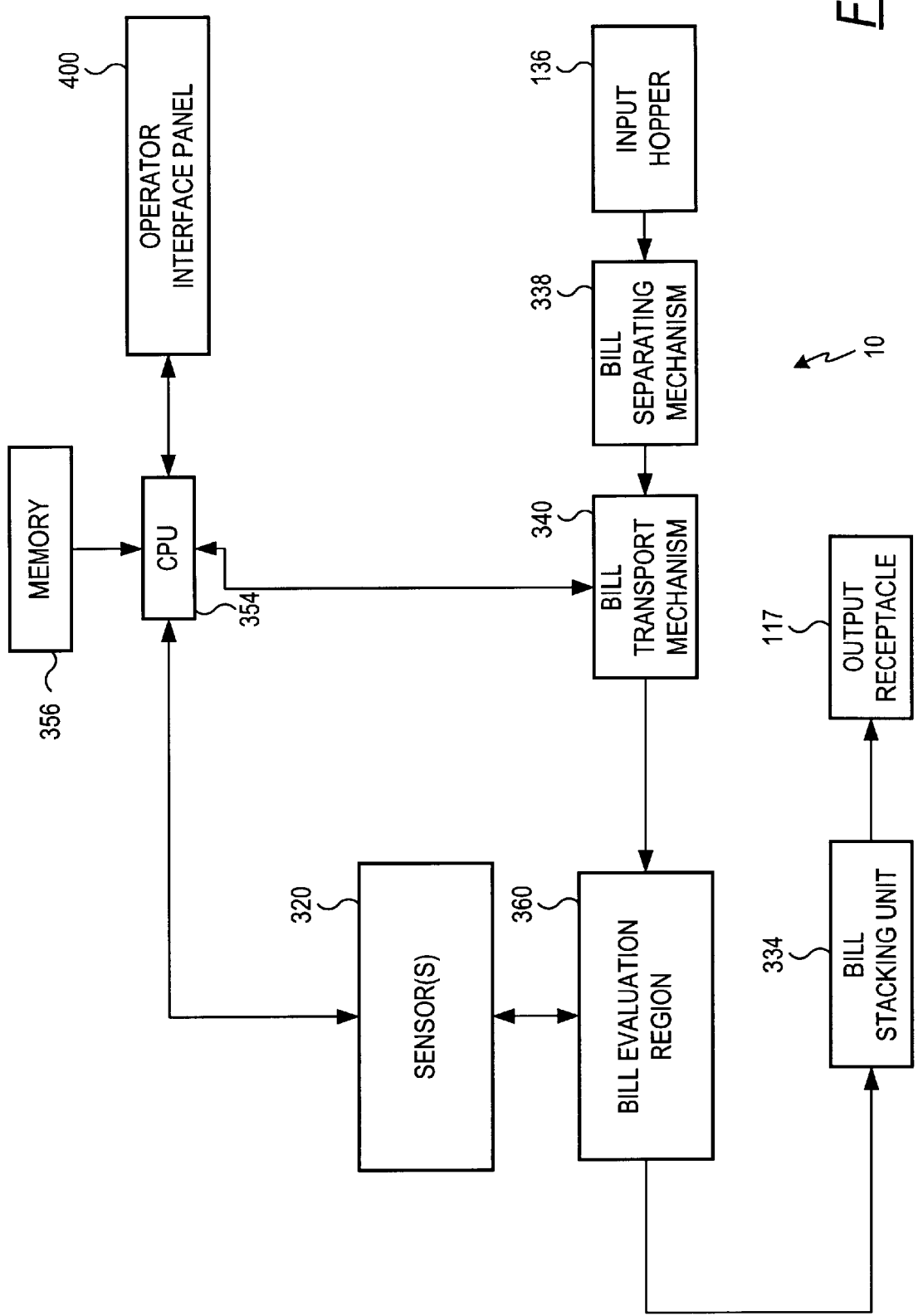
FIG. 6 is a block diagram similar to FIG. 1 showing other aspects of the system.

Referring now to FIG. 6, a block diagram of the currency handling system 10 according to another embodiment of the present invention is illustrated. A central processing unit (CPU) 354 comprising a microprocessor controls the overall operation of the currency handling system 10. After the bills are conveyed to the interior of the currency handling system 10, a portion of the bill may be sensed or the bill may be counted using one or more of the commonly known sensors 320. The sensor(s) 320 generate electrical signals that correspond to a characteristic of the bill. The signals are sent to the CPU 354. The CPU 354 stores the data from the sensor(s) 320 in a range of memory locations in a memory 356, forming a set of data values corresponding to the characteristic(s) detected from the currency bill. In this way, the bill may be authenticated, counted and/or otherwise processed. In one embodiment, the currency handling system 10 is capable of transporting, processing, and determining the authenticity of bills at a high speed including rates in excess of 800 to 1600 bills per minute.

The currency handling system 10 may include several modes of operation such as set-up mode, standard mode and/or learn mode. The standard mode comprises a count mode and a value mode. Furthermore, when authentication tests are to be performed, the system additionally operates in an authentication mode. Briefly, in the set-up mode, a technician selects, for example, the currency types that the system 10 will accommodate, the audio alarm parameters, the key status parameters, etc. For example, where currency is processed, the set-up mode permits the technician to define, for example, default currency types and denominations and default authentication test(s) for each type of currency system and denomination.

In standard mode, system software enables the operator to select various operating parameters for the currency handling system 10. The operating parameters may include, for example, the type of document to be processed, the type of authentication test(s), if any, to be performed, the sensitivity of such test(s), the transport speed, the display language, the mode of operation, default settings, etc. The system 10, in standard mode, compares data detected from processed documents to prestored master information stored in memory that corresponds to characteristic(s) or attribute(s) of authentic documents which may include authentic documents from a plurality of currency systems and/or denominations. The standard mode also permits the operator to select batching, sub-batching and/or audio alarms for error conditions.

Count mode allows the currency handling system 10 to count bills, or other documents, of a plurality of types and/or denominations. Denominational information is not used. Total information indicates the number of documents processed but not the total value of those documents. In value mode, a total value can be calculated using the denominational information received from the operator or determined by the system.

Authentication mode allows the system 10 to authenticate the documents being processed by performing one or more authentication tests on the document. Learn mode allows the system 10 to detect and store data corresponding to attribute (s) of processed documents so the stored data may be used as master information for the processing of subsequent documents in standard mode.

In one embodiment of this invention, the currency handling system 10 operates in normal mode. In normal mode, the sensor(s) 320 are used to detect the passage of documents or bills along the transport mechanism. The sensor(s) 320 may include, for example, optical sensors that detect transmitted light. For example, the sensor(s) 320 may comprise a light source positioned on one side of the transport path and a photodetector positioned on the opposite side of the transport path such that the light beam from the light source is interrupted by the passing bills, thus indicating that bills are passing by the sensor(s) 320.

In operation, currency bills to be evaluated (in standard mode) or from which master information will be generated (in learn mode) are positioned in the input hopper 136. The bills are acted upon by a bill separating mechanism 338 which functions to pick out or separate one bill at a time from the stack. The bills are then sequentially relayed by a bill transport mechanism 340, along a transport path, past one of more of the sensor(s) 320. The sensor(s) are designed to count and/or detect characteristic(s) from the bills which may be used to authenticate the bills. In the embodiment shown in FIG. 6, the sensor(s) 320 are disposed along the bill transport path in the bill evaluation region 360. After passing the sensor(s) 320, each of the bills is transported to a "pocket" or output receptacle 117 for receiving the bills, the output receptacle including a bill stacking unit 335.

A typical note counter is designed to accommodate a stack of bills having the same, pre-designated denomination. A note counter therefore does not typically determine the denomination of the bills under test. Rather, the system 10 must be informed of the denomination of the bills. However, in some embodiments, the system 10 can determine the denomination of bills and count mixed denominations of currency using the size sensors to determine the denomination of the currency for currency having denominations of differing sizes. Generally, though, the denomination of the bills to be processed is communicated to the system 10 through an operator interface panel such as a selector switch, keypad, keyboard, or touch-screen, or through a remote host system linked to the currency handling system or through a remote cash settlement machine. Such a remote host system is described in U.S. Pat. Application Ser. No. 08/722,808, filed Sep. 27, 1996, entitled "Currency Handling Apparatus that Communicates with an External Device." Such a remote cash settlement machine is described in U.S. Pat. Application Ser. No. 08/467,585, filed Jun. 06, 1995, entitled "Cash Settlement Machine." Both of these patent applications are assigned to the assignee of the present invention and are incorporated herein by reference in their entirety.

Figure 7:
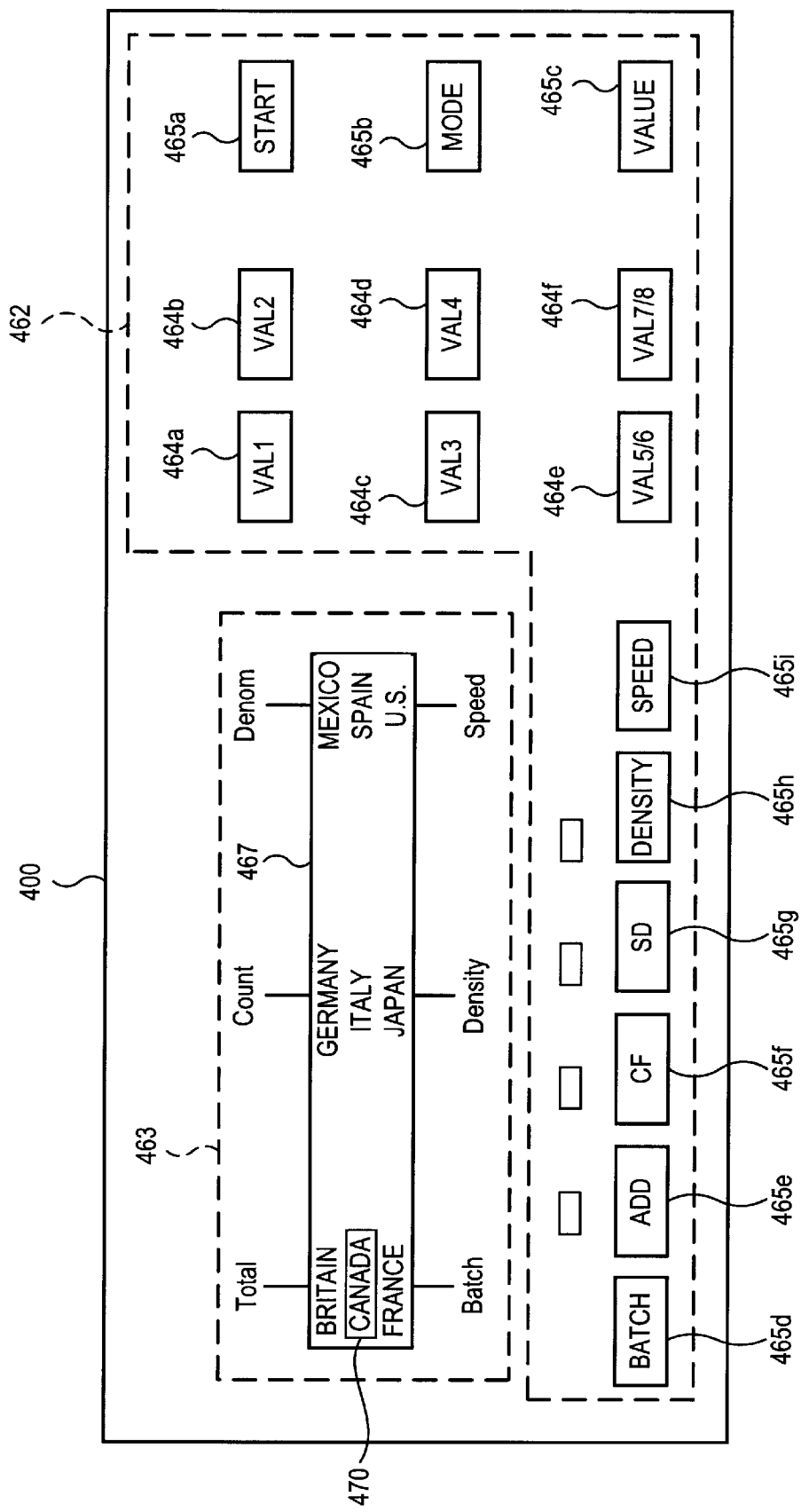
FIG. 7 is a simplified plan view of a control panel for the system of the invention.

According to one embodiment of the present invention, an operator interface panel 400 (see FIG. 7) allows the operator of the currency handling system 10 to select operating parameters including, for example, the mode of operation, the authentication test(s) to be performed, the type of currency system with which the bills are associated, the denomination of the bills, the display language, the currency symbol, the sensitivity of the authentication test(s), the currency size, the transport speed, and/or the alignment of the sensor(s).

According to one embodiment, after the type of currency system and denomination of the bills to be processed have been entered by the operator, several other operating parameters may be determined. These parameters can be determined automatically by the system or entered manually by the operator. Where the parameters are automatically determined, the operator interface panel displays the operating parameters corresponding to the selected currency type and denomination. Where the other operating parameters are manually entered by the operator, the operator interface panel provides appropriate selection elements for selecting the parameters and displays the selected operating parameters.

In one embodiment, the operator interface panel allows the operator to enter the operating parameters into the system 10. The operating parameters to be entered may be selected from menus containing the required operating parameters. For example, the type of currency system to be processed can be selected from among a list of available types of currency systems such as: U.S., British, Japanese, German, French and Canadian. The denomination to be processed can be selected from among a list of available denominations corresponding to the type of currency system selected. The display language can be selected from among a plurality of international languages such as English, Japanese, German, French and Spanish. The currency symbol can be selected from among a plurality of international currency symbols such as: the U.S. dollar sign ($), the British pound sign (£), the Japanese yen sign (¥), the German deutsche mark sign (DM) and the Canadian dollar sign ($). Likewise, the other operating parameters may be manually selected from lists of available options.

Heretofore, the master information used in evaluating currency in "standard" mode has been generated externally to the currency handling system 10. The master information is typically programmed at a factory or service center into a memory device such as an EPROM (or EEPROM), then installed in the machine or shipped to the user for installation in the machine. Consequently, the ability of currency handling machines known in the art to discriminate or authenticate particular types and/or denominations of currency is dependent on the content of their associated memory device. The memory devices must therefore be appropriately encoded to correspond to the intended market in which they will be used. For example, a memory device to be used in a machine for discriminating U.S. currency must be encoded with master information corresponding to the magnetic or optical characteristics of U.S. currency, while a memory device used in a machine designated for foreign markets must be encoded with master information corresponding to the magnetic or optical characteristics of the appropriate foreign currency(s). A machine having a memory device encoded with master information appropriate to one market will generally be unable to accommodate currency from another market because it has not been encoded with the appropriate master information for that other market.

In the "learn" mode, the present invention is designed to overcome the problems associated with the prior art by permitting the currency handling system 10 to generate the necessary master information independently, without having been pre-programmed with such master information. According to one embodiment, in each operation of the learn mode, at least one representative "master" currency bill of a designated currency denomination and type is deposited in the hopper 18 and fed through the system 10 as described above. While a stack of "master" bills may be used to "learn" density, UV and magnetic characteristics, usually a single bill is used to "learn" the reflectance characteristics. The denomination and/or type of the master currency bill(s) may be initially unrecognizable to the currency handling system 10. As the master currency bills are conveyed through the currency handling system 10, they are scanned by one or more discrimination and/or authentication sensors and master information corresponding to the scan of the master bills is stored in a system memory 26. With each operation of the learn mode, the system memory increases its store of master information. Thus, where the system memory 26 initially stores a first set of master information (e.g., associated with U.S. currency), the learn mode may be executed to learn new series of bills (e.g., new series of U.S. $50 bills), currency from other countries or specialized currency such as might be used by a casino, amusement park or the like. Regardless of the type of currency which is learned, the master information obtained in learn mode will supplement, rather than replace the first set of master information. The master information is available for recall from the memory 26 for subsequent comparison to test data obtained from bills to be denominated and/or authenticated by the currency handling system 10 in "standard" mode.

In the embodiment shown in FIG. 1, the sensors comprise optical and magnetic sensors 20, 28. The attributes of a bill for which data may be obtained from magnetic sensing include, for example, patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

The attributes of a bill for which data may be obtained from optical sensing include, for example, density (U.S. Pat.

No. 4,381,447), color (U.S. Pat. Nos. 4,490,846; 3,496,370; 3,480,785), length and thickness (U.S. Pat. No. 4,255,651), the presence of a security thread (U.S. Pat. No. 5,151,607) and holes (U.S. Pat. No. 4,381,447), reflected or transmitted intensity levels of UV light (U.S. Pat. application Ser. No. 08/317,349) and other patterns of reflectance and transmission (U.S. Pat. Nos. 3,496,370; 3,679,314; 3,870,629; 4,179,685). Color detection techniques may employ color filters, colored lamps, and/or diachronic beamsplitters (U.S. Pat. Nos. 4,841,358; 4,658,289; 4,716,456; 4,825,246, 4,992,860 and EP 325,364).

Alternatively or additionally, a variety of other sensors may be utilized to process currency to obtain master information or test data including, for example, electrical conductivity sensors, capacitive sensors (U.S. Pat. No. 5,122,754 [watermark, security thread]; U.S. Pat. No. 3,764,899 [thickness]; U.S. Pat. No. 3,815,021 [dielectric properties]; U.S. Pat. No. 5,151,607 [security thread]), and mechanical sensors (U.S. Pat. No. 4,381,447 [limpness]; U.S. Pat. No. 4,255,651 [thickness]). Each of the aforementioned patents and/or patent applications is incorporated herein by reference in its entirety.

According to one embodiment of the present invention, the master information comprises numerical data associated with various denominations of currency bills. This numerical data may include bill dimensions (length and width) as well as reflectance data and the like, as described above. The numerical data may comprise, for example, thresholds of acceptability to be used in evaluating test bills, based on expected numerical values associated with the currency or a range of numerical values defining upper and lower limits of acceptability. The thresholds may be associated with various sensitivity levels. Alternatively, the master information may comprise non-numerical information associated with the currency such as, for example, optical or magnetic patterns, symbols, codes or alphanumeric characters. In either case, the master information comprises internally generated parameters which may be used in evaluating test bills in the same manner described above in relation to the standard mode of operation.

Master information may be obtained in the learn mode from any of several currency denominations and/or types. The learn mode may be repeated in successive trials to accumulate master information from multiple currency denominations and/or types. For example, in a first operation of the learn mode, master currency bills of a first currency denomination and type may be conveyed through the currency handling system 10 and processed to obtain master information associated with the first currency denomination and type, which may then be stored in the system memory 26. Then, in a second operation of the learn mode master currency bills of a second currency denomination and type may be conveyed through the currency handling system 10 and processed to obtain master information associated with the second currency denomination and type, which also may be stored in the system memory 26. This process may be repeated several times to obtain master information associated with multiple denominations and types of currency. The information associated with each of the currency denominations and types is stored in system memory 26 for recall in "standard" mode, as heretofore described.

The specific denominations and types of currency from which master information may be expected to be obtained for any particular machine 10 will generally depend on the market in which the machine 10 is used (or intended to be used). In European market countries, for example, with the advent of Euro currency (EC currency), it may be expected that both EC currency and a national currency will circulate in any given country. In Germany, for a more specific example, it may be expected that both EC currency and German deutsch marks (DMs) will circulate. With the learn mode capability of the present invention, a German operator may obtain master information associated with both EC and DM currency and store the information in system memory 26.

Of course, the "family" of desirable currencies for any particular machine 10 or market may include more than two types of currencies. For example, a centralized commercial bank in the European Community may handle several types of currencies including EC currency, German DMs, British Pounds, French Francs, U.S. Dollars, Japanese Yen and Swiss Francs. In like manner, the desirable "family" of currencies in Tokyo, Hong Kong or other parts of Asia may include Japanese Yen, Chinese Remimbi, U.S. Dollars, German DMs, British Pounds and Hong Kong Dollars. As a further example, a desirable family of currencies in the United States may include the combination of U.S. Dollars, British Pounds, German DMs, Canadian Dollars and Japanese Yen. With the learn mode capability of the present invention, master information may be obtained from any denomination of currency in any desired "family" by simply repeating the learn mode for each denomination and type of currency in the family.

This may be achieved in successive operations of the learn mode by running currency bills of the designated family, one currency denomination and type at a time, past the sensors of the system 10 to obtain the necessary master information. The currency bills may be fed individually through the system 10 or in stacks of the designated denomination and/or type, depending on the type of characteristics to be "learned," as noted above. The number of bills fed through the system may thereby be as few as one bill, or may be several bills. The bill(s) fed through the system may include good quality bill(s), poor quality bill(s) or both. The master information obtained from the bills defines (or may be processed to define) thresholds, ranges of acceptability or patterns of bills of the designated denomination and type which are later to be evaluated in "standard" mode.

For example, suppose a single good quality bill of a designated denomination and type is fed through the system 10 in learn mode. The master information obtained from the bill may be processed to define a range of acceptability for bills of the designated denomination and type. For instance, the master information obtained from the learn mode bill may define a "center" value of the range, with "deltas," plus or minus the center value being determined by the system 10 to define the upper and lower bounds of the range. Alternatively, a range of acceptability may be obtained by feeding a stack of bills through the system 10, each bill in the stack being of generally "good" quality, but differing in degree of quality from others in the stack. In this example, the average value of the notes in the stack may define a "center value" of a range, with values plus or minus the center value defining the upper and lower bounds of the range, as described above. Alternatively, other statistical analysis may be employed to define thresholds, patterns or ranges, such as standard deviation information being used to define upper and lower bounds of the range.

In another embodiment, master information obtained from the poorest quality of the learn mode bills may be used to define the limits of acceptability for bills of the designated denomination and type, such that bills of the designated denomination and type evaluated in standard mode will be accepted if they are at least as "good" in quality as the poorest quality of the learn mode bills. Still another alternative is to feed one or more poor quality bills through the system 10 to define "unacceptable" bill(s) of the denomination and type, such that bills of the designated denomination and type evaluated in standard mode will not be accepted unless they are better in quality than the poor quality learn mode bills.

Because the currency bills are initially unrecognizable to the currency handling system 10 in the learn mode, the operator must generally inform the system 10 (by means of operator interface panel or external signal, for example) which denomination and type of currency it is "learning," and whether it is learning a good quality (e.g., "acceptable") or poor quality (e.g., "marginally acceptable" or "unacceptable") bill so that the system 10 may correlate the master information it obtains (and stores in memory) with the appropriate denomination, type and acceptability status of the bill(s).

In one embodiment, various menu displays may be utilized at the operator interface panel to prompt the operator to enter the country, denomination and/or series of the currency to be "learned" in learn mode. The learn mode menu may also prompt the operator to select the type of tests to perform in learn mode.

The available selection options in the menu may be pre-determined "default" settings or customizable settings programmed into the system 10 in a set-up mode. In one embodiment, for example, a country selection sub-menu may offer United States, Canada and Mexico as country selection options, a denomination selection sub-menu may offer the units 1, 2, 3, 4, 5, 10, 20, 50 and 100 as denomination selection options, a series selection sub-menu may offer the units 1, 2 and 3 as series selection options, and a test selection menu may offer optical pattern, UV, magnetic, thread detection, size detection and color as test selection options.

In one embodiment, user-defined labels and settings may be entered into the system 10 to accommodate new countries, types or denominations of currency. The operator may enter labels and selection options appropriate to the new type of currency through the learn mode menu, or may define a tailored learn mode menu appropriate to the new currency in a set-up mode of the machine. The available menu selection options may include denomination selection options and test selection options as heretofore described. The user-defined option may be used, for example, where a machine 10 will be instructed to learn a specialized form of currency, such as might be used by a casino, amusement park, or the like. In such case, rather than selecting a country, the operator may enter a label (e.g., Skyline casino) identifying the type of money via keyboard, touchscreen, or other appropriate means. Then, the operator may select the denomination(s) and/or series of the currency to be learned, and perhaps the test(s) to be performed, through the learn mode menu as heretofore described.

The user may select from among the available menu or sub-menu options by "clicking" over an appropriate icon, pressing a touch screen or some other means. The denomination, series and/or test selection menus may offer selection options tailored to the country or denominations which have been selected. Thus, for example, where the United States has been selected in the country selection menu, the denomination selection menu may offer $1, $5, $10, $20, $50 and $100 as available denomination selection options and the test selection menu may offer optical pattern, UV, magnetic, and thread detection as test selection options. Similarly, where the United States has been selected in the country selection menu and $50 has been selected in the denomination selection menu, the series selection menu may offer "1998−" and "1998+" (or "old" and "new") as available series selection options.

For purposes of illustration, suppose that an operator desires to obtain master information for new series $50 U.S. bills. In one embodiment, this may be achieved by first instructing the machine 10, by means of an operator interface panel or external signal, to enter the learn mode and then, through the appropriate menu(s), selecting a country, denomination and series of currency to be learned (e.g., "United States," "$50," "1998+"). Through the test selection menu, the operator may instruct the machine 10 which type of test(s) to perform to obtain the master information. The operator may then insert a single good-quality bill of the selected denomination and type (or a number of such bills) in the hopper 18. The machine 10 feeds the bill(s) through the system and evaluates the bills with sensors appropriate to the selected test(s) to obtain master information associated with the bills. The master information is stored in the system memory and is retrievable for later use in standard mode to denominate and/or authenticate bills corresponding to the learned denomination.

Where a single bill is fed through the system 10, suppose that an arbitrary value "x" is obtained (or derived) from the learn mode sensors. The system 10 may define the value "x" to be a center value of an "acceptable" range for $50 dollar 1998 series U.S. bills. The system 10 may further define the values "x+y" and "x−y" to comprise the upper and lower bounds of the "acceptable" range for $50 dollar 1998 series U.S. bills, where y is a tolerance value appropriate to the type of test. An appropriate value of y may be derived in relation to the value x (e.g., in terms of standard deviation) or may be independent of x. The value of y may differ according to the type of test employed and the different results which may be expected from the tests. For example, for two tests A and B, an appropriate value of y may be 0.1 volts for test A and 0.01 volts for test B.

In such an embodiment, when test A is employed and a single $50 dollar 1998 series U.S. bill is fed through the system 10, suppose that the value "x" obtained or derived from the learn mode sensors is 0.5 volts. Then, the system 10 would define the values 0.6 (0.5+0.1) and 0.4 (0.5−0.1) to be the upper and lower bounds of acceptability for $50 dollar 1998 series U.S. bills evaluated in standard mode under test A.

Alternatively, especially where the bills to be "learned" have been subject to varying degrees of circulation, the ranges of acceptability may be derived from an average sensor value obtained from multiple bills. Suppose, for example, an operator wishes to teach the machine 10 master information associated with U.S. $5 dollar bills. The user may feed multiple $5 dollar bills, each bill being of generally "good" quality but having been subject to varying degrees of circulation, through the system 10, (and again using the arbitrary sensor value "x" for purposes of illustration), suppose that the average sensor value obtained from the bills is "1.1x". The system may define the "acceptable" range for $5 dollar U.S. bills to be centered at the average sensor value "1.1x," with a tolerance value "y" substantially as described above defining in this case an upper bound "1.1x+y" and a lower bound "1.1x−y" of acceptability. If the value x is 0.5 volts, as in the above example, then the upper bound would be 0.65 volts [(1.1)×(0.5)+0.1] and the lower bound would be 0.45 volts [(1.1)×(0.5)−0.1].

As a further alternative, where multiple bills (e.g., $5 dollar U.S. bills) are fed through the system 10, suppose that sensor values obtained in the learn mode range between "1.4x" and "0.9x" (or, between 0.7 volts and 0.45 volts, assuming x is 0.5 volts). In this embodiment, the system 10 may define 0.7 volts and 0.45 volts to be the upper and lower bounds of the "acceptable range" for $50 dollar 1998-series U.S. bills, without regard to the average value.

According to one embodiment, the operator includes in the stack of master currency to be processed both new, uncirculated currency and bills which have been in circulation to varying degrees. In this embodiment, bills of the poorest quality may be fed through the system to define the outer limits of acceptability of the bills. For example, suppose that the operator feeds two poor quality U.S. $5 dollar bills through the system 10, and suppose that sensor readings of "1.5x" and "0.7x" (0.75 volts and 0.35 volts, assuming x is 0.5 volts) are obtained from the poor quality bills. The system 10 may then determine the range of acceptability for U.S. $5 dollar bills to be between the values of 0.75 volts and 0.35 volts.

Next, after master information has been obtained from the first denomination and type of currency (e.g., U.S. $5 dollar bills), the operator instructs the system 10 that it will be reading a second, third, fourth, etc. denomination and type of currency (e.g., $10 denominations of U.S. currency, $5 and $10 denomination of Canadian currency, etc.), then feeds the respective bill(s) through the system 10 to obtain master information and derive thresholds of acceptability from the bills, in any of the manners heretofore described. The operator may select which type of tests and/or sensor(s) that should be used to obtain the master information through a learn mode selection menu. For example, an operator may wish to use optical and magnetic sensors for U.S. currency and only optical sensors for Canadian currency. After the operator has obtained master information from each desired currency denomination and type, the operator instructs the system 10 to enter "standard" mode, or to depart the "learn" mode. The operator may nevertheless re-enter the learn mode at a subsequent time to obtain master information from other currency denominations, types and/or series.

It will be appreciated that the master information obtained in "learn" mode is not limited to ranges of values as described in the examples above. Rather, the master information may comprise pattern information, numerical thresholds other than ranges, or generally any type of information which may be obtained by the learn mode sensors.

The sensors used to obtain master information in learn mode (or, the "learn mode" sensors) may be either separate from or the same as the sensors used to obtain data in standard mode (or, the "standard mode" sensors). Where the sensors are the same in both learn mode and standard mode, the sensors constitute "dual-function" sensors (e.g., operable as both a "learn mode" sensor and a "standard mode" sensor).

According to one embodiment of the present invention, a master pattern for a given denomination is generated by averaging a plurality of component patterns. Each component pattern is generated by scanning a genuine bill of the given denomination.

According to a first method, master patterns are generated by scanning a standard bill a plurality of times, typically three (3) times, and obtaining the average of corresponding data samples before storing the average as representing a master pattern. In other words, a master pattern for a given denomination is generated by averaging a plurality of component patterns, wherein all of the component patterns are generated by scanning a single genuine bill of "standard" quality of the given denomination. The "standard" bill is a slightly used bill, as opposed to a crisp new bill or one which has been subject to a high degree of usage. Rather, the standard bill is a bill of good to average quality.

According to a second method, a master pattern for a given denomination is generated by scanning two or more standard bills of standard quality and obtaining a plurality of component patterns. These component patterns are then averaged in deriving a master pattern. For example, it has been found that some genuine $5 bills have dark stairs on the Lincoln Memorial while other genuine $5 bills have light stairs. To compensate for this variation, standard bills for which component patterns are derived may be chosen with at least one standard bill scanned having dark stairs and with at least one standard bill having light stairs.

It has been found that an alternate method can lead to improved performance in a discrimination systems, especially with regards to certain denominations. For example, it has been found that the printed indicia on a $10 bill has changed slightly with 1990 series bills incorporating security threads. More specifically, 1990 series $10 bills have a borderline-to-borderline dimension which is slightly greater than previous series $10 bills. Likewise it has been found that the scanned pattern of an old, semi-shrunken $5 bill can differ significantly from the scanned pattern of a new $5 bill.

According to a third method, a master pattern for a given denomination is generated by averaging a plurality of component patterns, wherein some of the component patterns are generated by scanning one or more new bills of the given denomination and some of the component patterns are generated by scanning one or more old bills of the given denomination. New bills are bills of good quality which have been printed in recent years and have a security thread incorporated therein (for those denominations in which security threads are placed). New bills are preferably relatively crisp. A new $10 bill is preferably a 1990 series or later bill of very high quality, meaning that the bill is in near mint condition. Old bills are bills exhibiting some shrinkage and often some discoloration. Shrinkage may result from a bill having been subjected to a relatively high degree of use. A new bill utilized in this third method is of higher quality than a standard bill of the previous methods, while an old bill in this third method is of lower quality than a standard bill.

The third method can be understood by considering Table 1 which summarizes the manner in which component patterns are generated for a variety of denominations.

TABLE 1

Component Scans by Denomination

| Denomination | Scan Direction | CP1 | CP2 | CP3 |
|---|---|---|---|---|
| $1 | Forward | −0.2 std | 0.0 std | +0.2 std |
| $1 | Reverse | −0.2 std | 0.0 std | +0.2 std |
| $2, left | Forward | −0.2 std | −0.15 std | −0.1 std |
| $2, left | Reverse | −0.2 std | −0.15 std | −0.1 std |
| $2, right | Forward | 0.0 std | +0.1 std | +0.2 std |
| $2, right | Reverse | 0.0 std | +0.1 std | +0.2 std |
| $5 | Forward | −0.2 old (lt str) | 0.0 new (dk str) | +0.2 old (lt str) |
| $5 | Reverse | −0.2 old (lt str) | 0.0 new (dk str) | +0.2 old (lt str) |
| $10, left | Forward | −0.2 old | −0.1 new | 0.0 old |
| $10, left | Reverse | 0.0 old | +0.1 new | +0.2 old |
| $10, right | Forward | +0.1 new | +0.2 new | +0.3 old |
| $10, right | Reverse | −0.2 old | −0.15 new | −0.1 old |

TABLE 1-continued

Component Scans by Denomination

| Denomination | Scan Direction | CP1 | CP2 | CP3 |
|---|---|---|---|---|
| $20 | Forward | −0.2 old | 0.0 new | +0.2 old |
| $20 | Reverse | −0.2 old | 0.0 new | +0.2 old |
| $50 | Forward | −0.2 std | 0.0 std | +0.2 std |
| $50 | Reverse | −0.2 std | 0.0 std | +0.2 std |
| $100 | Forward | −0.2 std | 0.0 std | +0.2 std |
| $100 | Reverse | −0.2 std | 0.0 std | +0.2 std |

Table 1 summarizes the position of the scanhead relative to the center of the green surface of United States currency as well as the type of bill to be scanned for generating component patterns for various denominations. The three component patterns ("CP") for a given denomination and for a given scan are averaged to yield a corresponding master pattern. The eighteen (18) rows correspond to the preferred method of storing eighteen (18) master patterns. The scanhead position is indicated relative to the center of the borderlined area of the bill. Thus a position of "0.0" indicates that the scanhead is centered over the center of the borderlined area of the bill. Displacements to the left of center are indicated by negative numbers, while displacements to the right are indicated by positive numbers. Thus a position of "−0.2" indicates a displacement of $2/10$ths of an inch to the left of the center of a bill, while a position of "+0.1" indicates a displacement of $1/10$ths of an inch to the right of the center of a bill.

Accordingly, Table 1 indicates that component patterns for a $20 bill scanned in the forward direction are obtained by scanning an old $20 bill $2/10$ths of a inch to the right and to the left of the center of the bill and by scanning a new $20 bill directly down the center of the bill. In generating the master patterns, one may use a scanning device in which a bill to be scanned is held stationary and a scanhead is moved over the bill. Such a device permits the scanhead to be moved laterally, left and right, over a bill to be scanned and thus permits the scanhead to be positioned over the area of the bill which one wishes to scan, for example, $2/10$ths of inch to the left of the center of the borderlined area.

As discussed above, for $10 bills two patterns are obtained in each scan direction with one pattern being scanned slightly to the left of the center and one pattern being scanned slightly to the right of the center. For $5 bills, it has been found that some $5 bills are printed with darker stairs ("dk str") on the picture of the Lincoln Memorial while others are printed with lighter stairs ("lt str"). The effect of this variance is averaged out by using an old bill having light stairs and a new bill having dark stairs.

As can be seen from Table 1, for some bills, the third method of using old and new bills is not used; rather, a standard ("std") bill is used for generating all three component patterns as with the first method. Thus, the master pattern for a $1 bill scanned in the forward direction is obtained by averaging three component patterns generated by scanning a standard bill three times, once $2/10$ths of an inch to the left, once down the center, and once $2/10$ths of an inch to the right.

As illustrated by Table 1, a discrimination system may employ a combination of the developed methods of this invention wherein, for example, some master patterns are generated according the first method and some master patterns are generated according to the third method. Likewise, a discrimination system may combine the scanning of new, standard, and old bills to generate component patterns to be averaged in obtaining a master pattern. Additionally, a discrimination system may generate master patterns by scanning bills of various qualities and/or having various characteristics and then averaging the resultant patterns. Alternatively, a discrimination system may scan multiple bills of a given quality for a given denomination, e.g., three new $50 bills, while scanning one or more bills of a different quality for a different denomination, e.g., three old and worn $1 bills, to generate component patterns to be averaged in obtaining master patterns.

In one embodiment of the invention, when master characteristic patterns are being generated, the reflectance samples resulting from the scanning of a standard bill are loaded into corresponding designated sections within the system memory 26, which may be an EPROM (or EEPROM). The loading of samples may be accomplished through a buffered address latch (not shown), if necessary. In this embodiment, master patterns are generated by scanning a standard bill a plurality of times, typically three (3) times, and obtaining the average of corresponding data samples before storing the average as representing a master pattern. During currency discrimination, the reflectance values resulting from the scanning of a test bill are sequentially compared, under control of the correlation program stored within a memory unit, with each of the corresponding characteristic patterns stored within the EPROM (or EEPROM), through the address latch.

Further details of various optical sensing (and correlation) techniques, a bill handling apparatus and optical scanheads which may be used in the system of the invention are shown in the above-referenced U.S. Pat. Nos. 5,295,196, 5,652,802 and 5,692,067 and also in U.S. Pat. Nos. 5,633,949 and 5,724,438; and U.S. Pat. Application Ser. Nos. 08/340,031 and 08/399,854, all of which are incorporated by reference.

This optical sensing and correlation technique permits identification of pre-programmed currency denominations with a high degree of accuracy and is based upon a relatively low processing time for digitizing sampled reflectance values and comparing them to the master characteristic patterns. The approach is used to scan currency bills, normalize the scanned data and generate master patterns in such a way that bill scans during operation have a direct correspondence between compared sample points in portions of the bills which possess the most distinguishable printed indicia. A relatively low number of reflectance samples is required in order to be able to adequately distinguish between several currency denominations.

A major advantage with this approach is that it is not required that currency bills be scanned along their wide dimensions. Further, the reduction in the number of samples reduces the processing time to such an extent that additional comparisons can be made during the time available between the scanning of successive bills. More specifically, as described above, it becomes possible to compare a test pattern with two or more stored master characteristic patterns so that the system is made capable of identifying currency which is scanned in the "forward" or "reverse" directions along the green surface of the bill.

Learn Mode

In some embodiments, the currency handling system 10 determines the authenticity of a bill by comparing characteristic(s) or attribute(s) of the bill to corresponding master information. In prior currency handling systems, the master information used in evaluating currency bills is typically programmed at a factory or service center into a memory device such as an EPROM (or EEPROM) or flash card, then installed in the system or shipped to the user for installation in the system. Consequently, the ability of these prior currency handling systems to authenticate particular types and/or denominations of currency is dependent on the content of their associated memory device. The memory devices must therefore be appropriately programmed with the type(s) of currency system(s) the currency handling systems are intended to handle. For example, a memory device to be used in a system for processing U.S. currency must be programmed with master information corresponding to the characteristic(s) of U.S. currency, while a memory device used in a system designated for foreign currency systems must be programmed with master information corresponding to the characteristic(s) of the appropriate foreign currency system(s). A system having a memory device programmed with master information appropriate to one type of currency system will generally be unable to accommodate currency from another type of currency system because it typically has not been programmed with the appropriate master information for that other type of currency system.

In some embodiments, the currency handling system 10 is capable of operating in a learn mode. In learn mode, master information is generated by the currency handling system 10 itself by processing one or more bills. The information obtained is then stored in memory as master information. In standard mode, the detected data from the bills is compared to master information stored in memory. The master information may correspond to data generated from genuine "master" currency bills from a plurality of currency systems and/or denominations. Typically, the master data represents an expected numerical value or range of numerical values associated with the detected attribute(s) of genuine currency.

After the operator selects the denomination and the type of bills to be processed, the currency handling system 10 then generates (in "learn" mode) or selects (in "standard" mode) the master information corresponding to the type of currency system and denomination of the bill(s) to be processed. Referring to FIGS. 1–3, in learn mode, a stack of representative "master" currency bills is deposited in the hopper 18 and fed through the system 10 as described above. The master currency bills will preferably comprise bills from a particular currency type and denomination but may include bills which are initially unrecognizable to the currency handling system 10. As the master currency bills are conveyed through the currency handling system 10, attribute (s) of the master bills are sensed and master information corresponding to the master bills is stored in the memory 26. For example, the operator may enter that $20 U.S. notes will be processed. In learn mode, the currency handling system 10 then evaluates a representative set of authentic $20 U.S. notes and generates a set of master information corresponding to the authentic $20 U.S. notes. Accordingly, in the learn mode, the currency handling system 10 is able to generate the necessary master information independently, without having been pre-programmed with such master information. In standard mode, the currency handling system 10 would evaluate the set of $20 U.S. notes with respect to stored master information corresponding to authentic $20 U.S. notes.

The characteristic(s) or attribute(s) of the bill that correspond to master information may include, as mentioned above, data corresponding to the size, magnetic content, UV reflectance levels, fluorescence, density, security thread content, color shifting ink content, hologram, kintogram and/or watermark of the bill.

According to some embodiments of the present invention, the master information comprises numerical data associated with various denominations of currency bills from various types of currency systems. The numerical data may comprise, for example, thresholds of acceptability to be used in evaluating test bills, based on expected numerical values associated with the currency or a range of numerical values defining upper and lower limits of acceptability. The thresholds may be associated with various sensitivity levels, as described above. Alternatively, the master information may comprise other information associated with the currency such as, for example, optical or magnetic patterns, symbols, codes or alphanumeric characters. In either case, the master information comprises internally generated parameters which may be used in evaluating test bills in the same manner described above in relation to the standard mode of operation.

Master information may be obtained in the learn mode from different types of international currency systems and/or denominations. The learn mode may be repeated in successive trials to accumulate master information from multiple types and/or denominations. For example, in a first operation of the learn mode, master currency bills of a first type and denomination may be conveyed through the currency handling system 10 and processed to obtain master information associated with the first type and denomination, which may then be stored in the system memory 26. Then, in a second operation of the learn mode, master currency bills of a second type and denomination may be conveyed through the currency handling system 10 and processed to obtain master information associated with the second type and denomination, which also may be stored in the system memory 26. This process may be repeated several times to obtain master information associated with multiple currency types and denominations. The information associated with each of the currency types and denominations is stored in system memory 26 for recall in "standard" mode, as described above.

Figure 15:
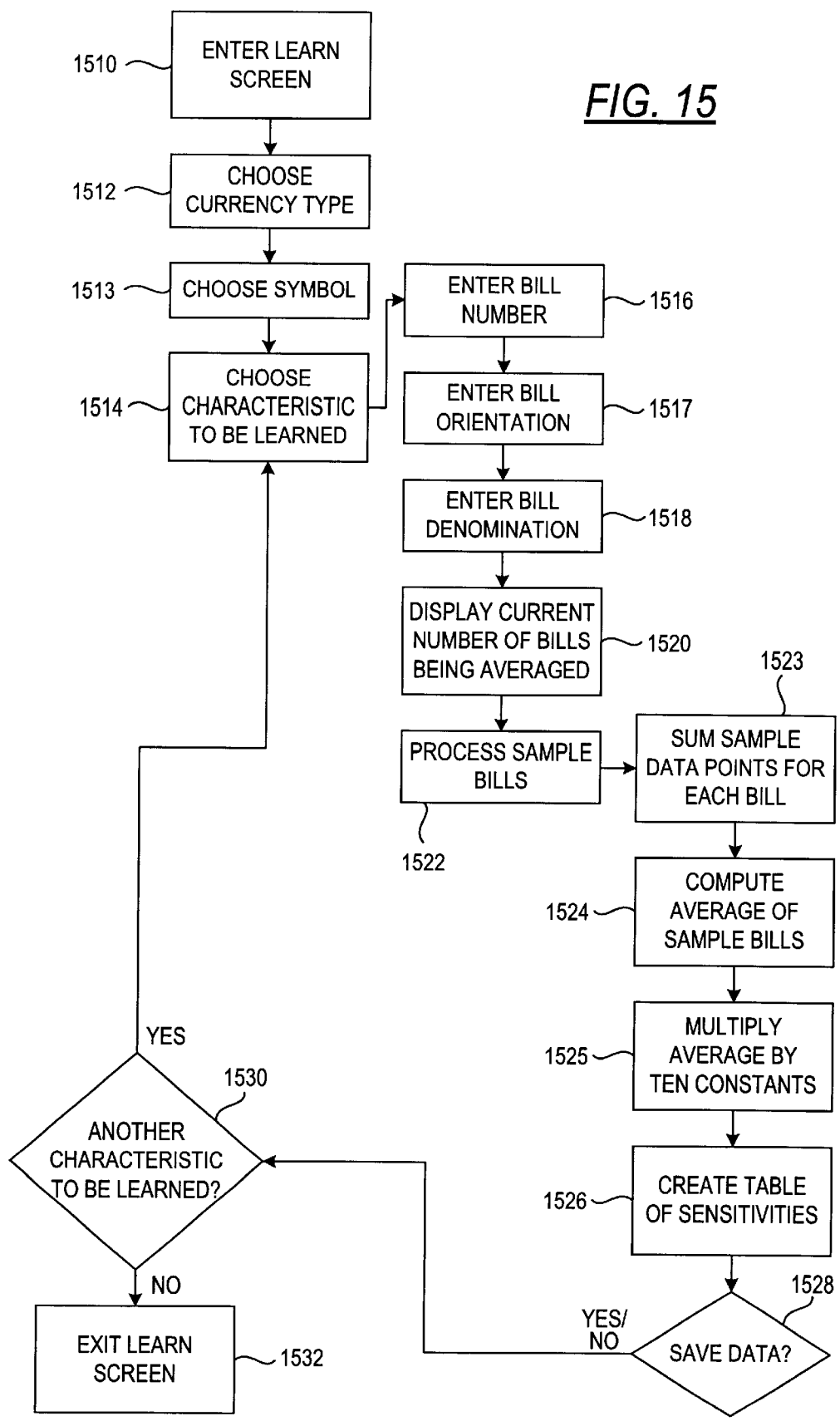
FIG. 15 is a flow chart showing operation of a learning mode in accordance with one embodiment of the invention.

One embodiment of the learn mode utilizes the program illustrated in the flow chart of FIG. 15. This embodiment will be discussed in connection with the operator interface 400 of FIG. 7. First, the operator enters the learn screen at step 1510 by pressing "MODE" key 465b. Next the operator chooses the currency type of the bills to be processed in the learn mode at step 1512 by scrolling through the list of currency types that are displayed on the screen when the learn mode is entered at step 1510. The operator chooses the desired currency type by aligning the cursor with the desired currency type displayed on the screen.

The display then changes to a list of currency symbols, and the operator chooses the currency symbol associated with the currency type to be processed at step 1513 by scrolling through the displayed list of currency symbols. The operator chooses the desired currency symbol by again aligning the cursor with the desired symbol displayed on the screen. This advances the program to step 1514 which changes the display to a menu of currency characteristics to be learned. These characteristics include all the characteristics described above, such as size (length/width), density, magnetic content, UV reflectance, fluorescence, and the presence of a security thread. The operator then selects the desired characteristics to be learned by aligning the cursor with the desired characteristic.

Then, the program advances to step 1516 where the operator enters the bill number, which is simply an integer between one and nine which identifies the different denominations and series of bills for any given currency type. For example, different types of currency have denominations that have more than one series, e.g., there are two series of U.S. $100 bills, one with the old design and one with the new design. In this embodiment of the system 10, up to nine bill denominations and/or series can be learned for each currency type. Here again, the display contains a menu of the available bill numbers (1–9), and the operator selects the desired bill number by aligning the cursor with the desired bill number. The program then advances to step 1517, where the operator enters the bill orientation, i.e., face up bottom edge forward, face up top edge forward, face down bottom edge forward or face down top edge forward.

The system 10 then advances to step 1518 which causes the display to prompt the operator to enter the bill denomination, for example by using one of the available value selection or "VAL" keys 464a–f, to identify the particular denomination to be learned. Alternatively, the denomination may be selected by scrolling through available denominations on a display 463. The denomination entered should correspond to the denominations of the currency type entered in step 1512. When the operator enters the denomination, the system 10 advances to step 1520 where the current number of bills being averaged is displayed. For example, it may be desirable to average several different bills of the same denomination, but in different conditions, e.g., different degrees of wear, so that the data s of a variety of bills of the same denomination, but of different conditions, can be averaged. Typically, 50 to 100 bills are averaged in the learn mode in order to authenticate bills in of the sample bills by dividing the totals for each bill by the number of bills being averaged. If the operator chose the density characteristic to be learned, the system 10 would sum the measured density of each bill at various sample data points and then compute the average of the sample bills by dividing the totals for each bill by the number of bills being averaged.

Similarly, if the operator chose the fluorescence characteristic to be learned, the system 10 would sum the measured fluorescence of each bill at various sample data points and then compute the average of the sample bills by dividing the totals for each bill by the number of bills being averaged. Likewise, if the operator chose the security thread characteristic to be learned, the system 10 would sum the data corresponding to the location/presence of the security thread of each bill at various sample data points and then compute the average of the sample bills by dividing the totals for each bill by the number of bills being averaged.

The resulting average from step 1524 corresponding to the sample bills is multiplied by 10 empirically derived constants at step 1525, ranging from zero to one, in order to create a table of sensitivity values at step 1526. The 10 constants used at step 1525 are determined empirically to correspond to differing degrees of authentication accuracy. For example, if the operator chose the magnetic characteristic to be learned and the average magnetism found from step 1524 was 1,000, the system 10 would create the following table of sensitivities:

TABLE

| Sensitivity Level | 2 | 2 | 3 | 4 | 5 | 6 | 7 | 8 | 9 | 10 |
|---|---|---|---|---|---|---|---|---|---|---|
| Magnetism Threshold | 100 | 150 | 200 | 400 | 500 | 650 | 750 | 800 | 850 | 900 | the standard mode more accurately. However, the number of bills averaged can be greater or less then the 50 to 100 bills averaged in this embodiment of the learn mode. One data averaging procedure is described in more detail in U.S. Pat. No. 5,633,949.

From step 1520, the system advances to step 1522 where the display prompts the operator to load the sample bill(s) into the input hopper 136 and then press the "START" key 465a. The bill(s) are processed by the system 10 by being fed, one at a time, into the transport mechanism 340 of the system 10. As the bill(s) are fed through the system 10, the system senses each bill at various sample data points to produce master data corresponding to the sampled bill. An example of such a process is described in co-pending U.S. Provisional Pat. Application Ser. No. 60/078,228 entitled "Color Scanhead And Currency Handling System Employing The Same" and filed on Mar.17, 1998 and assigned to the assignee of the present application which is incorporated herein by reference in its entirety.

At this point, step 1523 sums the sample data points taken along each bill. The system 10 in step 1524 computes the average of the totals from step 1523 by dividing each of the totals from step 1523 by the number of bills being averaged. For example, if the operator chose the magnetic characteristic to be learned, the system 10 would sum the measured magnetic content of each bill at 58 sample data points and then compute the average of the sample bills by dividing the totals for each bill by the number of bills being averaged. If the operator chose the UV characteristic to be learned, the system 10 would sum the measured UV reflectance of each bill at 40 sample data points and then compute the average After the system 10 has completed step 1526, the operator will be prompted to save the data corresponding to the characteristic learned at step 1528. The operator saves the data by selecting "YES" from the display menu by aligning the cursor over "YES" and pressing the "ACCEPT" key. Similarly, to continue without storing the data, the operator selects "NO" from the display menu by aligning the cursor over "NO" and pressing the "ACCEPT" key. Whether or not the operator saves the data, the operator will next decide in step 1530 whether to continue in learn mode or whether to exit the learn screen. If the operator chooses to have the system 10 learn another characteristic, steps 1514–1530 are repeated. The operator chooses whether to learn another characteristic at step 1530 by selecting either "YES" or "NO" from the display menu by aligning the cursor over the appropriate response and pressing the "ACCEPT" key. If the operator chooses not to learn another characteristic by selecting "NO", then the system 10 in step 1532 will exit the learn screen.

In one embodiment, the currency handling system 10 may learn a plurality of different types of currency systems and/or denominations. This is useful because in European countries, for example, with the advent of Euro currency (EC currency), it may be expected that both EC currency and a national currency will circulate in any given country. In Germany, for a more specific example, it may be expected that both EC currency and German deutsche marks (DMs) will circulate. With the learn mode capability of the present invention, a German operator may obtain master information associated with both EC and DM currency and store the information in system memory 356.

Of course, the "family" of desirable currencies for any particular system 10 may include more than two types of currency systems. For example, a centralized commercial bank in the European Community may handle several types of currency systems including EC currency, German DMs, British Pounds, French Francs, U.S. Dollars, Japanese Yen and Swiss Francs. In like manner, the desirable "family" of currency systems in Tokyo, Hong Kong or other parts of Asia may include Japanese Yen, Chinese Remimbi, U.S. Dollars, German DMs, British Pounds and Hong Kong Dollars. As a further example, a desirable family of currency systems in the United States may include the combination of U.S. Dollars, British Pounds, German DMs, Canadian Dollars and Japanese Yen. With the learn mode capability of the present invention, master information may be obtained from any denomination of currency in any desired "family" by simply repeating the learn mode for each currency system and denomination in the family.

The currency handling system 10 may learn a plurality of different types of currency systems and/or denominations by successively using the learn mode by running currency bills of the designated currency system family, one denomination at a time, past the sensor(s) of the system 10 to obtain the necessary master information. The currency bills may be fed individually through the system 10 or in stacks of the designated type and denomination. The bill(s) fed through the system may include good quality bill(s), poor quality bill(s) or both. The master information obtained from the bills defines (or may be processed to define) thresholds, ranges of acceptability or patterns of bills of the designated type and denomination which are later to be evaluated in "standard" mode.

For example, suppose a single good quality bill of a designated type of currency system and denomination is fed through the system 10 in learn mode. The master information obtained from the bill may be processed to define a range of acceptability for bills of the designated type and denomination. For instance, the master information obtained from the learn mode bill may define a "center" value of the range, with "deltas," plus or minus the center value being determined by the system 10 to define the upper and lower bounds of the range. Alternatively, a range of acceptability may be obtained by feeding a stack of bills through the system 10, each bill in the stack being of generally "good" quality, but differing in degree of quality from others in the stack. In this example, the average value of the notes in the stack may define a "center value" of a range, with values plus or minus the center value defining the upper and lower bounds of the range, as described above. Alternatively, other statistical analysis may be employed to define thresholds, patterns or ranges, such as standard deviation information being used to define upper and lower bounds of the range.

In another embodiment, master information obtained from the poorest quality of the learn mode bills may be used to define the limits of acceptability for bills of the designated type and denomination, such that bills of the designated type and denomination evaluated in standard mode will be accepted if they are at least as "good" in quality as the poorest quality of the learn mode bills. Still another alternative is to feed one or more poor quality bills through the system 10 to define "unacceptable" bill(s) of the designated type and denomination, such that bills of the designated type and denomination evaluated in standard mode will not be accepted unless they are better in quality than the poor quality learn mode bills.

Because the currency bills are not discriminated by the currency handling system 10, the operator must inform the system 10 (by means of an operator interface panel, for example) which type of currency system and denomination it is "learning," and whether it is learning a good quality (e.g., "acceptable") or poor quality (e.g., "marginally acceptable" or "unacceptable") bill so that the system 10 may correlate the master information it obtains (and stores in memory) with the appropriate type, denomination and acceptability status of the bill(s).

As discussed above, in one embodiment, various menu displays may be utilized at the operator interface panel to prompt the operator to enter the type and denomination of the currency to be "learned" in learn mode. The learn mode menu may also prompt the operator to select the type of authentication tests to be performed in learn mode. The available selection options in the menu may be predetermined "default" settings or customizable settings programmed into the system 10 in the set-up mode.

In one embodiment, for example, a currency system selection sub-menu may offer United States, Canada, Mexico and EC currency as the currency system selection options, a denomination selection sub-menu may offer the units 1, 2, 3, 4, 5, 10, 20, 50 and 100 as denomination selection options, and an authentication test selection menu may offer optical, UV, magnetic, thread detection, size detection and color as authentication test selection options.

In one embodiment, user-defined labels and settings may be entered into the system 10 to accommodate new types of currency systems and/or denominations. The operator may enter labels and selection options appropriate to the new type of currency system and/or denomination through the learn mode menu, or may define a tailored learn mode menu appropriate to the new type of currency system and/or denomination in the set-up mode. The available menu selection options may include denomination selection options and authentication test selection options as heretofore described. The user-defined options may be used, for example, where a system 10 will be instructed to learn a casino's own type of money. In such a case, rather than selecting a type of currency system, the operator may enter a label (e.g., Skyline casino) identifying the type of money to be learned via the operator interface panel. Then, the operator may select the denomination(s) of the currency to be learned, and perhaps the authentication test(s) to be performed, through the learn mode menu as heretofore described.

The user may select from among the available menu or sub-menu options by "clicking" over an appropriate icon, pressing a touch-screen key or some other means. The type, denomination and/or test selection menus may offer selection options tailored to the types and/or denominations which have been selected. Thus, for example, where the United States has been selected as the type of currency system from the selection menu, the denomination selection menu may offer $1, $5, $10, $20, $50 and $100 as available denomination selection options and the authentication test election menu may offer UV, magnetic, thread detection and/or color as test selection options.

For purposes of illustration, suppose that an operator desires to obtain master information for new $50 U.S. bills. In one embodiment, the operator first instructs the system 10, by means of the operator interface panel, to enter the learn mode. Then, the operator selects, through the appropriate menu(s), the type and denomination to be "learned" (e.g., U.S. $50). Through the test selection menu, the operator may instruct the system 10 which authentication test(s) to perform, i.e., which attribute(s) to detect, to obtain the master information. In another embodiment, the system 10 automatically selects the appropriate type(s) of learn mode sensor(s) to perform the selected tests based on the type and denomination entered by the operator. In either embodiment, the operator may then insert a single good-quality bill or a stack of such bills of the selected type and denomination (or a number of such bills) in the hopper 18. The system 10 feeds the bill(s) through the system and evaluates the bills with sensors appropriate for the selected test(s) to obtain master information associated with the bills. The master information is stored in the system memory and is retrievable for later use in "standard" mode to authenticate bills corresponding to the "learned" denomination.

Where a single bill is fed through the system 10, suppose that an arbitrary value "x" is obtained from the learn mode sensors. The system 10 may define the value "x" to be a center value of an "acceptable" range for $5 U.S. bills. The system may further define the values "x+y" and "x−y" to comprise the upper and lower bounds of the "acceptable" range for $5 U.S. bills, where y is a tolerance value appropriate to the type of test. An appropriate value of y may be derived in relation to the value x (e.g., in terms of standard deviation) or may be independent of x. The value of y may differ according to the type of test employed and the different results which may be expected from the tests. For example, for two tests A and B, an appropriate value of y may be 0.1 volts for test A and 0.01 volts for test B.

Alternatively, the ranges of acceptability may be derived from an average sensor value obtained from multiple bills. Thus, for example, where multiple $5 U.S. bills, each bill being of generally "good" quality, are fed through the system 10, (and again using the arbitrary sensor value "x" for purposes of illustration), suppose that the average sensor value obtained from the bills is "1.1x". The system 10 may define the "acceptable" range for $5 U.S. bills to be centered at the average sensor value "1.1x," with a tolerance value "y" substantially as described above defining in this case an upper bound "1.1x+y" and a lower bound "1.1x−y" of acceptability. As a further alternative, where multiple bills (e.g., $5 U.S. bills) are fed through the system 10, suppose that sensor values obtained in the learn mode range between "1.4x" and "0.9x". The system 10 may define the values "1.44x" and "0.9x" to be the upper and lower bounds of the "acceptable range" for $5 U.S. bills, without regard to the average value.

According to one embodiment, the operator includes, in the stack of master currency to be processed, both new, uncirculated currency and bills which have been in circulation to varying degrees. In this embodiment, bills of the poorest quality may be fed through the system to define the outer limits of acceptability of the bills. For example, suppose that the operator feeds two poor quality $5 U.S. bills through the system 10, and suppose that sensor readings of "1.5x" and "0.7x" are obtained from the poor quality bills. The system 10 may then determine the range of acceptability for $5 U.S. bills to be between the values of "0.7x" and "1.5x."

Next, after master information has been obtained from $5 U.S. bills, the operator instructs the system 10 that it will be reading a second, third, fourth, etc. type of currency system and denomination (e.g., $10 U.S. bills and $5 and $10 Canadian bills), then feeds the respective bill(s) through the system 10 to obtain master information and derive thresholds of acceptability from the bills, in any of the manners heretofore described. In one embodiment, the operator may further instruct the system 10 which type of tests and/or sensor(s) that it should use to obtain the master information. For example, an operator may wish to use optical and magnetic sensors for U.S. currency and only optical sensors for Canadian currency. After the operator has obtained master information from each desired type and denomination, the operator instructs the system 10 to enter "standard" mode, or to depart the "learn" mode. The operator may nevertheless re-enter the learn mode at a subsequent time to obtain master information from other currency systems and/or denominations.

It will be appreciated that the master information obtained in "learn" mode is not limited to ranges of values as described in the examples above. Rather, the master information may comprise pattern information, numerical thresholds other than ranges, or generally any type of information which may be obtained by the learn mode sensors.

The sensors used to obtain master information in learn mode (or, the "learn mode" sensors) may be either separate from or the same as the sensors used to obtain data in standard mode (or, the "standard mode" sensors). Where the sensors are the same in both learn mode and standard mode, the sensors constitute "dual-function" sensors (e.g., operable as both a "learn mode" sensor and a "standard mode" sensor). The characteristic information obtained from the sensed bills may include the characteristics mentioned above.

After the operator has obtained master information from each desired currency denomination and type, the operator instructs the system 10 to enter the "standard" mode, or to depart the "learn" mode. The operator may nevertheless re-enter the learn mode at a subsequent time to obtain master information from other currency denominations, types and/or series.

In accordance with one embodiment of the invention, not only can the currency handling system 10 in the learn mode add master information of new currency denominations, but the system 10 may also replace existing currency denominations. If a country replaces an existing currency denomination with a new bill type for that denomination, the currency handling system 10 may learn the new bill's characteristic information and replace the previous master information with new master information. For example, the operator may use an operator interface panel 15 (FIG. 3*a*) or 400 (FIGS. 4 and 6) to enter the specific currency denomination to be replaced. Then, the master currency bills of the new bill type may be conveyed through the currency handling system 10 and scanned to obtain master information associated with the new bill's characteristic information, which may then be stored in the memory 26. Additionally, the operator may delete an existing currency denomination stored in the memory 26 through the operator interface panel. In one embodiment, the operator must enter a security code to access the learn mode. The security code ensures that qualified operators may add, replace or delete master information in the learn mode.

Figure 21:
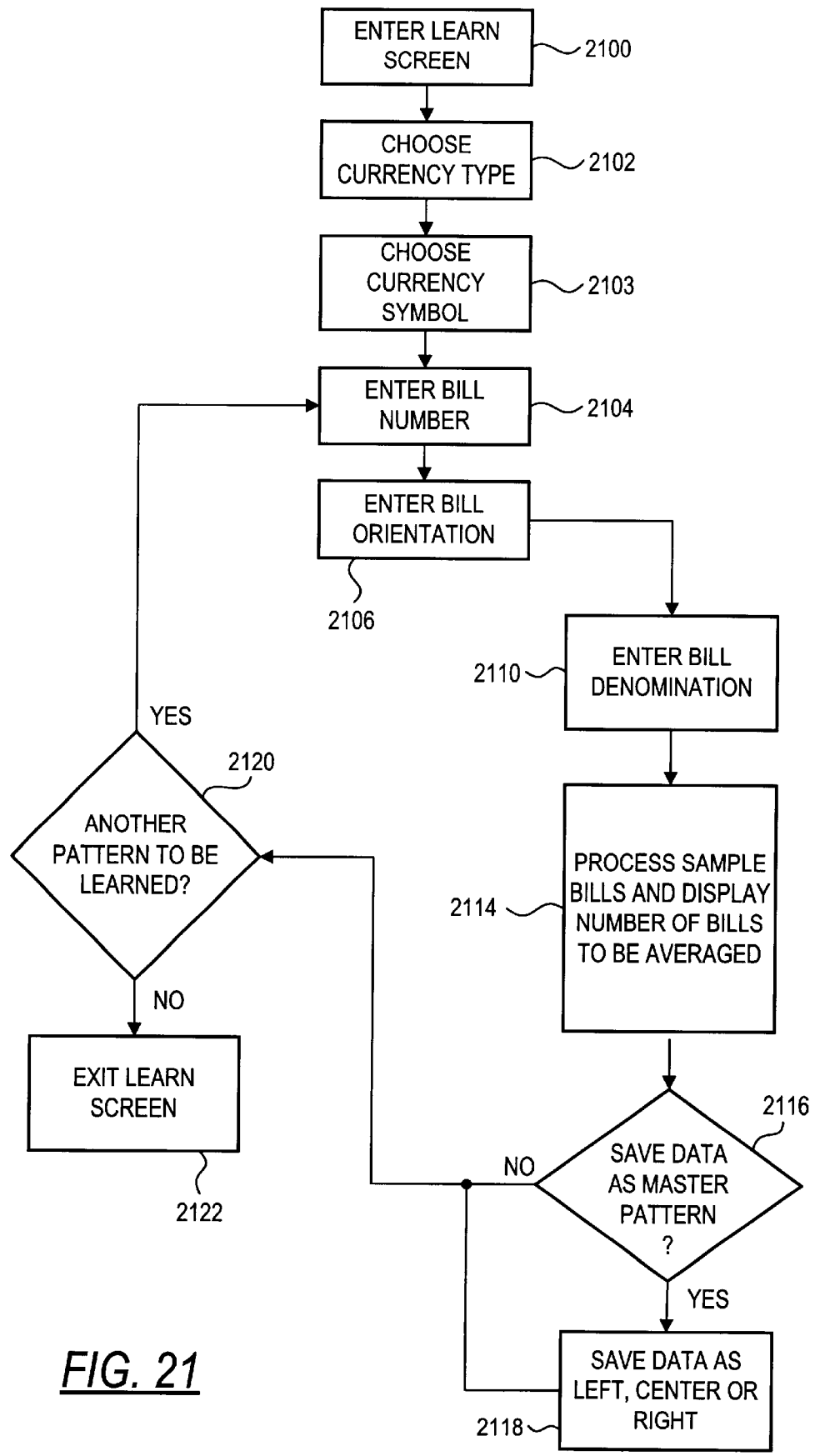
FIG. 21 is a flow chart of one embodiment of the learn mode.

Another embodiment of how the learn mode functions is set forth in the flow chart illustrated in FIG. 21. First the operator enters the learn screen at step 2100 by pressing a key, such as a "MODE" key, on the operator interface panel. Next the operator chooses the currency type of the bills to be processed in the learn mode at step 2102 by scrolling through the list of currency types that are displayed on the screen when the learn mode is entered at step 2100. The operator chooses the desired currency type by aligning the cursor with the desired currency type displayed on the screen and pressing a key such as the "MODE" key. The operator then chooses the currency symbol associated with the currency type to be processed at step 2103 by scrolling through the list of currency symbols displayed on the screen after the currency type has been chosen. The operator chooses the desired currency symbol by again aligning the cursor with the desired symbol displayed on the screen and pressing the "MODE" key.

This advances the program to step 2104 where the operator enters the bill number, which is simply an integer between one and nine which identifies the different denominations and series of bills for any given currency type. For example, different types of currency have denominations that have more than one series, e.g., there are two series of U.S. $ 100 bills, one with the old design and one with the new design. In this embodiment of the system 10, up to nine bill denominations and/or series can be learned. Here again, the display contains a menu of the available bill numbers (1–9), and the operator selects the desired bill number by aligning the cursor with the desired bill number and pressing the "MODE" key. Next, at step 2106, the operator enters the orientation of the bill, i.e., face up bottom edge forward, face up top edge forward, face down bottom edge forward or face down top edge forward.

From the above selections, the system 10 determines what master information to learn from the bill(s) to be processed in the learn mode. Then, the operator in step 2110 enters the bill denomination either by scrolling through a displayed menu of the denominations corresponding to the currency type entered in step 2102 or by pressing one of the denomination keys to identify the particular denomination to be learned. The system 10 automatically changes the denomination associated with the denomination keys to correspond to the denominations available for the currency type entered in step 2102. When the operator presses one of the denomination keys, the system 10 advances to step 2114 where the system processes the sample bills and displays the number of sample bills to be averaged. This step is described in further detail in connection with FIG. 22. For example, it may be desirable to average several different bills of the same denomination, but in different conditions, e.g. different degrees of wear, so that the patterns of a variety of bills of the same denomination, but of different conditions, can be averaged. Up to nine bills can be averaged to create a master pattern in this embodiment of the system 10. Typically, however, only one bill needs to be processed to generate master pattern data sufficient to authenticate a particular currency type and denomination in standard mode. This pattern averaging procedure is described in more detail in U.S. Pat. No. 5,633,949.

At step 2114, the system prompts the operator via the screen display to load the sample bill(s) into the input hopper and then press a key, such as a "START" key. The bill(s) are processed by the system 10 by being fed, one at a time, into the transport mechanism of the system 10. As the bill(s) are fed through the system 10, the system scans each bill to produce a master pattern corresponding to the scanned bill, as described in more detail in connection with FIG. 22.

Figure 20A:
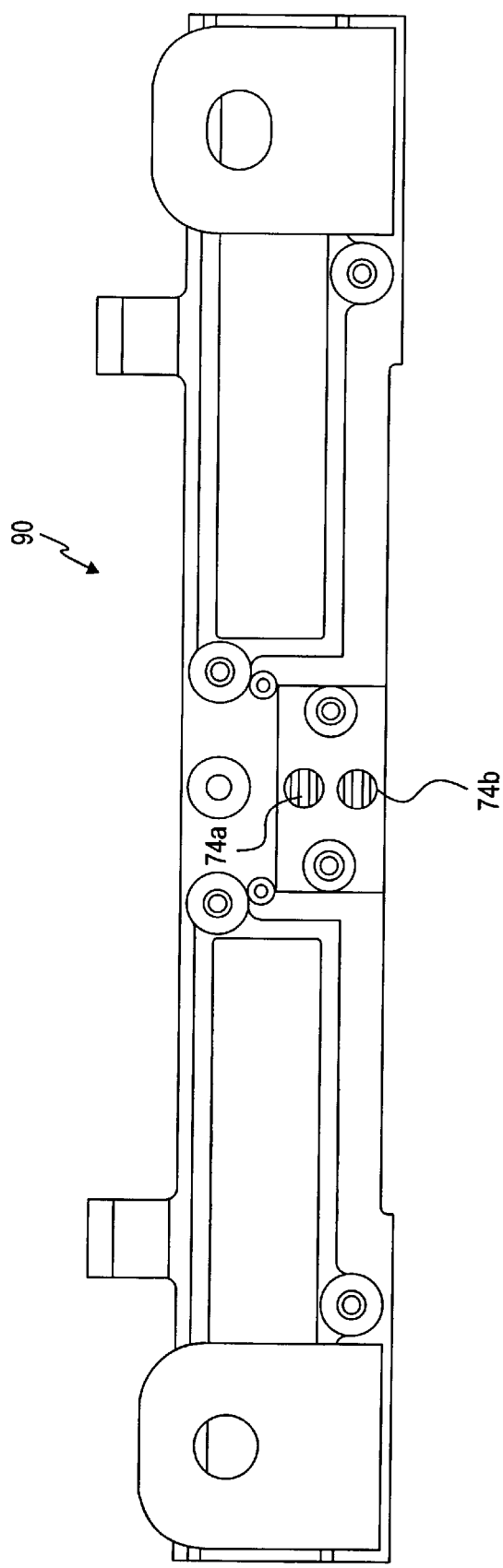
FIG. 20a is a top view of a scanhead.
Figure 20B:
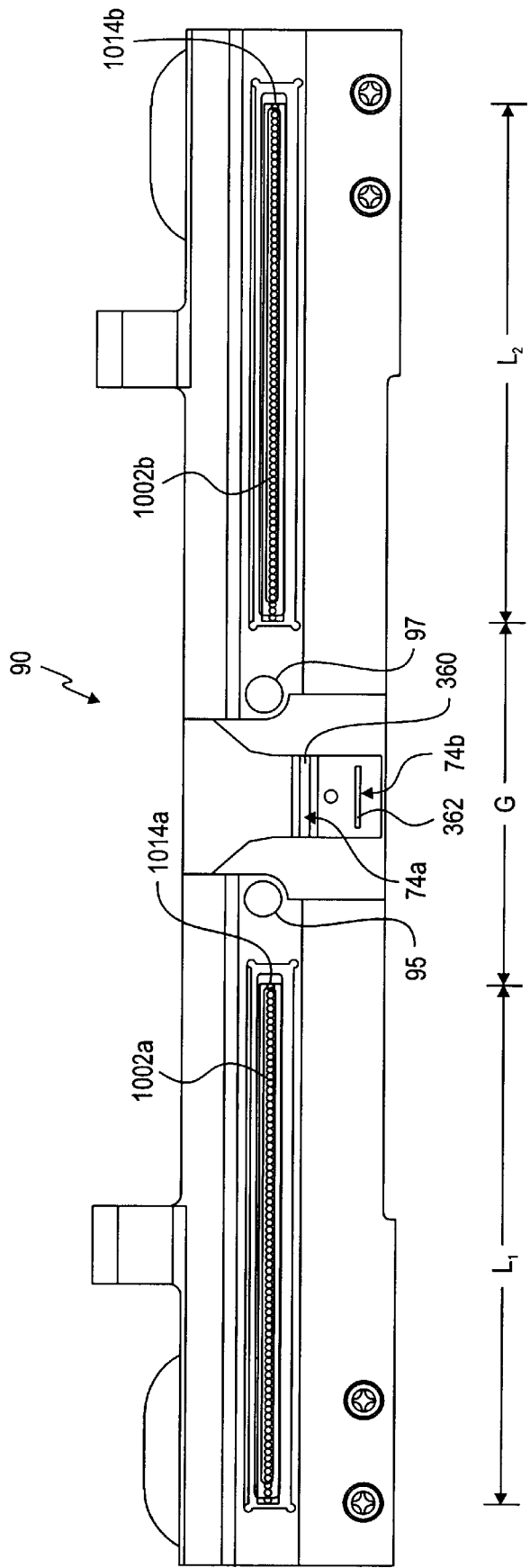

The operator is prompted at step 2116 to save the data corresponding to the characteristics learned The operator saves the data corresponding to the characteristics learned as a master pattern by selecting "YES" from the display menu by aligning the cursor over "YES" and pressing a key such as the "MODE" key. Similarly, to continue without storing the data, the operator selects "NO" from the display menu by aligning the cursor over "NO" and pressing the "MODE" key. An operator may decide not to save the data if, while learning one denomination, the operator decides to learn another currency denomination and/or type. If the operator saves the data, the operator will next decide whether to save the data as left, center or right master data. These positions refer to where in relation to the edges of the input hopper 18 the bill was located when it entered the transport mechanism. In one embodiment the system 10 has an adjustable hopper 18 so if bills of one denomination are being processed, all the bills are fed down the center of the transport mechanism. However, if mixed denominations are being processed in the standard mode from a currency type that had different size denominations, then the hopper would have to be adjusted to accommodate the maximum size bill in the stack. Thus, a narrower dimension bill could shift in the hopper such that the data scanned from the bill would vary according to where in the hopper the bill entered the transport mechanism. Accordingly, in learn mode, master data scanned from a bill varies according to where in the input hopper the bill enters the transport mechanism. Therefore, the lateral position of the bill may either be communicated to the system 10 so the learned data can be stored in an appropriate memory location corresponding to the lateral position of the bill, or the system 10 can automatically determine the lateral position of the bill by use of the "X" sensors 1002*a,b* (see FIG. 20*b*).

In step 2120, the operator is prompted regarding whether or not another pattern is to be learned. If the operator decides to have the system 10 learn another pattern, the operator selects "YES" from the display menu by aligning the cursor over "YES". If another pattern is to be learned, steps 2104–2120 are repeated. If the operator chooses not to learn another characteristic by selecting "NO", then the system 10 in step 2122 will exit the learn screen. Thereafter, the operator may learn another set of currency denominations from another country by re-entering the learn screen at step 2100.

Figure 22:
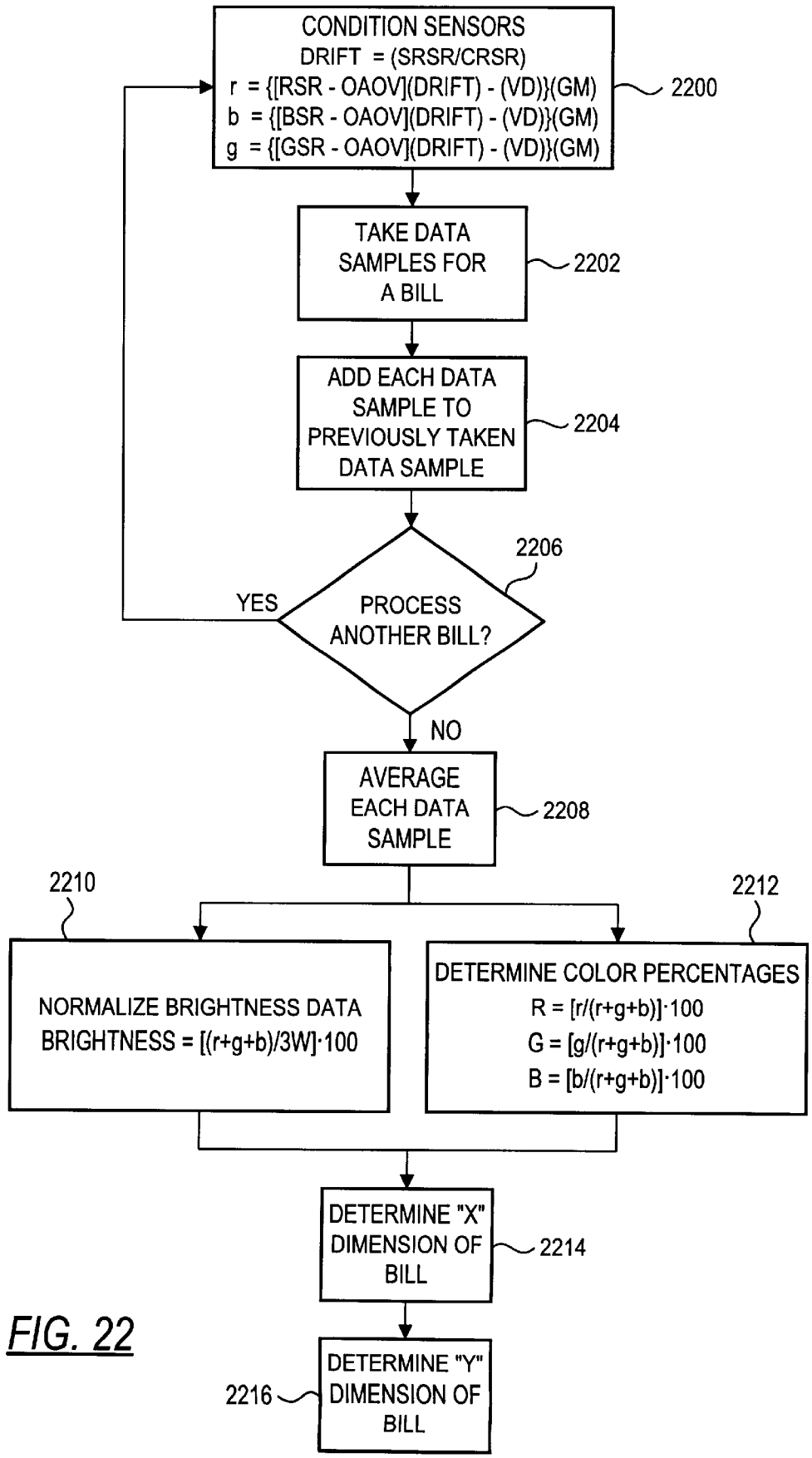
FIG. 22 is a flow chart further defining a step of a flow chart of FIG. 21.

The details of how the system 10 processes the sample bills in step 2114 is illustrated in the flow chart of FIG. 22. For each data sample for each pattern to be learned, the system 10 in step 2200 conditions the sensors Four equations are used in adjusting the sensors. The first equation is the drift equation:

$$\text{DRIFT} = (SRSR/CRSR)$$

The Drift equation enables the tracking of light intensity via software. Another embodiment would utilize the reference sensor as feedback to a light intensity control circuit, with this circuit the drift equation is not needed since hardware will maintain light intensity. This latter method, however, will shorten tube life.

The tube intensity drift (drift) is calculated by dividing a stored reference sensor reading SRSR by the current reference sensor reading. The stored reference sensor reading corresponds to the signal produced by the reference sensor when exposed to the light source at the time of calibration. The adjusted red (r) or red hue, the adjusted blue (b) or blue hue and the adjusted green (g) or green hue are calculated from the following formulas:

r={[RSR−OAOV](DRIFT)−(VD)}(GM)
b={[BSR−OAOV](DRIFT)−(VD)}(GM)
g={[GSR−OAOV](DRIFT)−(VD)}(GM)

The sensor readings RSR, BSR and GSR are measured in millivolts (mv). OAOV is the op-amp offset voltage which is an empirically derived constant obtained by reading the sensors with the fluorescent light tubes off and is typically between 50 mv and 1,000 mv. Drift is the value calculated from the drift equation. VD is the dark voltage which is an empirically derived constant obtained by reading the sensors with the fluorescent light tubes on when a non-reflective black calibration standard material or sheet is placed in front of the sensors. The gain multiplier (GM) is an empirically derived constant obtained from the following equation:

$$GM=W/(WSR-OAOV)$$

where WSR is a variable corresponding to the white sensor reading, i.e., the voltage measured when a white calibration standard is present in front of the sensors, OAOV is the op-amp offset voltage, and W is a constant corresponding to the voltage that the sensors should give when a white calibration standard is present in front of the sensors (generally, W=2.5 v). In step 2202, the system 10 takes data samples for the bill currently being scanned. For example, 64 data samples can be taken at various points along a bill.

In step 2204, each data sample is added to the previously taken corresponding data sample (or to zero if this is the first bill processed). For example, if 64 data samples are taken, each of the 64 data samples is added to the respective data sample(s) previously taken and stored in memory.

In step 2206, the operator is prompted regarding whether or not to process another bill to create the master pattern data. If the operator decides to process another bill, the operator selects "YES" from the display menu by aligning the cursor over "YES" and pressing the "MODE" key. If another bill of the same currency type and denomination is to be processed (for pattern averaging purposes), steps 2200–2206 are repeated. If the operator chooses not to process another bill by selecting "NO", then the system 10 proceeds to step 2208 where the averages of the summed data samples are computed. The average is computed by taking each sum from step 2204 and dividing by the number of bills processed. For example, if 64 data samples where taken from three bills, the sum of each of the 64 data samples is divided by three. Next, the system 10 determines the color percentages in step 2212. Three equations are used to determine the color percentages, namely:

$$R=[r/(r+g+b)]\cdot 100$$

$$G=[g/(r+g+b)]\cdot 100$$

$$B=[b/(r+g+b)]\cdot 100$$

The first equation determines the percentage of red reflected from the bill. This is calculated by dividing the adjusted red value r by the sum of the adjusted red, green and blue values r, g and b from step 2200 and multiplying that result by 100. The percentage of green and blue is found in a similar manner from the second and third equations, respectively.

Simultaneously, the system 10 normalizes the brightness data in step 2210. The brightness data corresponds to the intensity of the light reflected from the bill.

The equation used to normalize the brightness data is:

$$BRIGHTNESS=[(r+g+b)/3W]\cdot 100$$

In that equation, W is the same as defined above. Then, the system 10 in step 2214 determines the "X" (or long) dimension of the bill. The system 10 then determines in step 2216 the "Y" (or narrow) dimension of the bill. The details of how the bill size are detailed elsewhere herein.

It will be appreciated that any of the stacker arrangements described below may be utilized to receive currency bills, after they have been evaluated by the system. In one embodiment, however, bills transported through the system 10 in learn mode are not transported from the input receptacle 18 to the output receptacle(s) or "pocket(s)" 34, but rather are transported from the input receptacle 18 past the sensors, then in reverse manner are delivered back to the input receptacle 18.

Figure 3A:
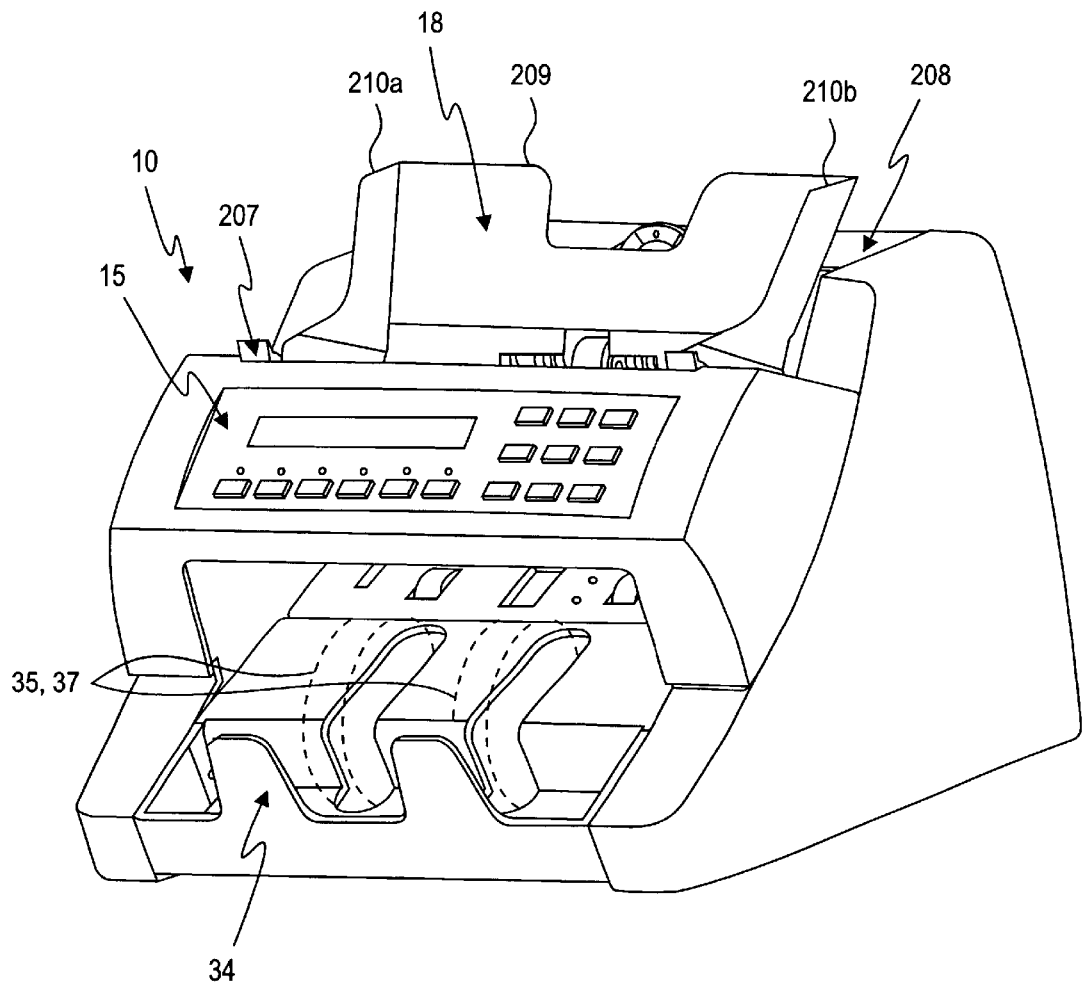
FIG. 3a is a perspective view of a single-pocket currency handling system according to one embodiment of the present invention.
Figure 3B:
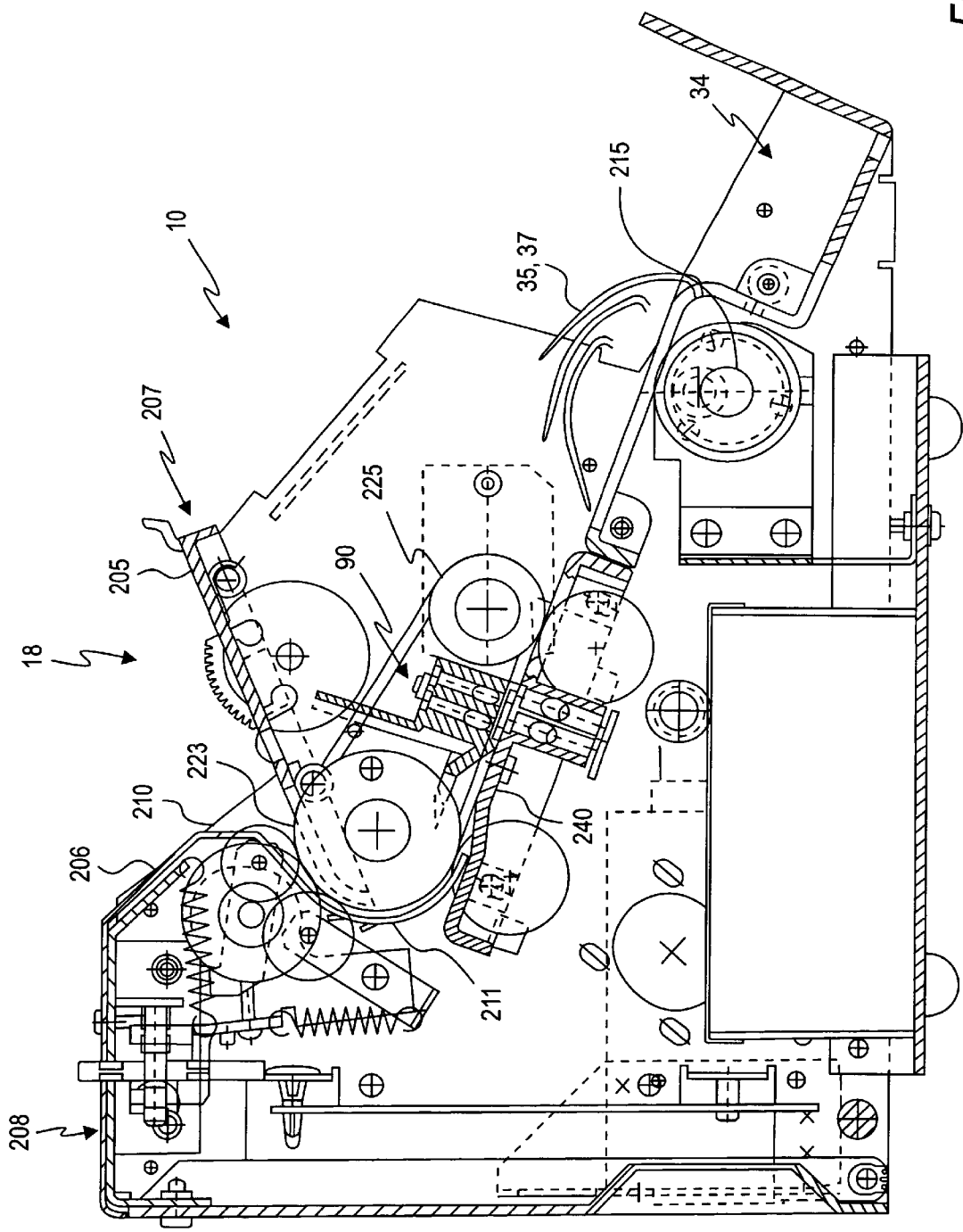
FIG. 3b is a side sectional view of the single-pocket currency handling system of FIG. 3a depicting various transport rolls in side elevation.
Figure 4:
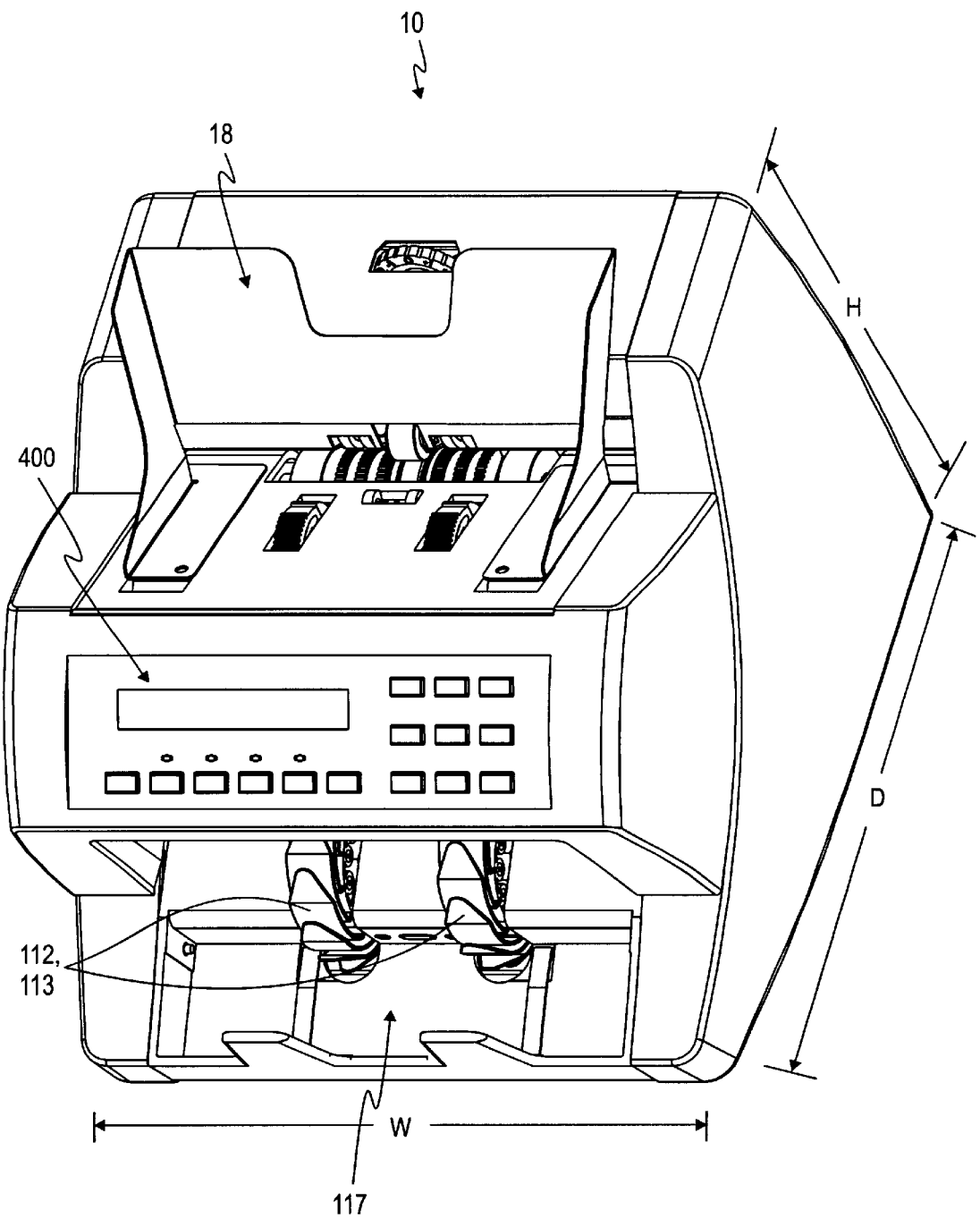
FIG. 4 is a top perspective view of a single pocket system similar to that of FIGS. 3a and 3b.

In one embodiment, after evaluation of the bills by the currency handling system 10, in learn mode and/or standard mode, each of the bills is transported to a stacker which may include one or more "pockets" or output receptacles 34 for receiving the bills. For example, FIGS. 3a and 3b portray an embodiment of the present invention in which the currency handling system 10 includes a single-pocket stacker. In other embodiments of the present invention, which the currency handling system may include a two-pocket stacker (not shown), or a three-, four- or six-pocket stacker, respectively (not shown). The single-pocket embodiment shown in FIG. 3 is described in detail in U.S. Pat. application Ser. No. 08/800,053, filed Feb. 14, 1997 and entitled "Method and Apparatus for Document Identification and Authentication." The multi-pocket embodiments are shown and described in detail in U.S. Pat. application Ser. No. 08/916,100, filed Aug. 21, 1997 and entitled "Multi-Pocket Currency Discriminator." Both applications are assigned to the assignee of the present invention and incorporated herein by reference.

In some embodiments, the currency handling systems 10 of the type shown in FIGS. 3a and 3b, and FIGS. 4 and 5 are compact and relatively lightweight, such that they may be rested upon a tabletop. One embodiment of the single-pocket currency handling system 10 (FIGS. 3a and 3b and FIGS. 4 and 5), for example, has a height (H) of about 17½ inches, width (W) of about 13½ inches, and a depth (D) of about 15 inches. In this embodiment, therefore, the currency handling system 10 has a "footprint" of 13½ inches by 15 inches, or about 205 square inches (about 1½ square feet), which is sufficiently small to fit on a typical tabletop. The weight of the system 10 in this embodiment is about 40 pounds. With respect to U.S. currency (having dimensions of about 2½ inches by 6 inches), the height (H) of the currency handling system is about three bill lengths, the width (W) is about 2 bill lengths and the depth (D) is about 2½ bill lengths.

Similarly, the multi-pocket systems, in some embodiments (not shown), may be constructed with generally the same "footprint," allowing them to be rested upon a typical tabletop. Generally, however, where the multi-pocket systems are constructed with the same footprint as the single-pocket system, they will be taller and heavier than the single-pocket system, with the relative heights and weights of the respective systems corresponding generally to the number of pockets. Thus, in general, where the multi-pocket systems have the same size "footprint," a six-pocket system will be taller and heavier than a four-pocket system, which in turn will be taller and heavier than a three-pocket system and a two-pocket system.

One embodiment of a two-pocket machine (not shown) has a height of about 19½ inches, width of about 15½ inches, and a depth (D) of about 24½ inches, thus providing a "footprint" of about 380 square inches (about 2½ square feet), which is still sufficiently small to fit on a typical tabletop. One embodiment of a three-pocket machine has generally the same footprint as the 2-pocket machine (380 square inches, or 15½ inches by 24½ inches) but has a height of about 26 inches, or about 6½ inches taller than the two-pocket machine. Similarly, embodiments of a four-pocket machine and a six-pocket machine each have generally the same footprint as the 2- and 3-pocket machine but have respective heights of about 33 inches and about 46 inches.

In any of the above systems, the currency bills are fed, one by one, from a stack of currency bills placed in the input receptacle (e.g. "hopper") 18 into a transport mechanism, which guides the currency bills across optical and/or magnetic or other (e.g. UV) sensors to the output receptacle(s) 34. In the illustrated embodiment, the bills are oriented such that their narrow dimension is scanned by the sensors. In one embodiment, the currency handling system 10 is capable of transporting, scanning, and determining the denomination and/or authenticity of the bills at a rate in excess of 800 to 1000 bills per minute.

The input receptacle 18 for receiving a stack of bills to be processed is formed by downwardly sloping and converging walls 205 and 206 (FIG. 3b) formed by a pair of removable covers 207 and 208 which snap onto a frame. The rear wall 206 supports a removable hopper 209 (FIG. 3a) which includes a pair of vertically disposed side walls 210a and 210b which complete the receptacle for the stack of currency bills to be processed.

One embodiment of an input receptacle is described and illustrated in more detail in U.S. Pat. No. 5,687,963, entitled "Method and Apparatus for Discriminating and Counting Documents" which is incorporated by reference in its entirety. The currency discriminator 10 has a display area 15 which may include a display panel 400 (FIGS. 4, 5) having physical keys or buttons and a display window (FIG. 6) for displaying information associated with operation of the machine. Alternatively, the display area 15 may include other forms of displays and/or keypads such as a touch panel display.

From the input receptacle 18, the currency bills in the system 10 are moved by a transport mechanism in seriatim from the bottom of a stack of bills along a curved guideway 211, which receives bills moving downwardly and rearwardly and changes the direction of travel to a forward direction. The curvature of the guideway 211 corresponds substantially to the curved periphery of a drive roll 223 so as to form a narrow passageway for the bills along the rear side of the drive roll 223. An exit end of the curved guideway 211 directs the bills onto a transport plate 240 which carries the bills through an evaluation section and an output roll 225 which directs the bill to stacking wheels 35, 37, which in turn direct the bill to the pocket(s) 34. It will be appreciated that the distance between successive rolls 223 and 225 and between roll 225 and wheels 35, 37 is somewhat less than the narrow dimension of the narrowest bill to be accommodated. A scanhead 90 (see FIGS. 20a, 20b) is located in the evaluation section in registry with the plate 240.

In the single-pocket embodiment, stacking of the bills is accomplished by a pair of driven stacking wheels 35 and 37. The stacker wheels 35, 37 are supported for rotational movement about a shaft 215 journaled on a rigid frame and driven by a motor (not shown). Flexible blades of the stacker wheels 35 and 37 deliver the bills onto a forward end of the output receptacle 34.

In the multiple-pocket embodiments, stacking of the bills is accomplished by an additional pair of similar driven stacking wheels for each output receptacle also supported for rotational movement about respective shafts journaled on the rigid frame and driven by a motor (not shown). Additional plates and diverters direct the bills to the appropriate output receptacles.

It will be appreciated that any of the stacker arrangements heretofore discussed may be utilized to receive currency bills, after they have been evaluated by the system 10, in either learn mode or standard mode. In one embodiment, however, bills transported through the system 10 in learn mode are not transported from the input receptacle 18 to the output receptacle(s) 34, but rather are transported from the input receptacle 18 past the sensors, then in reverse manner are delivered back to the input receptacle 18.

It will further be appreciated that any of the multi-pocket machines may be constructed with wider bases defining generally larger "footprints" than those heretofore described. According to some embodiments, it is possible, but not necessary, that such embodiments will still fit upon a typical tabletop. Generally, any embodiment of any of the multi-pocket machines having a larger footprint will be shorter in height than an embodiment having a smaller footprint.

Figure 8:
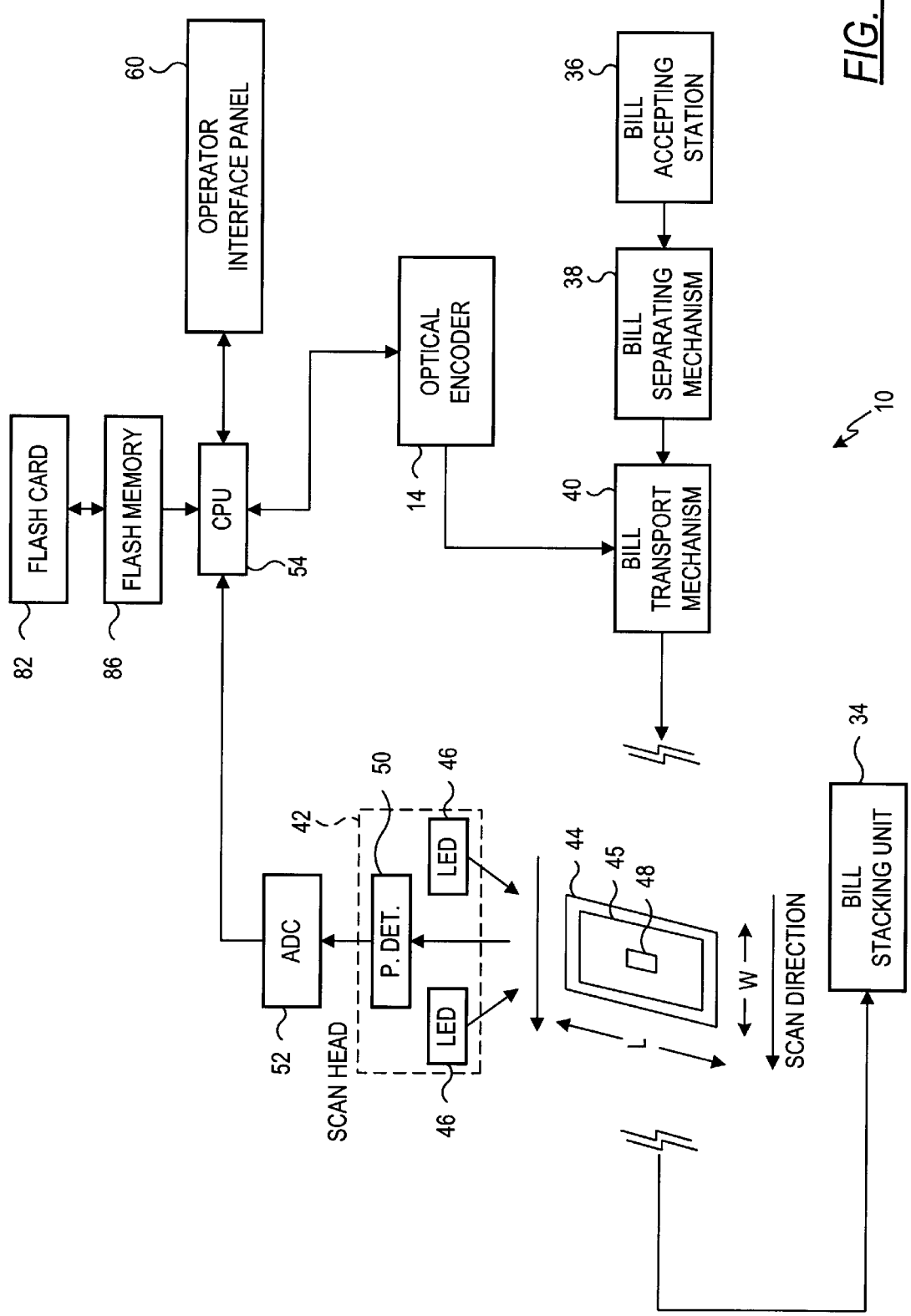
FIG. 8 is a functional block diagram illustrating one embodiment of the currency handling system according to the present invention.

Now turning to FIG. 8, there is depicted a functional block diagram of a currency handling system 10 embodying principles of the present invention. Currency bills to be evaluated (in "standard" mode) or from which master information will be generated (in "learn" mode) are positioned in a bill accepting station 36. Accepted bills are acted upon by a bill separating mechanism 38 which functions to pick out or separate one bill at a time for being sequentially relayed by a bill transport mechanism 40, according to a precisely predetermined transport path, across an optical scanhead 42. The optical scanhead 42 comprises at least one light source 46 directing a beam of coherent light downwardly onto the bill transport path so as to illuminate a substantially rectangular light strip 48 upon the currency bill 44 positioned on the transport path below the scanhead 42. Light reflected off the illuminated strip 48 is sensed by a photodetector 50 positioned directly above the strip. After passing across the optical scanhead 42, each of the bills is transported to a bill stacking unit 34 which may include a plurality of "pockets" or output receptacles for receiving the bills, as described in relation to FIG. 1.

Alternatively or additionally, the currency handling system 10 may include a magnetic scanhead or any other type of sensor known in the art.

The analog output of the photodetector 50 is converted into a digital signal by means of an analog-to-digital (ADC) converter unit 52 whose output is fed as a digital input to a controller or processor, such as a central processing unit (CPU) 54. An encoder 14 provides an input to the CPU 54 to determine the timing of the operations of the currency handling system 10, and a flash memory 86 is provided for storing software codes and/or data related to operation of the currency handling system 10. A flash card 82 having its own flash memory (not shown) may be electrically connected to the flash memory 86 to provide updates or to copy from the flash memory 86, as will be described in detail hereinafter.

In one embodiment, the processor or CPU 54 initiates processing to obtain samples in response to a change in reflectance value which occurs when an outer border 45 of a printed pattern on a document or bill 44 is transported past the scanhead 42 relative to a reflectance value obtained at an edge of a document where no printed pattern exits. In another embodiment, the processor or CPU 54 initiates processing to obtain samples in response to a change in reflectance value which occurs when an outer edge or border of the bill or document 44 is transported past the scanhead relative to a reflectance value obtained when the document or bill 44 is not present.

An operator interface panel 60 provides an operator the capability of sending input data to, or receiving output data from, the currency handling system 10. Input data may comprise, for example, user-selected operating modes and user-defined operating parameters for the currency handling system 10. Output data may comprise, for example, a display of the operating modes and/or status of the currency handling system 10 and the number or cumulative values of evaluated bills. In one embodiment, the operator interface panel 60 comprises a touch-screen "keypad" and display which may be used to provide input data and display output data related to operation of the currency handling system 10. In one embodiment, the operator may customize the touch-screen keypad to define names or labels associated with particular keys or displays, delete keys, reposition keys or modify the complexity of the operator interface panel 60 to match the level of operator experience. The user-tailored operating parameters are encoded in the control software executed by the CPU 54 and stored in the flash memory 86.

The master information used in evaluating bills under test is stored in the flash memory 86. Upon connection of the flash card 82 to the flash memory 86, the contents of the flash memory, including the master information generated in the "learn" mode, are copied onto the flash card 82. Alternatively, the system may be operated in a mode wherein the system uses the contents of resident memory, e.g., memory 86; however, when a flash card is inserted, the system will use the contents of the flash card. In still another alternative, the contents of the flash card may be transferred to the resident memory. Thereafter, the flash card 82 may be used to update the flash memories of additional machines. In this system, therefore, the independent generation of master information accomplished in the "learn" mode need only be accomplished by one machine and quickly and efficiently loaded into other machines without repeating the "learn" mode in the other machines.

Flash memories are relatively well known in the art. Some of the several advantages of flash memories are that they are nonvolatile (e.g. their data content is preserved without requiring connection to a power supply) and they may be electrically erased and reprogrammed within fractions of a second through electrical control signals. An example of a specific type of flash memory which may be used in the currency handling system 10 is product number AM29F010, commercially available from Advanced Micro Devices, Inc. ("AMD") of Sunnyvale, Calif. and described in detail in AMD's publication entitled "Flash Memory Products— 1996 Data Book/Handbook", incorporated herein by reference. However, those skilled in the art will appreciate that other types of flash memories may be utilized, depending on the system memory requirements and desired operating characteristics.

Figure 9:
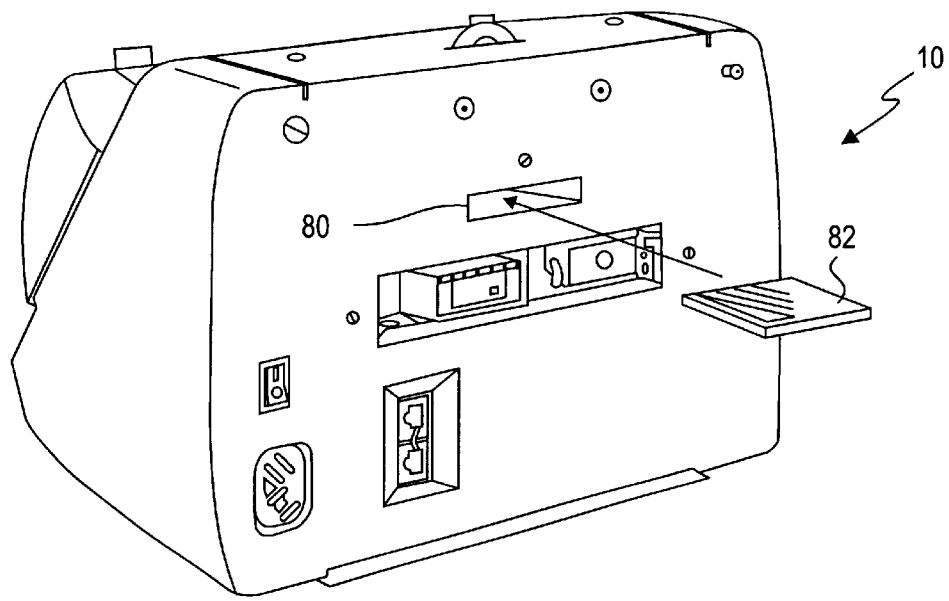
FIGS. 9 and 10 are isometric views depicting the insertion of a flash card into a currency handling machine according to one embodiment of the present invention.

FIG. 9 depicts a currency handling machine 10 having an external slot 80 for receiving a flash card according to one embodiment of the invention. A removable flash card 82 is adapted to be inserted by a user through the external slot 80 and into a mating socket 84 (FIG. 10) located inside the machine adjacent the slot 80. Upon insertion of the flash card 82 into the socket 84, an electrical connection is formed between the flash card 82 and the flash memory 86 resident in the machine. According to one embodiment, the flash card 82 is small and lightweight, sturdy enough to withstand multiple uses, and adapted to be easily insertable into the slot 80 and corresponding socket 84 of the currency handling machine 10 by users not having any special training. Further, the flash card 82 should not require any special electrostatic or physical protection to protect it from damage during shipping and handling. One type of flash card that has been found to satisfy these criteria is the FlashLite™ Memory Card available from AMP, Inc. of Harrisburg, Pa. However, it is envisioned that other suitable types of flash cards will become available from other manufacturers. The FlashLite™ card has a thickness of 3.3 mm (⅛ inch), a width of approximately 45 mm (1.8 inches) and a 68-pin connector interface compatible with the Personal Computer Memory Card International Association (PCMCIA) industry standards. Its length may be varied to suit the needs of the user. In one embodiment, two sizes of flash cards (designated "half size" and "full size") have lengths of 2.1 inches (53 mm) and 3.3 inches (84 mm), respectively, but other sizes of flash cards may also be utilized.

Figure 10:
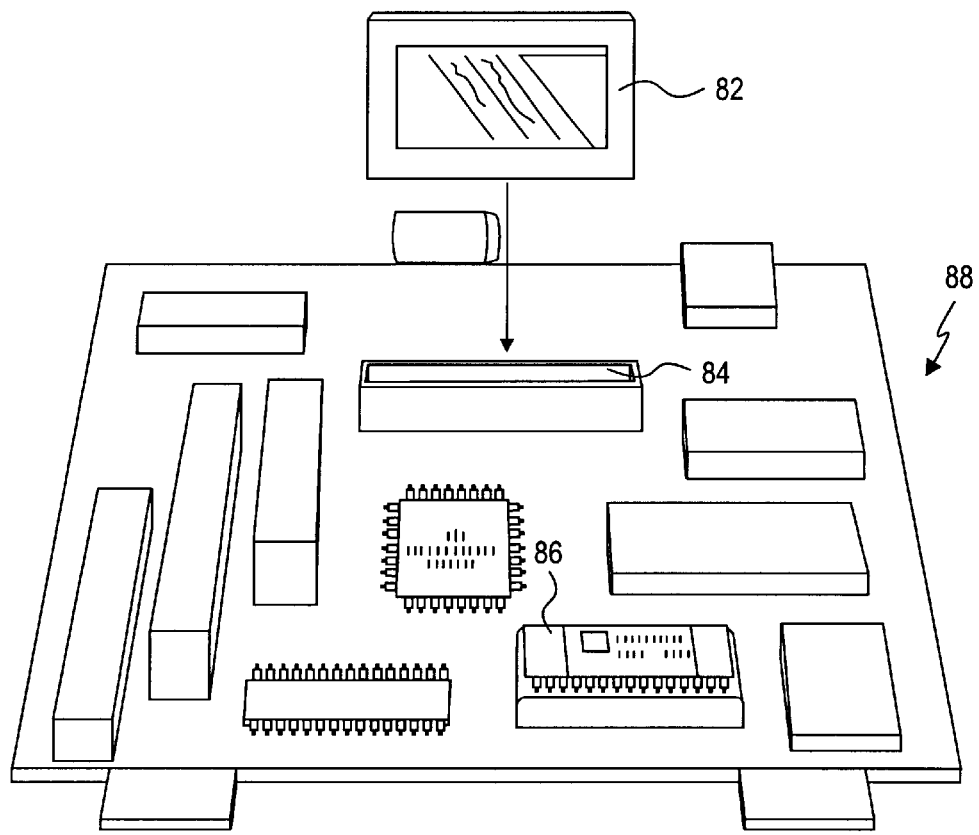

FIG. 10 depicts a circuit board assembly 88 including a socket 84 adapted to receive the flash card 82 according to one embodiment of the invention. As will be appreciated by those skilled in the art, however, the flash card 82 may be electrically coupled to the resident memory by any of several alternative means other than a socket. Upon insertion of the flash card 82 into the socket 84, electrical signals are communicated from the flash card 82 to the resident flash memory 86 of the machine. In one embodiment, the socket 84 comprises a PCMCIA-compatible 68-position receptacle for receiving a flash card such as the FlashLite™ card described above. One type of socket that may be used for this purpose is AMP, Inc. product number 146773-1, which is adapted to extend vertically from the circuit board assembly 88 within the currency handling machine 10. However, it will be appreciated by those skilled in the art that other types of sockets may be utilized, including those positioned horizontally in relation to the circuit board assembly 88, or those including a lever or button which may be depressed to eject the flash card 82 from the socket 84.

Upon insertion of the flash card 82 into its socket 84, the CPU 54 (FIG. 8) is capable of electrically detecting the presence of the card. If the FlashLite™ card is used, this is accomplished by means of two specially designated connector pins $CD_1$ and $CD_2$ (not shown) (assigned to pin numbers 36 and 67, respectively) being shorted to ground. The CPU then compares the contents of the flash card memory with the contents of the resident flash memory 86. If the contents of the memories are different, the required sectors in the flash card memory are erased and replaced with new code copied from the resident flash memory 86. If the contents of the memories are the same, an audible or visual message is provided to the user indicating that the process is concluded. Upon successful completion of the memory transfer, the flash card memory thereby is programmed with the same set of master information as the resident flash memory. Thus, for example, where the resident flash memory contains master information obtained in "learn mode" from a family of different currency types and denominations, such master information becomes transferred to the flash card memory.

The flash card 82 can thereafter be removed from the currency handling machine 10 and plugged into any other currency handling machine requiring that same set of master information to denominate and/or authenticate currency bills. The master information is copied from the flash card memory to the flash memory of the additional machines in substantially the same manner (although reversed) as they were initially copied onto the flash card. Thus, for example, where the flash card memory contains master information obtained in "learn mode" from a currency handling machine 10 which has been transferred to the flash card, such master information can be transferred to the resident flash memory of a number of other machines. The transfer of memory in this manner may thereby be used to replace or upgrade the denominations and/or types currencies to be processed by any particular machine. In the event of an unsuccessful memory transfer, the machine will automatically re-attempt the transfer until, after multiple unsuccessful attempts, the user will be advised that there is a hard system failure and to call for service.

For purposes of illustration, suppose for example that a particular machine 10 includes master information to accommodate German DMs and EC currency, and it is desired for whatever reason to replace this "first" set of master information with a "second" set of master information, to accommodate British pounds and U.S. Dollars. This may be accomplished by simply plugging an appropriately-programmed flash card into the machine 10, causing the first set of master information to be replaced with the second set. It will be appreciated that the memory of any particular machine 10 may be changed multiple times, to accommodate any of several alternative combinations of currencies through the above-described flash card memory transfer.

It has been found that the light source and/or sensor of a particular machine may degrade over time. Additionally, the light source and/or sensor of any particular machine may be affected by dust, temperature, imperfections, scratches, or anything that may affect the brightness of the bulb or sensitivity of the sensor. Similarly, machines utilizing magnetic sensors will also generally degrade over time and/or be affected by its physical environment including dust, temperature, etc. When multiple machines are employed, as in the above-described system using flash cards to pass threshold data between multiple machines, each machine will typically have a measurement "bias" unique to that machine caused by the state of degradation of the optical or magnetic sensors associated with each individual machine. Due to the measurement biases between machines, master information generated by one machine will not directly correspond to such values in another machine. Consequently, if the measurement biases are not corrected, evaluation of bills will be inconsistent from machine to machine.

The present invention is designed to achieve a substantially consistent evaluation of bills between machines by "normalizing" the master information and test data to account for differences in sensors between machines. For example, where the master information and test data comprise numerical values, this is accomplished by dividing the threshold data and test data obtained from each machine by a reference value corresponding to the measurement of a common reference by each respective machine. The common reference may comprise, for example, an object such as a mirror or piece of paper or plastic that is present in each machine. The reference value is obtained in each respective machine by scanning the common reference with respect to a selected attribute such as size, density pattern, etc. The master information and/or test data obtained from each individual machine is then divided by the appropriate reference value to define normalized master information and/or test data corresponding to each machine. The evaluation of bills in standard mode may thereafter be accomplished by comparing the normalized test data to normalized master information.

The normalized master information may be obtained from one or more machines in "learn" mode and transferred to other machines by using the flash card process heretofore described. By using normalized master information to evaluate bills, a consistent evaluation of bills is achieved from machine to machine even though the sensors in each machine may be in different states of degradation. For example, suppose a first machine is operated in "learn" mode to derive master information, in the form of numerical threshold values, associated with optical sensing of a currency bill, and the threshold values are copied from the first machine to a second machine using the flash card process heretofore described. In actual terms, the threshold values derived by the first machine may comprise, for example, an upper limit of 2.0 volts and a lower limit of 1.0 volts. Suppose further that the first machine optically senses a reference object such as a piece of plastic and produces a reference value of 4.0 volts. The upper and lower threshold values are normalized by dividing them by the reference value, resulting in a normalized upper threshold of 0.5 and a normalized lower threshold of 0.25.

The normalized threshold values obtained from the first machine may then be transferred to a second machine including a reference object which is identical to or otherwise has the same measurable characteristics as the reference object in the first machine. Typically, the sensors in the second machine will be in a different state of degradation than the sensors in the first machine. For example, optical sensing of the reference object which produced a signal of 4.0 volts in the first machine may produce a signal of only 3.0 volts in the second machine. The second machine may nevertheless evaluate bills consistently with the first machine by comparing the normalized threshold values obtained from the first machine to normalized test data values obtained from the second machine. Alternatively, a consistent evaluation may be obtained by converting the normalized threshold values obtained from the first machine to "actual" (e.g., unnormalized) thresholds associated with the second machine and then comparing them to unnormalized test data obtained from the second machine.

For example, in the second machine described above, the normalized upper and lower thresholds obtained from the first machine (e.g., 0.5 and 0.25) may be converted to "actual" (e.g., unnormalized) thresholds appropriate to the second machine by multiplying the normalized values by the reference value (3.0 volts) obtained by the second machine. This results in an "actual" upper limit of 1.5 volts and an "actual" lower limit of 0.75 volts for the second machine. Evaluation of bills in standard mode may thereby be accomplished in the second machine by comparing "actual" data values of the bills under test to the "actual" threshold data derived from the normalized threshold data. Alternatively, the measured "actual" data values of the bills under test may be converted to normalized data values for comparison to the normalized threshold values.

Although the flash card loading system according to the present invention has heretofore been described in relation to the copying of master information, such as numerical threshold values, from machine to machine, it will be appreciated that the above described flash card loading system may be utilized to copy substantially all of the contents of the flash memory from one machine to the flash memory of other machines. In addition to master information, the contents of the flash memory may include, for example, tailored operating parameters associated with the particular currency handling machine 10 such as, for example, a user-defined keyboard and/or display which have been programmed to suit an individual operator or particular machine. By using the flash card loading system described above, these tailored operating parameters may be quickly and efficiently transferred from one machine to a second machine, thereby customizing the operating parameters of the second machine to match the operating parameters of the first machine.

According to another embodiment of the present invention, the operator or end user of the currency handling machine is provided with the ability to send control signals to the machine. The control signals may comprise, for example, an override signal causing the machine not to use master information generated internally through the "learn" mode. The override signal may send alternate master information to the machine to be used in place of the self-generated master information. The control signals may further include an attribute-selection signal for selecting the attributes of the bills for which master information will be obtained. For example, in a currency handling machine including both optical and magnetic sensors capable of measuring a variety of attributes, an operator may choose to use the attribute-selection signal to cause the currency handling machine to measure only a particular attribute or sub-combination of attributes. The control signals may also include an authentication mode selection signal for selecting which items of master information will be used in authentication of subsequent currency bills. For example, if master information corresponding to both size and density have been obtained, an operator may use the authentication mode selection signal to use only master information based on size to authenticate subsequent bills. Preferably, each of the above signals are separately definable for separate denominations of bills.

It will be appreciated that the master information may be stored in some form of memory other than the above-described flash memory without departing from the invention. Moreover, the system may "learn" master information not only directly by employing its own sensors, but also indirectly, for example, from the flash memory of another machine, as described above. This information may be introduced to the machine by other methods as well, without departing from the invention. These other methods include, but are not limited to, physical replacement of memory devices or accessing a writable memory device in the machine via a modem or the like.

A physical embodiment of a full color, multi-cell compatible scanhead will now be described in connection with FIGS. 11a–13b. The scanhead 300 includes a body 302 that has a plurality of filter and sensor receptacles 303 along its length as best seen in FIG. 11b. Each receptacle 303 is designed to receive a color filter 306 (which may be a clear piece of glass) and a sensor 304, one set of which is shown in an exploded view in FIG. 11b (also see in FIG. 13a). A filter 306 is positioned proximate a sensor 304 to transmit light of a given wavelength range of wavelengths to the sensor 304. As illustrated in FIG. 11b, one embodiment of the scanhead housing 302 can accommodate forty-three sensors 304 and forty-three filters 306.

Figure 5:
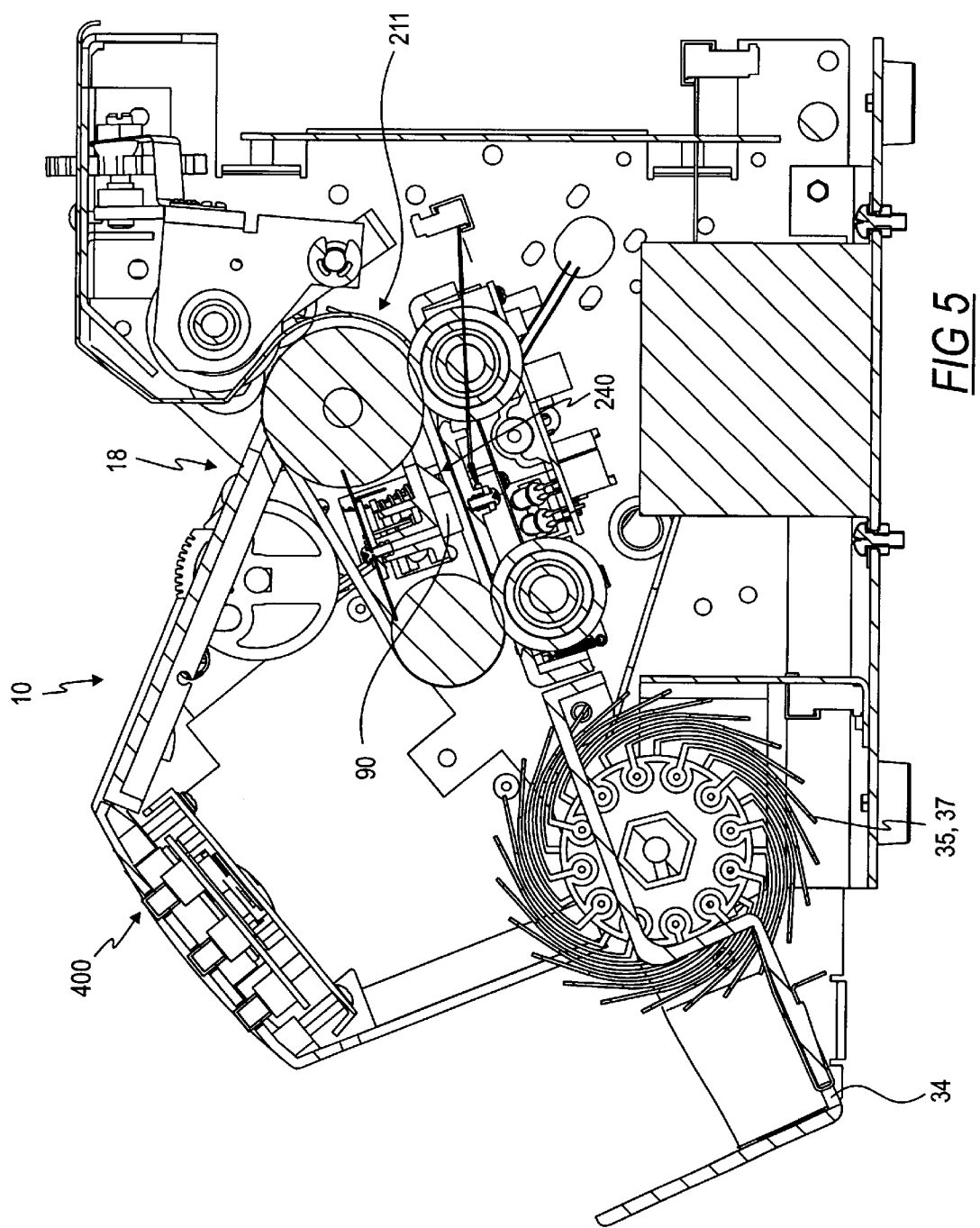
FIG. 5 is a side sectional view of the single pocket system of FIG. 4.

A set of three filters 306 and three sensors 304 comprise a single color cell 335 on the scanhead 300. According to one embodiment, three adjacent receptacles 303 having three different primary color filters therein constitute one full color cell, e.g., 335a. However, as described elsewhere herein, only two color filters and sensors may be utilized, with the value of the third primary color content being derived by the processor. By primary colors it is meant colors from which all other colors may be generated, which includes both additive primary colors (red, green, and blue) and subtractive primary colors (magenta, yellow, and cyan). According to one embodiment, the three color filters 306 are standard red, green, and blue dichroic color separation glass filters. One side of each glass filter is coated with a standard hot mirror for infrared light blocking. According to one embodiment, each filter is either a red filter, part number 1930, a green filter, part number 1945, or a blue filter, part number 1940 available from Reynard Corporation of San Clemente, Calif. According to one embodiment, the sensors 304 are photodiodes, part number BPW34, made by Centronics Corp. of Newbury Park, Calif. According to one embodiment, sensors that have a large sensor area are chosen. The sensors 304 provide the color analog output signals to perform the color scanning as described above. The color scanhead 300 is preferably positioned proximate the bill transport plate 240 (FIGS. 3b and 5). The scanhead 300 further includes a reference sensor 350, described in more detail below.

Figure 13A:
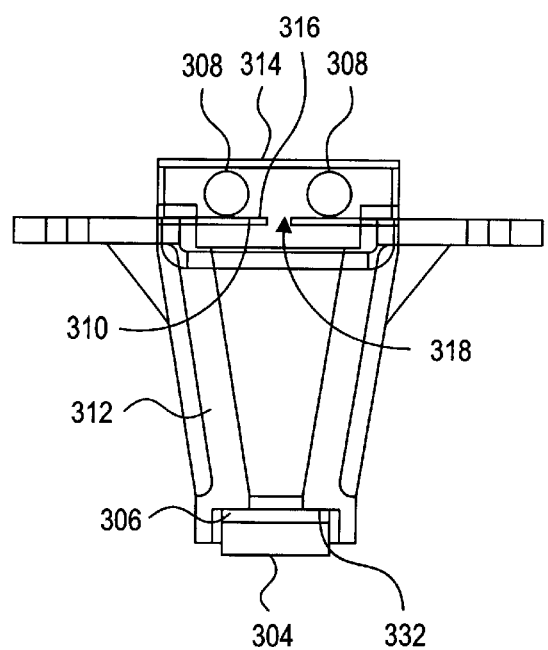

As seen in FIG. 13a, the sensors 304 and filters 306 are positioned within the filter and sensor receptacles 303 in the body 302 of the scanhead 300. Each of the receptacles has ledges 332 for holding the filters 306 in the desired positions. The sensors 304 are positioned immediately behind their corresponding filters 306 within the receptacle 303.

Figure 12:
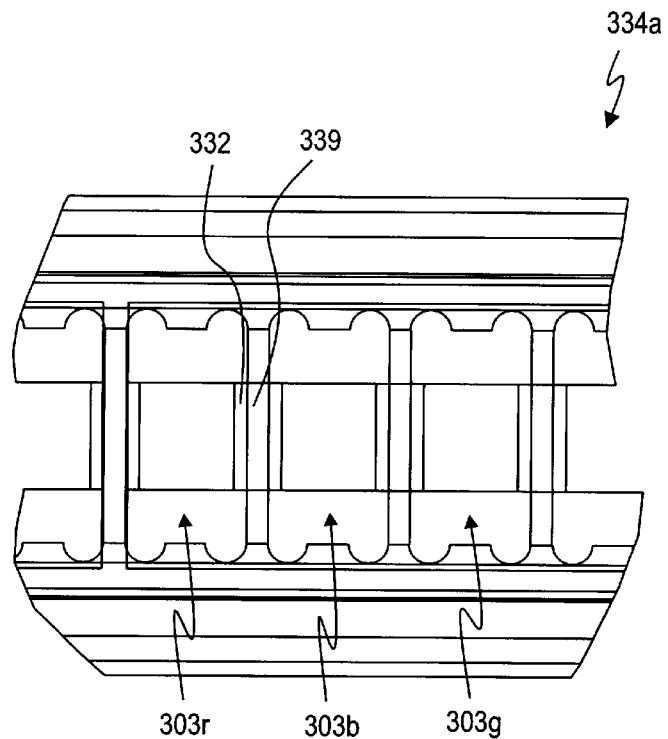
FIG. 12 is an enlarged bottom view of a section of the color scanhead of FIG. 11b.

FIG. 12 illustrates one full color cell such as cell 335a on the scanhead 300. The color cell 335a comprises a receptacle 303r for receiving a red filter 306r (not shown) adapted to pass only red light to a corresponding red sensor 304r. In one embodiment, the specific wavelength ranges transmitted by each filter beginning at 10% transmittance are:
Red 580 nm to 780 nm,
Blue 400nm to510 nm,
Green 480 nm to 580 nm.
The specific wavelength ranges transmitted by each filter beginning at 80% transmittance are:
Red 610 nm to 725 nm,
Blue 425 nm to 490 nm,
Green 525 nm to 575 nm.

The cell further comprises a blue receptacle 303b for receiving a blue filter 306b (not shown) adapted to pass only blue light to a corresponding blue sensor 304b, and a green receptacle 303g for receiving a green filter 306g (not shown) adapted to pass only green light to a corresponding green sensor 304g. Additionally, there are sensor partitions 340 between adjacent filter and sensor receptacles 303 to prevent a sensor in one receptacle, e.g., receptacle 303b, from receiving light from filters in adjacent receptacles, e.g., 303r or 303g. In this way, the sensor partitions eliminate cross-talk between a sensor and filters associated with adjacent receptacles. Because the sensor partitions 340 prevent sensors 304 from receiving wavelengths other than their designated color wavelength, the sensors 304 generate analog outputs representative of their designated colors. Other full color cells such as cells 335b, 335c, 335d and 335e are constructed identically.

As seen in FIGS. 11a and 11d, cells are divided from each other by cell partitions 336 which extend between adjacent color cells 335 from the sensor end 324 to the mask end 322. These partitions ensure that each of the sensors 304 in a color cell 335 receives light from a common portion of the bill. The cell partitions 336 shield the sensors 304 of a color cell 335 from noisy light reflected from areas outside of that cell's scan area such as light from the scan area of an adjacent cell or light from areas outside the scan area of any cell. To further facilitate the viewing of a common portion of a bill by all the sensors in a color cell 335, the sensors 304 are positioned 0.655 inches from the slit 318. This distance is selected based on the countervening considerations that (a) increasing the distance reduces the intensity of light reaching the sensors and (b) decreasing the distance decreases the extent to which the sensors in a cell see the same area of a bill. Placing the light source on the document side of the slit 318 makes the sensors more forgiving to wrinkled bills because light can flood the document because the light is not restricted by the mask 310. Because the light does not have to pass through the slits of a mask, the light intensity is not reduced significantly when there is a slight (e.g., 0.03") wrinkle in a document as it passes under the scanhead 300.

Referring to FIG. 11b, the dimensions [l, w, h] of the filters 306 are 0.13, 0.04, 0.23 inches and the dimensions of the filter receptacles 303 are 0.141×0.250 inches and of the sensors 304 are 0.174×0.079×0.151 inches. The active area of each sensor 304 is 0.105×0.105 inches.

Each sensor generates an analog output signal representative of the characteristic information detected from the bill. Specifically, the analog output signals from each color cell 335 are red, blue and green analog output signals from the red, blue and green sensors 304r, 304b and 304g, respectively (see FIG. 8). These red, blue and green analog output signals are amplified and converted into digital red, blue and green signals by means of an analog-to-digital converter (ADC) whose output is fed as a digital input to a central processing unit (CPU) 54 or 354 as described elsewhere herein. These signals are then processed to identify the denomination and/or type of bill being scanned. According to one embodiment, the outputs of an edge sensor 338 and the green sensor of the left color cell 335a are monitored by the CPU 54 or 354 to initially detect the presence of the bill 44 adjacent the color scanhead 300 and, subsequently, to detect the bill edge.

As seen in FIG. 11a, a mask 310 having a narrow slit 318 therein covers the top of the scanhead. The slit 318 is 0.050 inches wide. A pair of light sources 308 illuminate a bill 44 as it passes the scanhead 300 on the transport plate 140. The illustrated light sources 308 are fluorescent tubes providing white light with a high intensity in the red, blue and green wavelengths. As mentioned above, the fluorescent tubes 308 may be part number CBY26-220NO manufactured by Stanley of Japan. These tubes have a spectrum from about 400 mm to 725 mm with peaks for blue, green and red at about 430 mm, 540 mm and 612 mm, respectively. As can be seen in FIG. 13a, the light from the light sources 308 passes through a transparent glass shield 314 positioned between the light sources 308 and the transport plate 240. The glass shield 314 assists in holding passing bills flat against the transport plate 240 as the bills pass the scanhead 300. The glass shield 314 also protects the scanhead 300 from dust and contact with the bill. The glass shield 314 may be composed of, for example, soda glass or any other suitable material.

Because light diffuses with distance, the scanhead 302 is designed to position the light sources 308 close to the transport plate 240 to achieve a high intensity of light illumination on the bill. In one embodiment, the tops of the fluorescent tubes 308 are located 0.06 inches from the transport plate 240. The mask 310 of the scanhead 300 also assists in illuminating the bill with the high intensity light. Referring to FIG. 13a, the mask 310 has a reflective surface 316 facing to the light sources 308. The reflective side 316 of the mask 310 directs light from the light sources 308 upwardly to illuminate the bill. The reflective side 316 of the mask 310 may be chrome plated or painted white to provide the necessary reflective character. The combination of the two fluorescent light tubes 308 and the reflective side 316 of the mask 310 enhances the intensity or brightness of light on the bill while keeping the heat generated within the currency handling system 10 at acceptable levels.

The light intensity on the bill must be sufficiently high to cause the sensors 304 to produce output signals representative of the characteristic information on the bill. Alternatives to the pair of fluorescent light tubes may be used, such as different types of light sources and/or additional light sources. However, the light sources should flood the area of the bill scanned by the scanhead 300 with high intensity light while minimizing the heat generated within the currency handling system. Adding more light sources may suffer from the disadvantages of increasing the cost and size of the currency handling system.

Light reflected off the illuminated bill enters a manifold 312 of the scanhead 300 by passing through the narrow slit 318 in the mask 310. The slit 318 passes light reflected from the scan area or the portion of the bill directly above the slit 318 into the manifold 312. The reflective side 316 of the mask 310 blocks the majority of light from areas outside the scan area from entering the manifold 312. In this manner, the mask serves as a noise shield by preventing the majority of noisy light or light from outside the scan area from entering the manifold 312. In one embodiment, the slit has a width of 0.050 inch and extends along the 6.466 inch length of the scanhead 300. The distance between the slit and the bill is 0.195 inch, the distance between the slit and the sensor is 0.655 inch, and the distance between the sensor and the bill is 0.85 inch. The ratio between the sensor-to-slit distance and the slit-to-bill distance is 3.359:1. By positioning the slit 318 away from the bill, the slit 318 passes light reflected from a greater area of the bill. Increasing the scan area yields outputs corresponding to an average of a larger scan area. One advantage of employing fewer samples of larger areas is that the currency handling system is able to process bills at a faster rate, such as at a rate of 1200 bills per minute. Another advantage of employing larger sample areas is that by averaging information from larger areas, the impact of small deviations in bills which may arise from, for example, normal wear and/or small extraneous markings on bills, is reduced. That is, by averaging over a larger area the sensitivity of the currency handling system to minor deviations or differences in color content is reduced. As a result, the currency handling system is able to accurately discriminate bills of different denominations and types even if the bills are not in perfect condition.

Figure 13B:
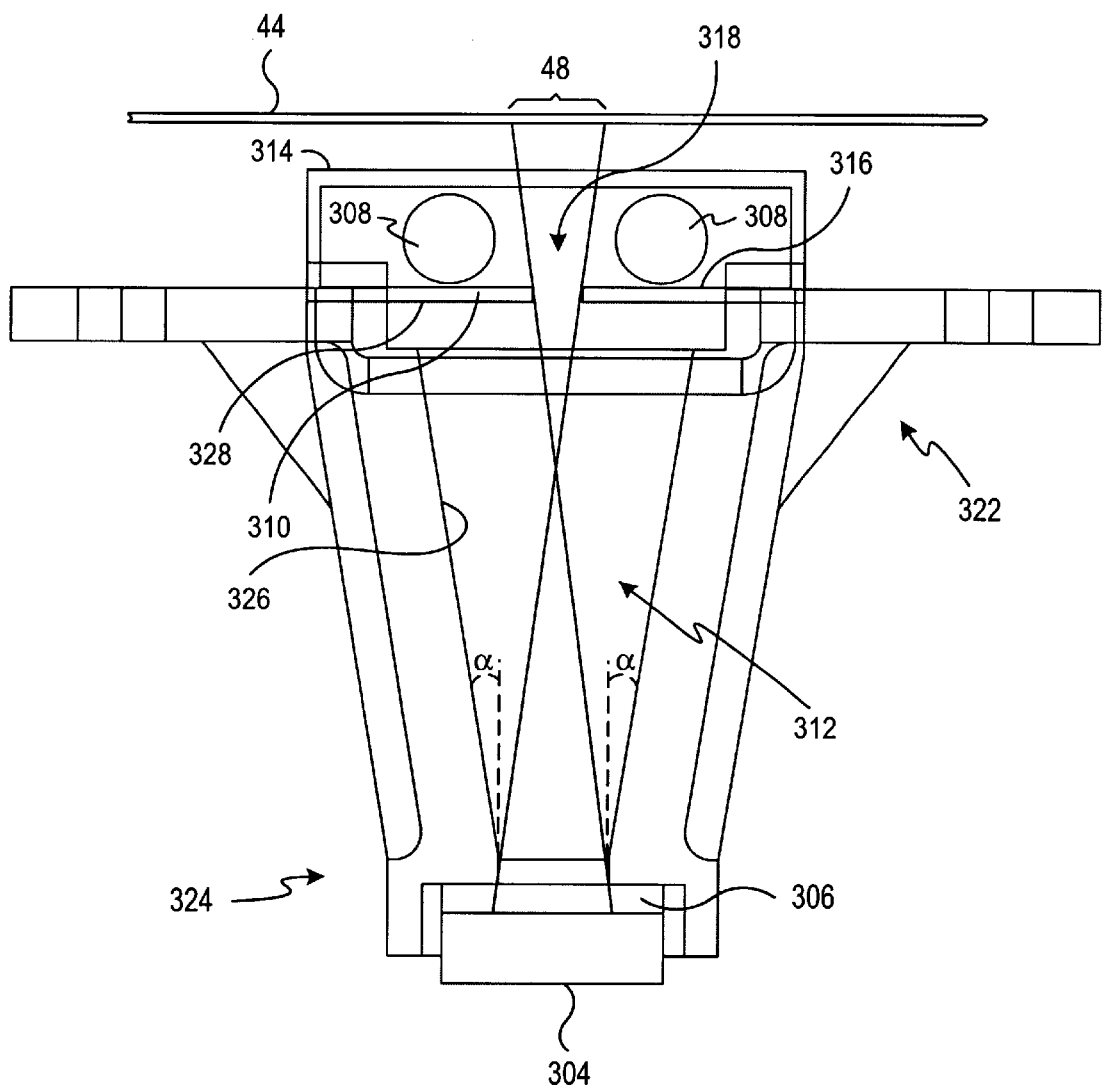

FIG. 13b illustrates the light trapping geometry of the manifold 312 is provided. Light reflected from the scan area 48 of the bill 44 travels through the slit 318 and into the manifold 312. The light passes through the manifold 312 and the filter 306 to the sensor 304. However, because the light reflected from the bill includes light reflected perpendicular to and at other angles to the bill 44, the light passing through the slit 318 includes some light reflected from areas outside the scan area 48. To prevent noisy light or light from outside the scan area 48 from being detected by the sensors 304, the manifold 312 has a light trapping geometry. By reducing the amount of noisy light received by the sensors 304, the magnitude of intensity of the light needed to illuminate the bill to provide accurate sensors outputs is reduced.

The light trapping geometry of the manifold 312 reflects the majority of noisy light away from the sensors 304. To reflect "noisy" light away from the sensors 304, the walls 326 of the manifold 312 have a back angle (x. To form the back angle, the width of the slit end 322 of the manifold 312 is made larger than the width of the sensor end 324 of the manifold 312. In one embodiment, the slit end 322 is 0.325 inches wide and the sensor end 324 is 0.125 inches wide to form a back angle of 9 degrees. Because of the light trapping geometry, the majority of the reflected light entering the manifold 312 that does not directly pass to the sensor 304 will be reflected off the back angled walls 326 away from the sensors 304. Furthermore, the walls 326 of the manifold 312 are either fabricated from or coated with a light absorbing material to prevent the noisy light from traveling to the sensors 304. Additionally, the interior surface of the manifold walls may be textured to further prevent the noisy light from traveling to the sensors 304. Moreover, the manifold side 328 of the mask 310 may be coated with a light absorbing material such as black paint and/or provided with a textured surface to prevent the trapped light rays from being reflected toward the sensor 304. The mask 310 is grounded so that it can act as an electrical noise shield. Grounding the mask 310 shields the sensors 304 from electromagnetic radiation noise emitted by the fluorescent tubes 308, thus further reducing electrical noise.

As best seen in FIGS. 11c and 11d, in one embodiment, the scanhead 300 has a length LM of 7.326 inches, a height HM of 0.79 inches, and a width WM of 0.5625 inches. Each cell has a length LC of ½ inches and the scanhead has an overall interior length LI of 7.138 inches. In the embodiment depicted in FIG. 1 Id, the scanhead 300 is populated with five full color cells 335a, 335b, 335c, 335d and 335e laterally positioned across the center of the length of the scanhead 300 and one edge sensor 338 at the left of the first color site 335a. See also FIG. 11b. The edge sensor 338 comprises a single sensor without a corresponding filter to detect the intensity of the reflected light and hence acts as a bill edge sensor.

While the embodiment shown in FIG. 11d depicts an embodiment populated with five full color cells, because the body 302 of the scanhead 300 has sensor and filter receptacles 303 to accommodate up to forty-three filters and/or sensors, the scanhead 300 may be populated with a variety of color cell configurations located in a variety of positions along the length of the scanhead 300. For example, in one embodiment only one color cell 335 may be housed anywhere on the scanhead 300. In other situations up to fourteen color cells 335 may be housed along the length of the scanhead 300. Additionally, a number of edge sensors 338 may be located in a variety of locations along the length of the scanhead 300.

According to one embodiment, the cell partitions 336 may be formed integrally with the body 302. Alternatively, the body 302 may be constructed without cell partitions, and configured such that cell partitions 336 may be accepted into the body 302 at any location between adjacent receptacles 303. Once inserted into the body 302, a cell partition 336 may become permanently attached to the body 302. Alternatively, cell partitions 336 may be removeably attachable to the body such as by being designed to snap into and out of the body 302. Embodiments that permit cell partitions 336 to be accepted at a number of locations provide for a very flexible color scanhead that can be readily adapted for different scanning needs such as for scanning currency bills from different countries.

For example, if information that facilitates distinguishing bills of different denominations from a first country such as Canada can be obtained by scanning central regions of bills, five cells such as 335a–335e can be positioned near the center of the scanhead as in FIG. 11b. Alternatively, if information that facilitates distinguishing bills of different denominations from a second country such as Turkey can be obtained by scanning regions near the edges of bills, cells can be positioned near the edges of the scanhead.

In this manner, standard scanhead components can be manufactured and then assembled into various embodiments of scanheads adapted to scan bills from different countries or groups of countries based on the positioning of cell locations. Accordingly, a manufacturer can have one standard scanhead body 302 part and one standard cell partition 336 part. Then by appropriately inserting cell partitions into the body 302 and adding the appropriate filters and sensors, a scanhead dedicated to scanning a particular set of bills can be easily assembled.

For example, including a single edge sensor, such as sensor 338, and only a single color cell located in the center of the scanhead, such as cell 335c, U.S. bills can be discriminated; Canadian bills can be discriminated if cells 335a–335e are populated and Euro currency can be discriminated using only cells 335a and 335e. Therefore, a single currency handling system employing a scanhead populated with color cells 335a–335c and edge sensor 338 can be used to process and discriminate U.S., Canadian, and Euro currency.

Alternatively, a universal scanhead can be manufactured that is fully populated with cells across the entire length of the scanhead. For example, the scanhead 300 may comprise fourteen color cells and one edge cell. Then a single scanhead may be employed to scan many types of currency. The scanning can be controlled based on the type of currency being scanned. For example, if the operator informs the currency handling system, or the currency handling system determines, that Canadian bills are being processed, the outputs of sensors in cells 335a–335e can be processed. Alternatively, if the operator informs the currency handling system, or the currency handling system determines that Thai bills are being processed, the outputs of sensors in cells near the edges of the scanhead can be processed.

The full color scanhead 300 may form part of a color scanhead module (not shown) of the type more fully described in copending Application Ser. No. 09/197,250, filed Nov. 20, 1988 to which reference is invited.

Figure 14A:
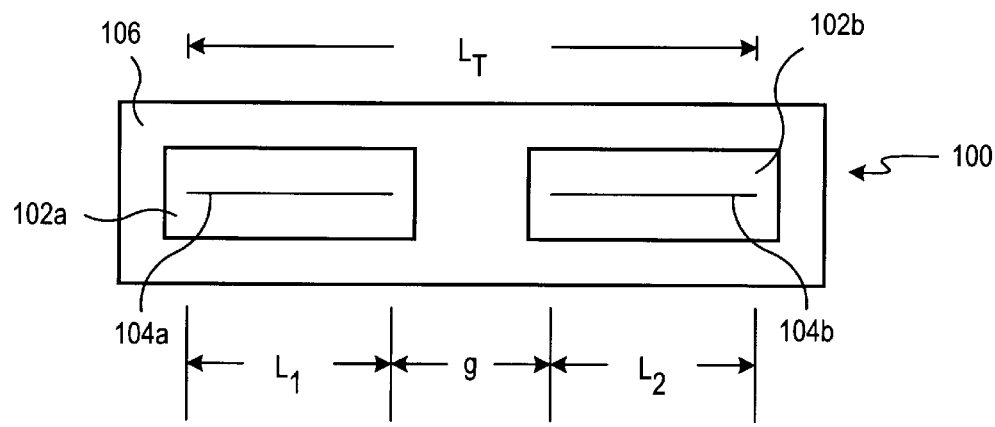
FIG. 14a is a simplified top view of a size and position sensing system which may be used in the currency handling system of FIG. 8.
Figure 14B:
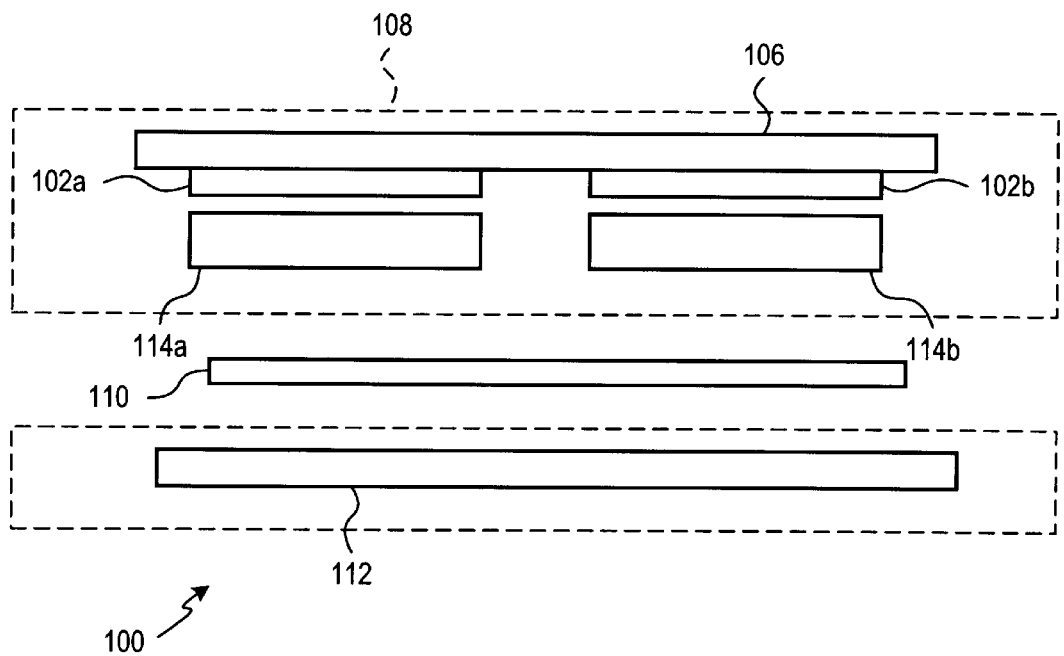

FIGS. 14a and 14b illustrate one form of optical sensing system, designated generally by reference numeral 100, which may be used to detect the size and/or position of a currency bill under test. The system 100 may be used alternatively or in addition to any of the other sensing systems herein described. The system 100 is particularly useful in foreign markets in which the size of individual bills varies with their denomination. The system 100 is also useful in applications which require precise bill position information such as, for example, where an attribute of the bills (e.g., color, density, thread location etc.) varies according to the position of the bill relative to the sensors.

The system 100 includes two photo-sensitive linear arrays 102a, 102b mounted on a printed circuit board 106. The linear arrays 102a, 102b each consists of multiple photo-sensing elements (or "pixels") aligned end-to-end along respective lines 104a, 104b. The arrays 102a, 102b, having respective lengths $L_1$ and $L_2$, are positioned on the circuit board 106 such that they are co-linear and separated by a gap "g." In one embodiment, the linear arrays 102a, 102b each comprise 512-element Texas Instruments model TSL 218 arrays, commercially available from Texas Instruments, Inc., Dallas, Tex.. In the TSL 218 arrays, each pixel represents an area of about 5 mils in length, thus the arrays 102a, 102b have respective lengths $L_1$ and $L_2$ of 2.5 inches. In one embodiment, the gap g between the arrays is about 2 inches. In this embodiment, therefore, the distance between the left ends of array 102a and the right end of array 102b is seven inches ($L_1+L_2+g$), thus providing the system 100 with the ability to accommodate bills of up to seven inches in length. It will be appreciated that the system 100 may be designed with a single array and/or may use array(s) having fewer or greater numbers of elements, having a variety of alternative lengths $L_1$ and $L_2$ and/or having a variety of gap sizes (including, for instance, a gap size of zero).

The operation of system 100 is best illustrated in FIG. 15. The arrays 102a, 102b comprise a portion of an upper head assembly 108 of the currency evaluation machine, positioned above the transport path of a currency bill 110. A light source 112, which in one embodiment comprises a fluorescent light tube, is positioned below and substantially parallel to the upper head assembly 108 and transport path. It will be appreciated that the illustrated embodiment may be applied to systems having non-horizontal (e.g., vertical) transport paths by positioning the arrays 102a, 102b and light source 112 on opposite sides (e.g., left and right) of the transport path.

The individual pixels in the arrays 102a, 102b are adapted to detect the presence or absence of light transmitted from the light tube 112. In one embodiment, gradient index lens arrays 114a, 114b are mounted between the light tube 112 and the respective sensor arrays 102a, 102b. The gradient index lens arrays 114a, 114b maximize the accuracy of the system 100 by focusing light from the light tube 112 onto the photo-sensing elements and filtering out extraneous light, reflections, etc. which may otherwise adversely affect the accuracy of the system 100. Alternatively, less accurate but relatively reliable measurements may be obtained by replacing the gradient index lens arrays 114a, 114b with simpler, less expensive filters such as, for example, a plate (not shown) with aligned holes or a continuous slot allowing passage of light from the light tube 112 to the arrays 102a, 102b.

When no bill is present between the light tube 112 and the arrays 102a, 102b, all of the photo-sensing elements are directly exposed to light. When a currency bill 110 is advanced along the transport path between the light tube 112 and the arrays 102a, 102b, a certain number of the photo-sensing elements will be blocked from light. The number of pixels blocked from light will determine the size of the bill 110. The bill 110 may be advanced across the optical path along its longer dimension, as illustrated in FIG. 15, or its narrow dimension. Moreover, the bill 110 may be advanced across the optical path in either a forward direction (e.g., "into the page" relative to FIG. 15) or a reverse direction (e.g., "out of the page" relative to FIG. 15). In the illustrated embodiment, the currency size is computed according to the following formula:

$$\text{Size} = [(\# \text{ of pixels blocked in array } 102b) + (\# \text{ of pixels blocked in array } 102a)] \times [\text{pixel size}] + [\text{gap size}].$$

Thus, with a gap size of 2 inches and an individual pixel size of about 5 mils, the formula is as follows:

$$\text{Size} = [(\# \text{ of pixels blocked in array } 102b) + (\# \text{ of pixels blocked in array } 102a)] \times [5 \text{ mils}] + [2 \text{ inches}].$$

The number of pixels blocked from light in the respective arrays 102a, 102b may also be used to determine the longitudinal position of the bill relative to the sensor arrays 102a, 102b. Position is measured by how far the bill is from center. A perfectly centered bill (e.g., positioned directly underneath the arrays such that equal numbers of pixels are blocked in each respective array 102a, 102b) is assigned a position of 0. Bills shifted to the left (toward array 102a) are assigned negative positions and bills shifted to the right (toward array 102a) are assigned positive positions. Thus, for example, a bill shifted to the left by 0.5 inches is assigned a position of −0.5 inches, whereas a bill shifted to the right by 0.5 inches is assigned a position of +0.5 inches. The accuracy of the position measurement is limited by the pixel size. Thus, for example, where the pixel size is 5 mils, the position can be determined to within plus-or-minus 5 mils. More particularly, with a pixel size of 5 mils, the currency position is computed according to the following formula:

$$\text{Position} = [((\# \text{ of pixels blocked in array } 102b) - (\# \text{ of pixels blocked in array } 102a)) \times (5 \text{ mils})]/2.$$

Alternate Size Determination

In addition to intensity, color and magnetic scanning, the currency handling system 10 may determine the size of a currency bill. The "X" size dimension of a currency bill is determined by reference to FIGS. 20a and 20b which illustrate an upper scanhead 90 for optically sensing the size and/or position of a currency bill under test. The scanhead 90 may be used alternatively or in addition to any of the other sensing systems heretofore described. The scanhead 90 is particularly useful in foreign markets in which the size of individual bills varies with their denomination. The scanhead 90 is also useful in applications which require precise bill position information such as, for example, where a bill attribute is located on or in the bill (e.g., color, hologram, security thread, etc.).

In similar fashion to what is shown and described above with reference to FIGS. 14a and 14b, the scanhead 90 includes two photo-sensitive linear arrays 1002a, 1002b. Each of the linear arrays 1002a, 1002b consists of multiple photosensing elements (or "pixels") aligned end-to-end. The arrays 1002a, 1002b, having respective lengths $L_1$ and $L_2$, are positioned such that they are co-linear and separated by a gap "G." In one embodiment, each linear array 1002a and 1002b comprises a 512-element Texas Instruments model TSL 218 array, commercially available from Texas Instruments, Inc., Dallas, Tex. In the TSL 218 arrays, each pixel represents an area of about 5 mils in length, and thus the arrays 1002a, 1002b have respective lengths $L_1$ and $L_2$ of 2.5 inches. In one embodiment, the gap G between the arrays is about 2 inches. In this embodiment, therefore, the distance between the left end of array 1002a and the right end of array 1002b is seven inches ($L_1+L_2+G$), thus providing the scanhead 90 with the ability to accommodate bills of at least seven inches in length. It will be appreciated that the scanhead 90 may be designed with a single array and/or may use array(s) having fewer or greater numbers of elements, having a variety of alternative lengths $L_1$ and $L_2$ and/or having a variety of gap sizes (including, for instance, a gap size of zero).

The scanhead 90 also includes optical sensors (e.g. photodiodes) 74a, 74b which are located behind slits 360, 362 for scanning characteristic information from bills. Position or leading/trailing edge sensors 95, 97 may also be located on the scanhead 90.

The operation of the scanhead 90, the arrays 1002a, 1002b of the upperhead assembly 90 are positioned above the transport path. A light source, which in the illustrated embodiment comprises a pair of fluorescent light tubes, is positioned below the upper head assembly 90 and the transport path. It will be appreciated that the illustrated embodiment may be applied to systems having non-horizontal (e.g., vertical) transport paths by positioning the scanhead 90 and light source on opposite sides (e.g., top and bottom) of the transport path.

The individual pixels in the arrays 1002a, 1002b are adapted to detect the presence or absence of light transmitted from the light tubes. In one embodiment, gradient index lens arrays 1014a, 1014b, manufactured by NSG America, Somerset, N.J., part no. SLA-20B144-570-1-226/236, are mounted between the light tubes and the respective sensor arrays 1002a, 1002b. The gradient index lens arrays 1014a, 1014b maximize the accuracy of the scanhead 90 by focusing light from the light tubes onto the photo-sensing elements and filtering out extraneous light and reflections, which may otherwise adversely affect the accuracy of the scanhead 90. Alternatively, less accurate but relatively reliable measurements may be obtained by replacing the gradient index lens arrays 1014a, 1014b with simpler, less expensive filters such as, for example, a plate (not shown) with aligned holes or continuous slot allowing passage of light from the light tubes to the arrays 1002a, 1002b.

When no bill is present between the light tubes and the arrays 1002a, 1002b, all of the photo-sensing elements are directly exposed to light. When a currency bill is advanced along the transport path between the light tubes and the arrays 1002a, 1002b, a certain number of the photo-sensing elements will be blocked from light. The number of pixels blocked from light will determine the length of the bill.

Figure 16:
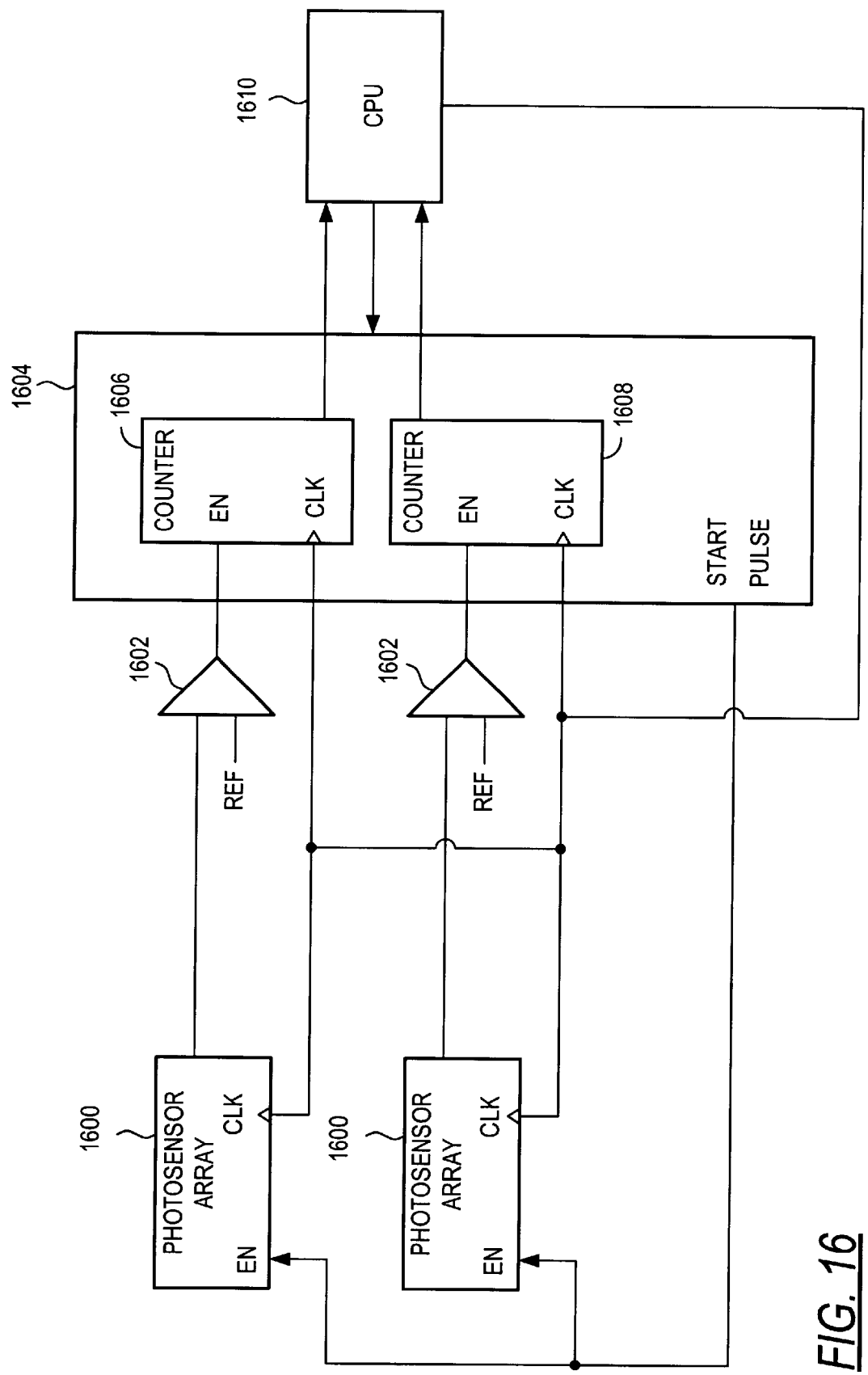
FIG. 16 is a block diagram of an alternate form of size detection circuit for measuring the long (or "X") dimension of a bill.

Specifically, in one embodiment, the size of the long dimension of the bill is determined by the circuit of FIG. 16. There, two photosensor arrays 1600 are connected to two comparators 1602. Each photosensor array 1600 is enabled by a start pulse from a Programmable Logic Device (PLD) 1604. The clock pin (CLK) of each array 1600 is electrically connected to the CLK inputs of right and left counters, 1606 and 1608, in the PLD 1604. Each comparator 1602 is also electrically connected to a source of a reference signal. The output of each comparator 1602 is electrically connected to the enable (EN) inputs of the counters 1606 and 1608. The PLD 1604 is controlled by the CPU 54. The circuit of FIG. 16 is asynchronous.

The size of a bill is determined by sampling the outputs of the counters 1606 and 1608 after the leading edge of the bill is approximately one inch past the arrays 1002a, 1002b. The counters 1606 and 1608 count the number of uncovered pixels. The long dimension of the bill is determined by subtracting the number of uncovered pixels in each array from 511 (there are 512 pixels in each array 1600, and the counters 1606 and 1608 count from 0 to 511). The result is the number of covered pixels, each of which has a length of 5 mils. Thus, the number of covered pixels times 5 mils, plus the length of the gap G, gives the length of the bill.

The system 10 also provides bill position information and fold/hole fitness information by using the "X" dimension sensors. These sensors can detect the presence of one or more holes in a document by detecting light passing through the document. And, as described more fully below, these sensors can also be used to measure the light transmittance characteristics of the document to detect folded documents and/or documents that are overlapped.

Figure 17:
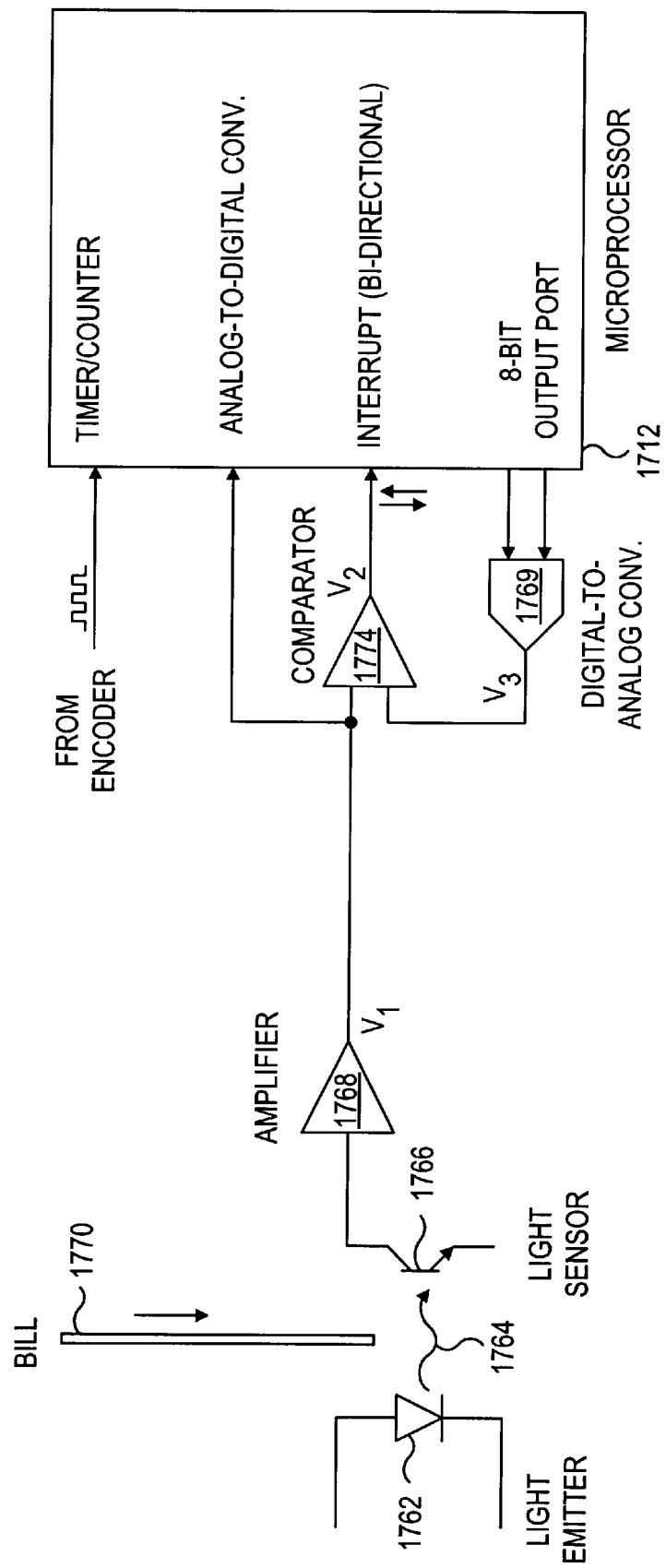
FIG. 17 is a block diagram of a digital size detection system for measuring the narrow (or "Y") dimension of a bill.
Figure 18:
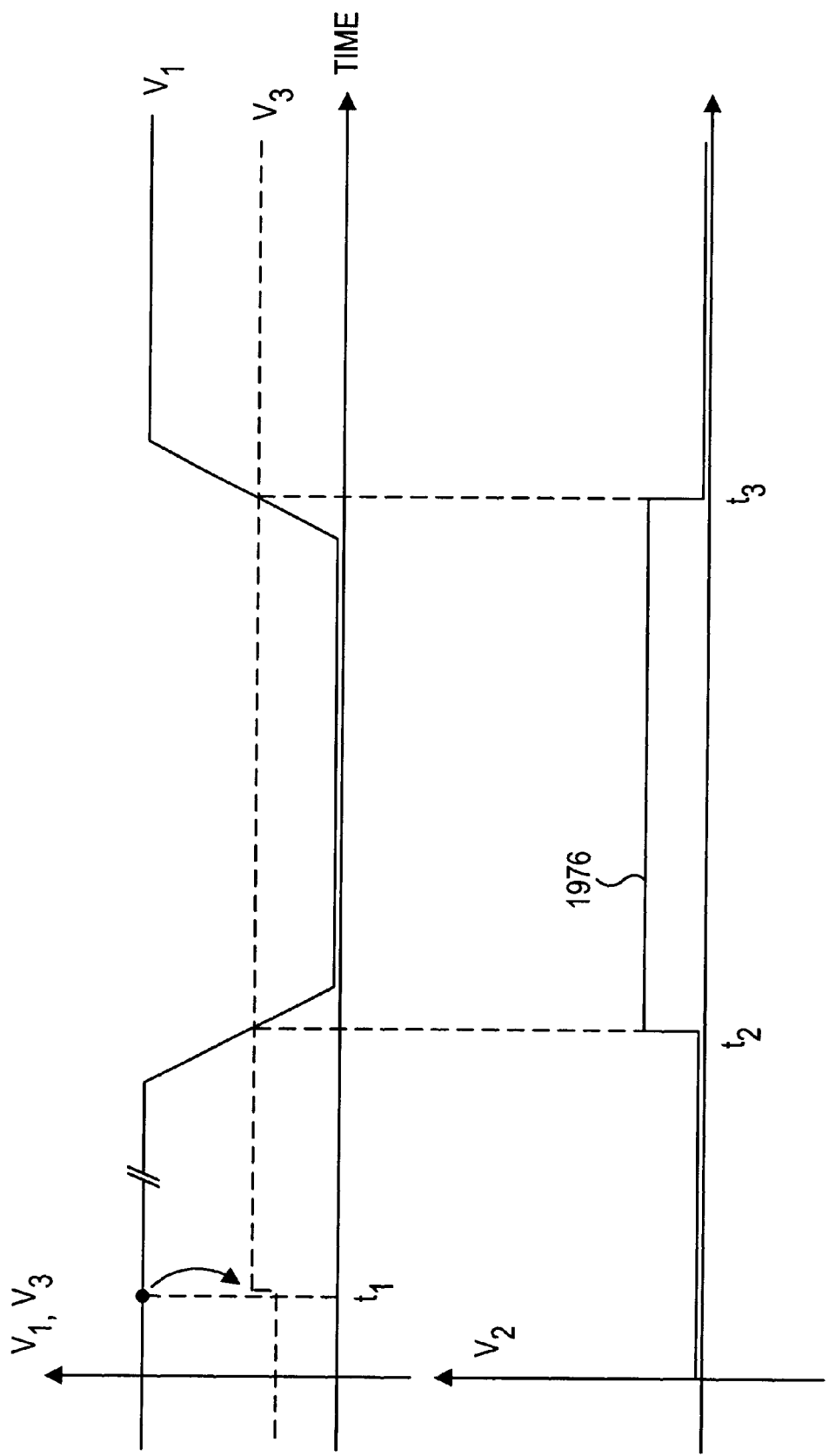
FIG. 18 is a timing diagram illustrating the operation of an alternate form of the size detection method of FIG. 17.
Figure 19:
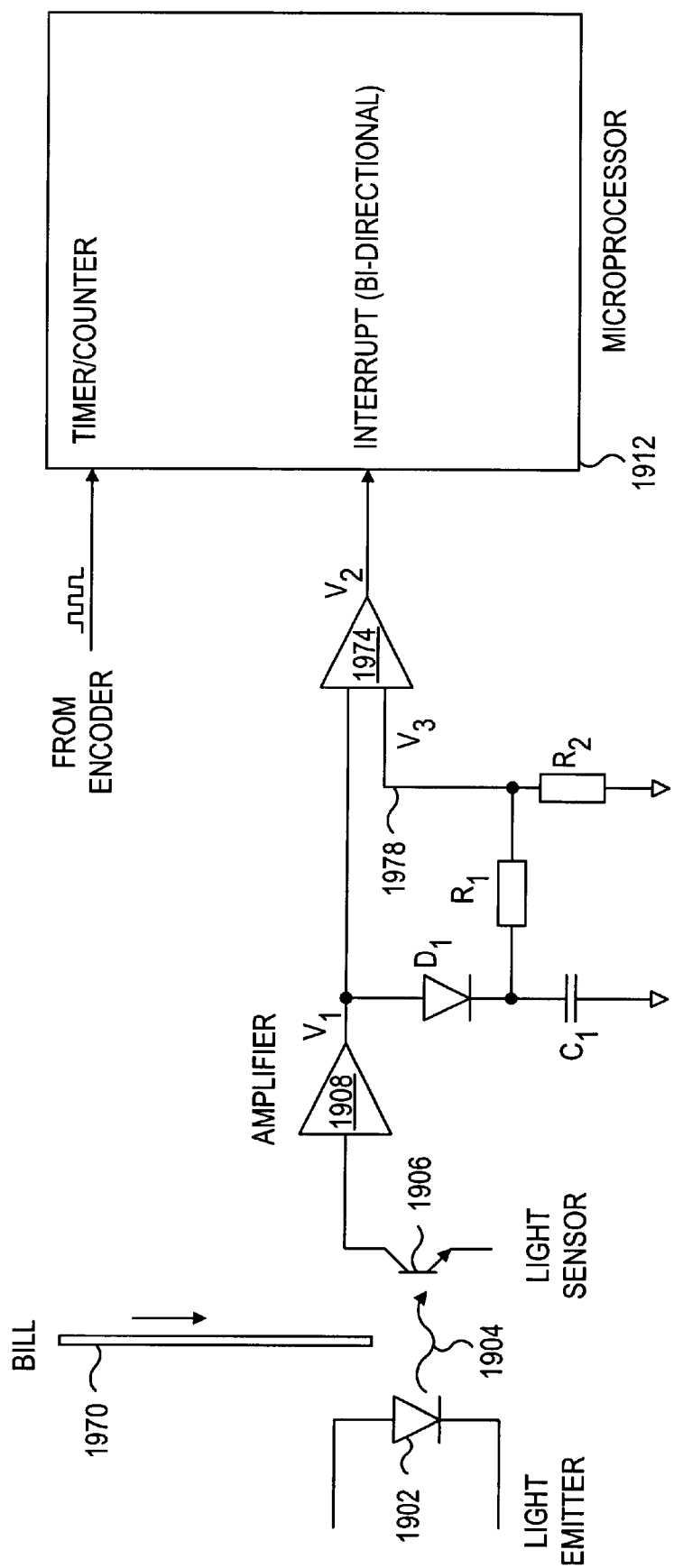
FIG. 19 is a block diagram of an analog size detection system for measuring the narrow (or "Y") dimension of a bill.

The "Y" dimension of a bill is determined by the optical sensing system of FIGS. 17–19. This size detection system includes a light emitter 1762 which sends a light signal 1764 toward a light sensor 1766. In one embodiment, the sensor 1766 corresponds to sensors 95 and 97 illustrated in FIG. 20b. The sensor 1766 produces a signal which is amplified by amplifier 1768 to produce a signal VI proportional to the amount of light passing between the emitter and sensor. A currency bill 1770 is advanced across the optical path between the light emitter 1762 and light sensor 1766, causing a variation in the intensity of light received by the sensor 1766. As will be appreciated, the bill 1770 may be advanced across the optical path along its longer dimension or narrow dimension, depending on whether it is desired to measure the length or width of the bill.

Referring to the timing diagram of FIG. 18, at time t1, before the bill 70 has begun to cross the path between the light emitter 1762 and sensor 1766, the amplified sensor signal V1 is proportional to the maximum intensity of light received by the sensor 1766. The signal V1 is digitized by an analog-to-digital converter and provided to the microprocessor 12, which divides it by two to define a value V½ equal to one-half of the maximum value of V1. The value V½ is supplied to a digital-to-analog converter 1769 to produce an analog signal V3 which is supplied as a reference signal to a comparator 1774. The other input to the comparator 1774 is the amplified sensor signal V1 which represents the varying intensity of light received by the sensor 1766 as the bill 70 crosses the path between the emitter 1762 and sensor 1766. In the comparator 1774, the varying sensor signal V1 is compared to the reference signal V3, and an output signal is provided to an interrupt device whenever the varying sensor signal V1 falls above or below the reference V3. Alternatively, the system could poll the sensors periodically, for example, every 1 ms.

As can be seen more clearly in the timing diagram of FIG. 18, the interrupt device produces a pulse 1976 beginning at time t2 (when the varying sensor signal V1 falls below the V3 reference) and ending at time t3 (when the varying sensor signal V1 rises above the V3 reference). The length of the pulse 1976 occurring between times t2 and t3 is computed by the microprocessor 1712 with reference to a series of timer pulses from the encoder. More specifically, at time t2, the microprocessor 1712 begins to count the number of timer pulses received from the encoder, and at time t3 the microprocessor stops counting. The number of encoder pulses counted during the interval from time t2 to time t3 represents the width of the bill 1770 (if fed along its narrow dimension) or length of the bill 1770 (if fed along its longer dimension).

It has been found that light intensity and/or sensor sensitivity will typically degrade throughout the life of the light emitter 1762 and the light sensor 1766, causing the amplified sensor signal V1 to become attenuated over time. The signal V1 can be further attenuated by dust accumulation on the emitter or sensor. One of the advantages of the above-described size detection method is that it is independent of such variations in light intensity or sensor sensitivity. This is because the comparator reference V3 is not a fixed value, but rather is logically related to the maximum value of V1. When the maximum value of V1 attenuates due to degradation of the light source, dust accumulation, etc., V3 is correspondingly attenuated because its value is always equal to one-half of the maximum value of V1. Consequently, the width of the pulse derived from the comparator output with respect to a fixed length bill will remain consistent throughout the life of the system, independent of the degradation of the light source 1762 and sensor 1766.

FIG. 19 portrays an alternative circuit which may be used to detect the Y dimension of a currency bill under test. In FIG. 19, the method of size detection is substantially similar to that described in relation to FIG. 17 except that it uses an analog method to derive the $V_3$ signal input to the comparator 1974. A diode D1 is connected at one end to the output of the amplifier 68 and at another end to a capacitor C1 connected to ground. A resistor R1 is connected at one end between the diode D1 and the capacitor C1. The other end of the resistor R1 is connected to a resistor R2 in parallel with the reference input 1978 of the comparator 1974. If R1 and R2 are equal, the output voltage V3 on the reference input 1978 will be one-half of the peak voltage output from the amplifier 1908, if the voltage drop across the diode is negligible. In the comparator 1974, the varying sensor signal V1 is compared to the output voltage V3, and an output signal is provided to an interrupt device whenever the varying sensor signal V1 falls above or below the V3 reference. Thereafter, a pulse 1976 is produced by the interrupt device, and the length of the pulse 1976 is determined by the microprocessor 1912 in the same manner described above. In the circuit of FIG. 19, as in the circuit of FIG. 17, the signal V2 is proportional to V1, and the widths of pulses derived from the comparator output are independent of the degradation of the light source 1902 and sensor 1906.

While some of the above embodiments have been described and illustrated in conjunction with U.S. currency, systems according to the present invention may alternatively or additionally process currency from other countries such as, for example, Britain, France, Germany, Japan, Spain, Canada, Italy, Brazil, Mexico, Taiwan, and Saudi Arabia. Likewise, the system 10 may support the processing of multiple types of money such as casino money or script and/or amusement park money. Additionally, the system 10 may support the processing of other types of documents such as stock certificates, bonds, postage or other revenue stamps, and/or food coupons/stamps, and the like.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A currency handling system for evaluating currency with respect to master information, said currency handling system being operable to generate said master information, said currency handling system comprising:

multiple sensors to obtain, from authentic currency, test data associated with selected parameters of the currency, said parameters including at least the color of the currency, the size of the currency, and a pattern of optical reflectance from a surface of the currency;

means for selecting the parameters to be stored as master information, and for identifying the type and denomination of said authentic currency from which said master information is obtained;

a processor for generating master information for said selected parameters and said identified type and denomination based on the information obtained by said sensors from said authentic currency;

a memory for storing said master information as the master information for currency of the identified type and denomination; and means for comparing said stored master information with test data obtained by said sensors from test currency to determine whether said test currency is currency of the identified type and denomination.

2. The currency handling system of claim 1 wherein said master patterns are produced by scanning the same bill multiple times and averaging the resulting patterns.

3. The currency handling system of claim 1 wherein said master patterns are produced by scanning multiple bills of the same denomination and having similar conditions of wear, and averaging the resulting patterns.

4. The currency handling system of claim 1 wherein said master patterns are produced by scanning multiple bills of the same denomination but having significantly different conditions of wear, and averaging the resulting patterns.

5. The currency handling system of claim 1 wherein said sensors are located along a transport path and further including a transport mechanism for transporting currency along said transport path.

6. The currency handling system of claim 1 which includes a display connected to said processor for displaying messages in response to display signals from said processor, and means for controlling said processor to produce display signals representing a learn mode menu permitting the user to identify the type and denomination of the currency to be learned.

7. The currency handling system of claim 6 wherein said display signals represent a learn mode menu that permits the user to select the series of the currency to be learned.

8. The currency handling system of claim 6 wherein said display signals represent a learn mode menu that permits the user to select the attribute of the currency to be learned.

9. The currency handling system of claim 8 wherein said menu permits the user to select from a menu including optical pattern, UV, magnetic, color and size.

10. The currency handling system of claim 1 wherein said memory comprises an EEPROM.

11. The currency handling system of claim 1 wherein said sensors include a scanhead having at least one light emitting device for illuminating a currency and at least one light sensitive device for sensing light reflected from said currency.

12. The currency handling system of claim 1 wherein the currency comprises currency from different countries.

13. The currency handling system of claim 11 wherein said processor processes the information from said sensors to obtain samples of the reflected light at a plurality of predefined sample points on the surface of said currency.

14. The currency handling system of claim 11 wherein said sensors are located along a transport path and further including a transport mechanism for transporting currency along said transport path.

15. The currency handling system of claim 14 wherein said processor processes the information from said scanhead to obtain samples of the reflected light at a plurality of predefined sample points located along a relatively narrow strip on the surface of said currency as the currency is transported with its narrow dimension parallel to the direction of transport.

16. The currency handling system of claim 15 wherein said processor initiates processing to obtain samples in response to a change in reflectance value which occurs when an outer edge of a currency is transported past the scanhead relative to a reflectance value obtained when a currency is not present.

17. The currency handling system of claim 15 wherein said sample points are selected so that successive samples overlap one another.

18. The system of claim 1 wherein said system comprises a note counter for counting currency.

19. The system of claim 18 which includes a display connected to said processor for displaying messages in response to display signals from said processor, and means for controlling said processor to produce display signals representing a learn mode menu permitting the user to select the type and denomination of the currency to be learned.

20. The system of claim 1 wherein said system comprises a currency authenticating machine for authenticating currency.

21. The system of claim 1 wherein said system comprises a currency denominating machine.

22. The currency handling system of claim 15 wherein said processor initiates processing to obtain samples in response to a change in reflectance value which occurs when an outer border of a printed pattern on a currency is transported past the scanhead relative to a reflectance value obtained at an edge of a currency where no printed pattern exits.

23. The currency handling system of claim 1 wherein said processor generates master information which includes color attributes for each type of currency which is to be evaluated by the system.

24. The currency handling system of claim 1 having a single output receptacle.

25. The currency handling system of claim 1 wherein said comparing means is adapted to denominate currency of a plurality of different denominations independently of the dimensions of the currency.

26. The currency handling system of claim 1 wherein said comparing means is adapted to denominate currency of a plurality of different denominations, at least two of the denominations having the same dimensions.

27. A currency handling method comprising:
   obtaining from at least one authentic currency information associated with one or more attributes of said currency, said information including at least one characteristic pattern for each type of currency which is to be evaluated by the method;
   generating master information based on the information obtained from said authentic currency;
   manually identifying the type and denomination of said authentic currency from which said master information is obtained,
   storing said master information in a memory as the master information for currency of the identified type and denomination;
   obtaining from test currency information associated with the same attributes with which said master information is associated; and
   comparing said master information with the information obtained from said test currency to determine whether said test currency is authentic currency of the identified type and denomination.

28. The currency handling method of claim 27 wherein obtaining information comprises optically sensing information on a surface of a currency.

29. The currency handling method of claim 27 wherein generating includes generating at least two master characteristic patterns for each of a plurality of denominations of currency bills which comprise said currency to be evaluated by said method.

30. The currency handling method of claim 27 and further including transporting currency along a transport path, at least during obtaining information.

31. The currency handling method of claim 30 wherein generating includes generating at least two sets of master information for each type of currency to be evaluated by said currency handling method, including at least one set of master information corresponding to information obtained from an authentic currency transported in each of forward and reverse orientations.

32. The currency handling method of claim 30 wherein generating includes generating at least two sets of master information for each type of currency to be evaluated by said method, including at least one set of master information corresponding to information obtained from an authentic currency transported in each of two relatively slightly laterally displaced orientations.

33. The currency handling method of claim 27 wherein storing includes storing master information corresponding to each of a plurality of different currency bills comprising currency to be evaluated by said method.

34. The currency handling method of claim 27 wherein obtaining information comprises scanning an authentic currency to obtain one or more sets of information, each corresponding to respective attributes of said currency.

35. The currency handling method of claim 27 wherein storing data comprises storing data in an EEPROM.

36. The currency handling method of claim 27 wherein obtaining information comprises illuminating a currency and sensing light reflected from said currency.

37. The currency handling method of claim 27 wherein the currency comprises currency from different countries.

38. The currency handling method of claim 27 wherein said identifying includes displaying a menu permitting a user to select the type and denomination of said authentic currency from which said master information is obtained.

39. The currency handling method of claim 36 wherein generating comprises processing the information to obtain samples of the reflected light at a plurality of predefined sample points on the surface of said currency.

40. The currency handling method of claim 36 and further including transporting currency along a transport path at least during said obtaining information.

41. The currency handling method of claim 40 wherein obtaining information comprises obtaining samples of the reflected light at a plurality of predefined sample points on the surface of said currency at a plurality of predefined sample points located along a relatively narrow strip of said currency as the currency is transported with its narrow dimension parallel to the direction of transport.

42. The currency handling method of claim 41 wherein obtaining samples comprises initiating sampling in response to a change in reflectance value corresponding to light reflected from an outer edge of a currency relative to a reflectance value corresponding to light reflected when a currency is not present.

43. The currency handling method of claim 41 and further including selecting said sample points so that successive samples overlap one another.

44. The method of claim 27 and further including:
   scanning a stack of test currency to obtain test data corresponding to the value of one or more attributes in each of said test currency; and
   determining the authenticity of each of said test currency by comparing the test data associated with at least one of said attributes to the master information corresponding to attributes of said authentic currency from which said master information is obtained.

45. The method of claim 27 wherein obtaining information includes scanning said authentic currency a plurality of times to obtain a plurality of sets of data corresponding to one or more attributes in said authentic currency, and wherein generating includes obtaining the average of the master information related to said plurality of sets of test data, and wherein storing comprises storing data related to said average.

46. The currency handling method of claim 41 wherein obtaining samples comprises initiating sampling in response to a change in reflectance value corresponding to light reflected from an outer border of a printed pattern on a currency relative to a reflectance value corresponding to light reflected from an edge of a currency where no printed pattern exits.

47. The currency handling method of claim 27 wherein generating includes generating master information which includes color attributes for each of said currency to be evaluated by said method.

48. The currency handling method of claim 27 wherein said test currency is delivered to a single output receptacle after evaluation.

49. The currency handling method of claim 27 wherein said comparing determines whether said test currency is authentic currency of the identified type and denomination independently of the dimensions of the currency.

50. The currency handling method of claim 27 wherein said comparing determines whether test currency of a plurality of different denominations is authentic currency of the identified type and denomination, at least two of the denominations having the same dimensions.

51. A currency handling system for evaluating currency with respect to independently derived master information, said currency handling system comprising:
- at least one sensor adapted to obtain from at least one master currency, master information associated with one or more attributes of said master currency including at least one of color, UV and pattern attributes, said sensor being further adapted to obtain from test currency, test data associated with one or more attributes of said test currency;
- means for permitting a user to manually identify the type and denomination of said master currency;
- a processor adapted to evaluate each of said currency by comparing the test data associated with a selected one of said attributes to the master information corresponding to the selected one of said attributes to determine whether said test currency is authentic currency of the identified type and denomination; and
- a memory for storing said master information as the master information for currency of the identified type and denomination.

52. A currency denominating method comprising:
- obtaining from at least one authentic currency information associated with one or more attributes of said currency;
- generating master information based on the information obtained from said authentic currency;
- manually identifying the type and denomination of said authentic currency from which said master information is obtained;
- storing said master information in a memory as the master information for currency of the identified type and denomination;
- obtaining from test currency information associated with the same attributes with which said master information is associated; and
- comparing said master information with the information obtained from said test currency to determine whether said test currency is currency of the identified type and denomination.

53. A currency denominating system for denominating currency with respect to independently derived master information, said currency denominating system comprising:
- at least one sensor adapted to obtain from at least one master currency, master information associated with one or more attributes of said master currency, said sensor being further adapted to obtain from test currency, test data associated with one or more attributes of said test currency;
- means for permitting a user to manually identify the type and denomination of said master currency;
- a memory for storing said master information as the master information for currency of the identified type and denomination; and
- a processor adapted to determine the denomination of each test currency by comparing the test data associated with a selected one of said attributes to the master information corresponding to the selected one of said attributes.

54. A currency authenticating system for authenticating currency with respect to master information, said currency authenticating system being operable to generate said master information, said currency authenticating system comprising:
- at least one input device adapted to obtain from at least one currency information associated with one or more attributes of said currency;
- a processor for generating master information based on the information obtained by said input device from at least one authentic currency;
- means for permitting a user to manually identify the type and denomination of said authentic currency;
- a memory for storing said master information as the master information for currency of the identified type and denomination; and
- means for comparing said stored master information with test data obtained by said input device from test currency to determine whether said test currency is authentic currency of the identified type and denomination.

55. A currency authenticating method comprising:
- obtaining from at least one authentic currency information associated with one or more attributes of said currency;
- generating master information based on the information obtained from said authentic currency;
- manually identifying the type and denomination of said authentic currency from which said master information is obtained;
- storing said master information in a memory as the master information for currency of the identified type and denomination;
- obtaining from test currency information associated with the same attributes with which said master information is associated; and
- comparing said master information with the information obtained from said test currency to determine whether said test currency is authentic currency of the identified type and denomination.

56. A currency authenticating system for authenticating currency with respect to independently derived master information, said currency authenticating system comprising:
- at least one sensor adapted to obtain from at least one master currency, master information associated with one or more attributes of said master currency, said sensor being further adapted to obtain from test currency, test data associated with one or more attributes of said test currency;
- means for permitting a user to manually identify the type and denomination of said master currency;
- a memory for storing said master information as the master information for currency of the identified type and denomination; and
- a processor adapted to determine the authenticity of each test currency by comparing the test data associated with a selected one of said attributes to the master information corresponding to the selected one of said attributes.

* * * * *